(12) United States Patent
Kostakis et al.

(10) Patent No.: US 11,881,704 B2
(45) Date of Patent: Jan. 23, 2024

(54) DEVICES FOR ACTIVE OVERVOLTAGE PROTECTION INCLUDING VARISTORS AND THYRISTORS

(71) Applicant: RIPD RESEARCH AND IP DEVELOPMENT LTD., Nicosia (CY)

(72) Inventors: Grigoris Kostakis, Athens (GR); Zafiris G. Politis, Athens (GR); Fotis Xepapas, Drama (GR); Alexis Chorozoglou, Drama (GR); Christos Prevezianos, Drama (GR)

(73) Assignee: RIPD RESEARCH AND IP DEVELOPMENT LTD., Nicosia (CY)

( * ) Notice: Subject to any disclaimer, the term of this patent is extended or adjusted under 35 U.S.C. 154(b) by 0 days.

(21) Appl. No.: 17/826,560

(22) Filed: May 27, 2022

(65) Prior Publication Data
US 2022/0399714 A1     Dec. 15, 2022

Related U.S. Application Data

(63) Continuation of application No. 16/577,177, filed on Sep. 20, 2019, now Pat. No. 11,374,396, which is a
(Continued)

(51) Int. Cl.
*H02H 3/22*     (2006.01)
*H02H 9/04*     (2006.01)
(Continued)

(52) U.S. Cl.
CPC ............ *H02H 3/22* (2013.01); *H01C 7/12* (2013.01); *H02H 9/008* (2013.01); *H02H 9/041* (2013.01); *H02H 9/043* (2013.01)

(58) Field of Classification Search
CPC . H01C 7/12; H02H 3/22; H02H 9/008; H02H 9/041; H02H 9/043
See application file for complete search history.

(56) References Cited

U.S. PATENT DOCUMENTS

| | | | |
|---|---|---|---|
| 1,144,029 | A | 6/1915 | Creighton |
| 2,158,859 | A | 5/1939 | Shinichiro |

(Continued)

FOREIGN PATENT DOCUMENTS

| | | |
|---|---|---|
| CA | 2098365 A1 | 12/1993 |
| CH | 466427 A | 12/1968 |

(Continued)

OTHER PUBLICATIONS

Translation of DIN-Standards, Built-In Equipment for Electrical Installations; Overall Dimensions and Related Mounting Dimensions (15 pages) (Dec. 1988).
(Continued)

*Primary Examiner* — Jared Fureman
*Assistant Examiner* — Nicolas Bellido
(74) *Attorney, Agent, or Firm* — Myers Bigel, P.A.

(57) ABSTRACT

A circuit protection device is provided. The circuit protection device includes an active energy absorber that is coupled between two power lines in an electrical power distribution system and is configured to selectively conduct fault current responsive to overvoltage conditions. The active energy absorber includes an overvoltage protection module that includes two thyristors that are connected in anti-parallel with one another and a varistor that is connected with the overvoltage protection module as a series circuit. The series circuit including the varistor and the overvoltage protection module is connected between the power lines.

17 Claims, 32 Drawing Sheets

Related U.S. Application Data continuation of application No. 15/389,870, filed on Dec. 23, 2016, now Pat. No. 10,447,026.

(51) Int. Cl.
*H02H 9/00* (2006.01)
*H01C 7/12* (2006.01)

(56) References Cited

U.S. PATENT DOCUMENTS

| | | | |
|---|---|---|---|
| 2,311,758 A | 2/1943 | Johansson | |
| 2,971,132 A | 2/1961 | Nash | |
| 3,249,719 A | 5/1966 | Misare et al. | |
| 3,375,405 A | 3/1968 | Chiffee et al. | |
| 3,522,570 A | 8/1970 | Wanaselja | |
| 3,711,794 A | 1/1973 | Tasca et al. | |
| 3,813,577 A | 5/1974 | Kawiecke | |
| 3,863,111 A | 1/1975 | Martzloff | |
| 4,015,228 A | 3/1977 | Eda et al. | |
| 4,023,133 A | 5/1977 | Knapp | |
| 4,085,397 A | 4/1978 | Yagher, Jr. | |
| 4,092,694 A | 5/1978 | Stetson | |
| 4,217,618 A | 8/1980 | Kellenbenz et al. | |
| 4,240,124 A | 12/1980 | Westrom | |
| 4,241,374 A | 12/1980 | Gilberts | |
| 4,249,224 A | 2/1981 | Baumbach | |
| 4,288,833 A | 9/1981 | Howell | |
| 4,355,345 A | 10/1982 | Franchet | |
| 4,425,017 A | 1/1984 | Chan | |
| 4,493,003 A | 1/1985 | Mickelson et al. | |
| 4,595,635 A | 6/1986 | Dubrow et al. | |
| 4,600,261 A | 7/1986 | Debbaut | |
| 4,638,284 A | 1/1987 | Levinson | |
| 4,701,574 A | 10/1987 | Shimirak et al. | |
| 4,906,963 A | 3/1990 | Ackermann et al. | |
| 4,908,730 A | 3/1990 | Westrom | |
| 4,956,696 A | 9/1990 | Hoppe et al. | |
| 5,006,950 A | 4/1991 | Allina | |
| 5,130,884 A | 7/1992 | Allina | |
| 5,172,296 A | 12/1992 | Kaczmarek | |
| 5,311,164 A | 5/1994 | Ikeda et al. | |
| 5,436,786 A * | 7/1995 | Pelly | H02H 9/041 361/91.8 |
| 5,519,564 A | 5/1996 | Carpenter | |
| 5,523,916 A | 6/1996 | Kaczmarek | |
| 5,529,508 A | 6/1996 | Chiotis et al. | |
| 5,588,856 A | 12/1996 | Collins et al. | |
| 5,608,596 A | 3/1997 | Smith et al. | |
| 5,621,599 A | 4/1997 | Larsen et al. | |
| 5,652,690 A | 7/1997 | Mansfield et al. | |
| 5,721,664 A | 2/1998 | Uken et al. | |
| 5,724,221 A | 3/1998 | Law | |
| 5,781,394 A | 7/1998 | Lorenz et al. | |
| 5,808,850 A | 9/1998 | Carpenter | |
| 5,936,824 A | 8/1999 | Carpenter | |
| 5,982,597 A | 11/1999 | Webb | |
| 6,038,119 A | 3/2000 | Atkins et al. | |
| 6,094,128 A | 7/2000 | Bennett et al. | |
| 6,172,865 B1 | 1/2001 | Boy et al. | |
| 6,175,480 B1 | 1/2001 | Karmazyn | |
| 6,222,433 B1 | 4/2001 | Ramakrishnan et al. | |
| 6,226,162 B1 * | 5/2001 | Kladar | H02H 9/041 361/111 |
| 6,226,166 B1 | 5/2001 | Gumley et al. | |
| 6,430,019 B1 | 8/2002 | Martenson et al. | |
| 6,430,020 B1 | 8/2002 | Atkins et al. | |
| 6,459,559 B1 | 10/2002 | Christofersen | |
| 6,556,402 B2 | 4/2003 | Kizis et al. | |
| 6,614,640 B2 | 9/2003 | Richter et al. | |
| 6,930,871 B2 | 8/2005 | Macanda | |
| 7,433,169 B2 | 10/2008 | Kamel et al. | |
| 7,558,041 B2 | 7/2009 | Lagnoux | |
| 7,684,166 B2 | 3/2010 | Donati et al. | |
| 7,738,231 B2 | 6/2010 | Lagnoux | |
| 8,659,866 B2 | 2/2014 | Douglass et al. | |
| 8,743,525 B2 | 6/2014 | Xepapas et al. | |
| 8,766,762 B2 | 7/2014 | Depping et al. | |
| 9,349,548 B2 | 5/2016 | Juricev | |
| 9,634,554 B2 | 4/2017 | Falk et al. | |
| 9,750,122 B1 | 8/2017 | Elizondo-Decanini | |
| 9,906,017 B2 | 2/2018 | Tsovilis et al. | |
| 10,050,436 B2 | 8/2018 | Buchanan | |
| 10,447,026 B2 | 10/2019 | Kostakis et al. | |
| 10,707,678 B2 | 7/2020 | Tavcar et al. | |
| 11,527,879 B2 * | 12/2022 | Politis | H02H 9/02 |
| 2002/0018331 A1 | 2/2002 | Takahashi | |
| 2002/0159212 A1 | 10/2002 | Oughton | |
| 2003/0184926 A1 | 10/2003 | Wu et al. | |
| 2004/0150937 A1 | 8/2004 | Bobert et al. | |
| 2004/0257742 A1 | 12/2004 | Zeller et al. | |
| 2005/0231872 A1 | 10/2005 | Schimanski et al. | |
| 2006/0291127 A1 | 12/2006 | Kim et al. | |
| 2007/0217106 A1 | 9/2007 | Lagnoux | |
| 2008/0043395 A1 | 2/2008 | Donati et al. | |
| 2008/0049370 A1 | 2/2008 | Adachi et al. | |
| 2011/0193674 A1 | 8/2011 | Zaeuner et al. | |
| 2011/0248816 A1 | 10/2011 | Duval et al. | |
| 2012/0050935 A1 | 3/2012 | Douglass et al. | |
| 2012/0086539 A1 | 4/2012 | Duval et al. | |
| 2012/0250205 A1 | 10/2012 | Pfitzer et al. | |
| 2013/0038976 A1 | 2/2013 | Hagerty | |
| 2013/0200986 A1 | 8/2013 | Koprivsek | |
| 2013/0265685 A1 | 10/2013 | Zauner et al. | |
| 2013/0335869 A1 | 12/2013 | Xepapas et al. | |
| 2014/0010704 A1 | 1/2014 | Ishida et al. | |
| 2014/0092514 A1 | 4/2014 | Chen | |
| 2014/0327990 A1 | 11/2014 | Juricev | |
| 2015/0103462 A1 | 4/2015 | Depping | |
| 2015/0107972 A1 | 4/2015 | Oh | |
| 2015/0270086 A1 | 9/2015 | Chen | |
| 2015/0280420 A1 | 10/2015 | Mao | |
| 2015/0349523 A1 | 12/2015 | Tsovilis et al. | |
| 2016/0087520 A1 | 3/2016 | Falk et al. | |
| 2016/0276821 A1 | 9/2016 | Politis et al. | |
| 2016/0329701 A1 | 11/2016 | Bandel | |
| 2017/0311462 A1 | 10/2017 | Kamensek et al. | |
| 2018/0138698 A1 | 5/2018 | Tsovilis et al. | |
| 2018/0151318 A1 | 5/2018 | Kamensek et al. | |
| 2018/0183230 A1 | 6/2018 | Kostakis et al. | |
| 2018/0183232 A1 | 6/2018 | Tavcar et al. | |
| 2018/0330908 A1 | 11/2018 | Vrhunc et al. | |
| 2019/0080826 A1 | 3/2019 | Kamensek et al. | |

FOREIGN PATENT DOCUMENTS

| | | |
|---|---|---|
| DE | 3428258 A1 | 2/1986 |
| DE | 4235329 A1 | 4/1994 |
| DE | 4438593 A1 | 5/1996 |
| DE | 19823446 A1 | 11/1999 |
| DE | 19839422 A1 | 3/2000 |
| DE | 19843519 A1 | 4/2000 |
| DE | 202004006227 U1 | 9/2004 |
| DE | 10323220 A1 | 12/2004 |
| DE | 102006003274 A1 | 7/2007 |
| DE | 202008004699 U1 | 6/2008 |
| DE | 102007014336 A1 | 10/2008 |
| DE | 102008017423 A1 | 10/2009 |
| DE | 102008026555 A1 | 12/2009 |
| DE | 102009004704 A1 | 3/2010 |
| DE | 102012004678 A1 | 9/2013 |
| DE | 202006021210 U1 | 9/2013 |
| DE | 102013103753 A1 | 10/2013 |
| DE | 102013011216 B3 | 10/2014 |
| DE | 102013107807 B3 | 1/2015 |
| DE | 102013021936 B3 | 2/2015 |
| DE | 102014016938 B3 | 2/2016 |
| DE | 102014016830 A1 | 3/2016 |
| EP | 0108518 A2 | 5/1984 |
| EP | 0203737 A2 | 12/1986 |
| EP | 0335479 A2 | 10/1989 |
| EP | 0462694 A2 * | 4/1991 |
| EP | 0445054 A1 | 9/1991 |
| EP | 0462694 A2 | 12/1991 |
| EP | 0516416 A1 | 12/1992 |

(56) References Cited

FOREIGN PATENT DOCUMENTS

| | | | |
|---|---|---|---|
| EP | 0603428 A1 | 6/1994 | |
| EP | 0785625 A2 | 7/1997 | |
| EP | 0963590 A1 | 12/1999 | |
| EP | 1094550 A2 | 4/2001 | |
| EP | 1102371 A1 | 5/2001 | |
| EP | 1116246 A1 | 7/2001 | |
| EP | 1355327 A2 | 10/2003 | |
| EP | 1458072 A1 | 9/2004 | |
| EP | 1798742 A1 | 6/2007 | |
| EP | 1855365 A1 * | 11/2007 | ............. G05F 1/571 |
| EP | 2075811 A2 | 7/2009 | |
| EP | 2707892 A1 | 3/2014 | |
| EP | 2725588 A1 | 4/2014 | |
| EP | 3001525 A1 | 3/2016 | |
| EP | 3240132 A1 | 11/2017 | |
| FR | 2574589 A1 | 6/1986 | |
| FR | 2622047 A1 | 4/1989 | |
| FR | 2897231 A1 | 8/2007 | |
| JP | S60187002 A | 9/1985 | |
| JP | S60226103 A | 11/1985 | |
| JP | S60258905 A | 12/1985 | |
| JP | S61198701 A | 9/1986 | |
| JP | H01176687 A | 7/1989 | |
| JP | H05176445 A | 7/1993 | |
| JP | H09326546 A | 12/1997 | |
| JP | 2002525861 A | 8/2002 | |
| JP | 2002525862 A | 8/2002 | |
| JP | 5493065 B2 | 3/2014 | |
| SI | 9700277 A | 4/1999 | |
| SI | 9700332 A | 6/1999 | |
| SI | 20781 A | 6/2002 | |
| SI | 20782 A | 6/2002 | |
| SI | 22030 A | 10/2006 | |
| SI | 23303 A | 8/2011 | |
| SI | 23749 A | 11/2012 | |
| SI | 24371 A | 11/2014 | |
| WO | 8800603 A2 | 1/1988 | |
| WO | 9005401 A1 | 5/1990 | |
| WO | 9515600 A1 | 6/1995 | |
| WO | 9524756 A1 | 9/1995 | |
| WO | 9742693 A1 | 11/1997 | |
| WO | 9838653 A1 | 9/1998 | |
| WO | 0017892 A1 | 3/2000 | |
| WO | 2007117163 A1 | 10/2007 | |
| WO | 2008009507 A1 | 1/2008 | |
| WO | 2008104824 A1 | 9/2008 | |
| WO | 2011102811 A2 | 8/2011 | |
| WO | 2012026888 A1 | 3/2012 | |
| WO | 2012154134 A1 | 11/2012 | |
| WO | 2012044961 A1 | 4/2013 | |
| WO | 2016101776 A1 | 6/2016 | |
| WO | 2016110360 A1 | 7/2016 | |

OTHER PUBLICATIONS

European Examination Report corresponding to EP17157435.3, dated Jun. 10, 2021, (4 pages).
Extended European Search Report corresponding to European Application No. 17157435.3, dated Sep. 28, 2017.
"General Technical Information", Data Book Library 1997 Passive Components, Siemens Matsushita Components, (pp. 15-17, 26-32, 36-37, 39, 161, 166, 167, 169, 171-174).
Beitz, W., et al., "Chapter 1: Mechanical Design Elements—Component Connections", in Dubbel Taschenbuch für den Maschinenbau, Springer, Germany, 1997, G24-G25.
ITW Formex, "Flame Retardant Polypropylene Sheet", FormexTM GK/Formex Product Data, 2002, (4 pages).
Oberg, Erik, et al., "Soldering and Brazing", in Machinery's Handbook 27th Edition (eds. McCauley, Heald, and Hussain); Industrial Press, Inc., New York, 2004, 1380-1382.
Phoenix Contact GMBH & Co. KG, "VAL-MS-T1/T2 335/12.5/ 3+1", Extract from the online catalog (May 22, 2014); Retrieved from: http://catalog.phoenixcontact.net/phoenix/treeViewClick.do? UID=2800184, (7 pages).
Raycap, "RayvossTM Transient Voltage Surge Suppression System", webpage, http://www.raycap.com/surge/rayvoss.htm accessed on Nov. 29, 2005 (Date Unknown; Admitted Prior Art), (1 page).
Raycap, "Revolutionary Lightning Protection Technology", Raycap Corporation Press Release, webpage, http://www.raycap.com/news/ 020930.htm accessed on Nov. 29, 2005 (Date Unknown; Admitted Prior Art), (1 page).
Raycap, "Strikesorb® 30 Series OEM Surge Suppression Solutions", brochure, Apr. 17, 2009, (2 pages).
Raycap, "The Next Generation Surge Protection Rayvoss™", brochure, May 4, 2012, (4 pages).
Raycap, "The Ultimate Overvoltage Protection Rayvoss™", brochure, 2005, (4 pages).
Raycap, "The Ultimate Overvoltage Protection Rayvoss™", brochure, Jan. 2009, (4 pages).
Raycap, "The Ultimate Overvoltage Protection: RayvossTM", brochure (Date Unknown; Admitted Prior Art), (4 pages).
RayvossTM, "Applications", webpage http://www.rayvoss.com/ applications.htm accessed on Nov. 29, 2005 (Date Unknown; Admitted Prior Art), (4 pages).
RayvossTM, "Frequently Asked Questions", webpage, http://www. rayvoss.com/faq.htm accessed on Nov. 29, 2005 (Date Unknown; Admitted Prior Art), (2 pages).
RayvossTM, "Technical Information", webpage, http://www.rayvoss. com/tech_info.htm accessed on Nov. 29, 2005 (Date Unknown; Admitted Prior Art), (3 pages).
RayvossTM, "The Ultimate Overvoltage Protection", webpage, http://www.rayvoss.com accessed on Nov. 29, 2005 (Date Unknown; Admitted Prior Art), (2 pages).

* cited by examiner

DEVICES FOR ACTIVE OVERVOLTAGE PROTECTION INCLUDING VARISTORS AND THYRISTORS

RELATED APPLICATIONS

The present application is a continuation of U.S. patent application Ser. No. 16/577,177, filed Sep. 20, 2019, which is a continuation of U.S. patent application Ser. No. 15/389,870, now U.S. Pat. No. 10,447,026, filed Dec. 23, 2016, the disclosures of which are incorporated herein by reference.

FIELD OF THE INVENTION

The present invention relates to circuit protection devices and, more particularly, to overvoltage protection devices and methods.

BACKGROUND

Frequently, excessive voltage or current is applied across service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges and resulting down time may be very costly.

Typically, sensitive electronic equipment may be protected against transient overvoltages and surge currents using Surge Protective Devices (SPDs). For example, brief reference is made to FIG. 1, which is a system including conventional overvoltage and surge protection. An overvoltage protection device 10 may be installed at a power input of equipment to be protected 50, which is typically protected against overcurrents when it fails. Typical failure mode of an SPD is a short circuit. The overcurrent protection typically employed is a combination of an internal thermal disconnector to protect the device from overheating due to increased leakage currents and an external fuse to protect the device from higher fault currents. Different SPD technologies may avoid the use of the internal thermal disconnector because, in the event of failure, they change their operation mode to a low ohmic resistance. In this manner, the device can withstand significant short circuit currents. In this regard, there may be no operational need for an internal thermal disconnector. Further to the above, some embodiments that exhibit even higher short circuit withstand capabilities may also be protected only by the main circuit breaker of the installation without the need for a dedicated branch fuse.

Brief reference is now made to FIG. 2, which is a block diagram of a system including conventional surge protection. As illustrated, a three phase line may be connected to and supply electrical energy to one or more transformers 66, which may in turn supply three phase electrical power to a main circuit breaker 68. The three phase electrical power may be provided to one or more distribution panels 62. As illustrated, the three voltage lines of the three phase electrical power may designated as L1, L2 and L3 and a neutral line may be designated as N. In some embodiments, the neutral line N may be conductively coupled to an earth ground.

Some embodiments include surge protective devices (SPDs) 104. As illustrated, each of the SPDs 104 may be connected between respective ones of L1, L2 and L3, and neutral (N). The SPD 104 may protect other equipment in the installation such as the distribution panel among others. In addition, the SPDs may be used to protect all equipment in case of prolonged overvoltages. However, such a condition may force the SPD to conduct a limited current for a prolonged period of time, which may result in the overheating of the SPD and possibly its failure (depending on the energy withstand capabilities the SPD can absorb and the level and duration of the overvoltage condition). A typical operating voltage of an SPD 104 in the present example may be about 400V (for 690V L-L systems). In this regard, the SPDs 104 will each perform as an insulator and thus not conduct current during normal operating conditions. In some embodiments, the operating voltage of the SPD's 104 is sufficiently higher than the normal line-to-neutral voltage to ensure that the SPD 104 will continue to perform as an insulator even in cases in which the system voltage increases due to overvoltage conditions that might arise as a result of a loss of neutral or other power system issues.

In the event of a surge current in, for example, L1, protection of power system load devices may necessitate providing a current path to ground for the excess current of the surge current. The surge current may generate a transient overvoltage between L1 and N. Since the transient overvoltage significantly exceeds that operating voltage of SPD 104, the SPD 104 will become conductive, allowing the excess current to flow from L1 through SPD 104 to the neutral N. Once the surge current has been conducted to N, the overvoltage condition ends and the SPD 104 may become non-conducting again. However, in some cases, one or more SPD's 104 may begin to allow a leakage current to be conducted even at voltages that are lower that the operating voltage of the SPD's 104. Such conditions may occur in the case of an SPD deteriorating.

As provided above, devices for protecting equipment from excess voltage or current spikes (transient overvoltages and surge currents) may include products such as energy absorbers that may be based on varistors including, for example, metal oxide varistors (MOVs) and/or silicon carbide varistors and may not have a safe end of life mode of operation. Additionally, such devices may not provide protection at a voltage level close to the operating voltage of the device. Further, surge protective device designs may not protect at voltage levels close to the nominal system voltage and may not be designed to absorb as much energy as energy absorbers. Combinations of varistors and thyristors may not have a safe failure mode and may not protect against surge currents and transient overvoltages in the absence of an external SPD. Therefore, surge protection products that provide low voltage protection level and protection against temporary overvoltages (TOVs) implemented in a fail-safe design are desirable.

SUMMARY

Some embodiments of the present invention are directed to a circuit protection device comprising an active energy absorber that is coupled between two of multiple phase lines and/or a neutral line in an electrical power distribution system and that is configured to selectively conduct fault current responsive to overvoltage conditions.

In some embodiments, the active energy absorber comprises an overvoltage protection module that comprises two thyristors that are connected in anti-parallel with one another and a metal oxide varistor (MOV) that is connected with the overvoltage protection module as a series circuit. Some embodiments provide that the series circuit including the MOV and the overvoltage protection module is connected between any two of the phase lines and/or the neutral line.

Some embodiments provide that the active energy absorber further includes an inductor that is connected in series with the series circuit including the MOV and the overvoltage protection module. In some embodiments, the MOV includes multiple MOVs that are connected in parallel with one another.

Some embodiments include a surge protective device that is connected between the any two phase lines and/or the neutral line and that is configured to protect equipment that is connected thereto during an overvoltage condition by conducting a limited amount of current that corresponds to the overvoltage condition.

Some embodiments include a trigger circuit that is connected to the any two phase lines and/or the neutral line and to the overvoltage protection module and that is configured to provide control signals to the overvoltage protection module responsive to detecting a temporary overvoltage condition across the any two phase lines and/or the neutral line. In some embodiments, the trigger circuit includes a comparison circuit that is configured to receive a voltage level signal and a voltage reference signal and to output an overvoltage trigger signal responsive to the voltage level signal exceeding the voltage reference signal and a gate trigger circuit that is configured to generate a gate trigger signal responsive to the overvoltage trigger signal that is received by the overvoltage protection module and that causes the overvoltage protection module to conduct current corresponding to the temporary overvoltage condition.

Some embodiments provide that the trigger circuit further includes an optical isolation circuit that is connected between the comparison circuit and the gate trigger circuit and that is configured to provide electrical isolation between the comparison circuit and the gate trigger circuit.

Some embodiments include a surge protective device that is connected between the any two phase lines and/or the neutral line.

In some embodiments, the active energy absorber further includes a snubber circuit that is connected in parallel with the overvoltage protection module. The snubber circuit may include a resistor and a capacitor that are connected in series with one another.

In some embodiments, the active energy absorber includes a surge protective device that is connected between the any two phase lines and/or the neutral line, an overvoltage protection module that includes two thyristors that are connected in anti-parallel with one another, a varistor that is connected with the overvoltage protection module as a series circuit that is connected between any two of the phase lines and/or the neutral line, an inductor that is connected in between the varistor and the surge protective device, and a trigger circuit that is connected to the any two phase lines and/or the neutral line and to the two thyristors and that is configured to provide control signals to the two thyristors responsive to detecting an overvoltage condition across the any two of the plurality of phase lines and the neutral line.

Some embodiments of the present invention are directed to methods of providing power circuit protection. Such methods may include sensing, using a trigger circuit, an overvoltage condition on a power line and switching an overvoltage protection device into a conducting mode that is configured to clamp the voltage to a voltage limit corresponding to an operating voltage of the power circuit.

Some embodiments include, after switching the overvoltage protection device into the conducting mode, sensing that the overvoltage condition on the power line is not present, and switching the overvoltage protection device into a non-conducting mode.

In some embodiments, the power circuit is an alternating current (AC) power circuit and the sensing the overvoltage condition may correspond to a first portion of a voltage waveform. After switching the overvoltage protection into a non-conducting mode, the method may further include sensing, using the trigger circuit, another overvoltage condition corresponding to a second portion of the voltage waveform. The overvoltage protection device may be switched into a conducting mode that is configured to clamp the voltage to a second portion voltage waveform voltage limit.

In some embodiments, switching the overvoltage protection device during the first portion of the voltage waveform includes switching a first thyristor and switching the overvoltage protection device during the second portion of the voltage waveform includes switching a second thyristor that is connected in anti-parallel with the first thyristor.

Some embodiments of the present invention are directed to a circuit protection device that includes a first thyristor, a first varistor, a second thyristor, and a second varistor. The first thyristor includes a first anode that is connected to a first power line, a first cathode and a first gate. The first varistor is connected to the first anode. The second thyristor includes a second anode that is connected to a second power line, and a second cathode that is connected to the first cathode and a second gate. The second varistor is connected to the second anode and to the first varistor.

In some embodiments, the first varistor is connected to the first cathode, and the second thyristor is connected to the second cathode.

Some embodiments may include a trigger circuit that is connected to the first and second power lines and to the first gate and the second gate, wherein the trigger circuit is configured to provide control signals to the first thyristor and/or the second thyristor responsive to detecting a temporary overvoltage condition across the first and second power lines.

In some embodiments, the device further includes an inductor that is connected to either the first anode or the second anode.

In some embodiments, the first varistor includes a plurality of first varistors that are connected in parallel with one another, and the second varistor comprises a plurality of second varistors that are connected in parallel with one another.

In some embodiments, the first and second power lines include any two of a plurality of phase lines and a neutral line.

In some embodiments, the device further includes an inductor that includes a first is connected between a junction of the first and second varistors and a junction of the first cathode and the second cathode.

In some embodiments, the device further includes a trigger circuit that is connected to the first and second power lines, to the first gate and the second gate, and to the junction of the first cathode and the second cathode, wherein the trigger circuit is configured to provide control signals to the first thyristor and/or the second thyristor responsive to detecting a temporary overvoltage condition across the first and second power lines.

In some embodiments, an active energy absorber module includes first and second electrical terminals, a module housing, first and second thyristors, and a varistor. The first and second thyristors are enclosed within the module housing and are electrically connected between the first and second electrical terminals. The varistor is enclosed within the module housing and is electrically connected to at least one of the first and second thyristors between the first and second electrical terminals.

In some embodiments, the varistor is connected in electrical series with each of the first and second thyristors.

In some embodiments, the first and second thyristors are connected in anti-parallel between the first and second electrical terminals.

In some embodiments, the active energy absorber module further includes a second varistor enclosed within the module housing, the first thyristor includes a first anode and a first cathode, the second thyristor includes a second anode and a second cathode, the first varistor is electrically connected to the first anode and the first cathode, and the second varistor is electrically connected to the second anode and the second cathode.

In some embodiments, the active energy absorber module further includes an inductor connected between a junction of the first and second varistors and a junction of the first cathode and the second cathode.

In some embodiments, the active energy absorber includes a plurality of varistors enclosed within the module housing and connected in electrical parallel with one another between the first and second electrical terminals.

In some embodiments, the active energy absorber includes a trigger circuit enclosed within the module housing and electrically connected to each of the first and second thyristors.

In some embodiments, the active energy absorber includes a wire port defined in the module housing, and at least one electrical wire extending through the wire port and electrically connecting the first and second thyristors to a trigger circuit external to the module housing.

According to some embodiments, the active energy absorber includes an inductor coil enclosed within the module housing and connected in series with the first and second thyristors between the first and second electrical terminals.

In some embodiments, the inductor coil includes a spirally extending coil strip defining a spiral coil channel, and an electrically insulating casing including a separator wall portion that fills the coil channel.

In some embodiments, the active energy absorber includes an electrically conductive meltable member enclosed within the module housing. The meltable member is responsive to heat in the active energy absorber to melt and form an electrical short circuit path across the first and second electrical terminals.

According to some embodiments, the module housing includes first and second electrodes, and the varistor and the first and second thyristors are axially stacked between the first and second electrodes.

In some embodiments, the first electrode includes a housing electrode including an end wall and an integral sidewall collectively defining a cavity, and the second electrode extends into the cavity.

In some embodiments, the varistor and the first and second thyristors are disposed in the cavity.

In some embodiments, the housing electrode is unitarily formed of metal.

In some embodiments, the active energy absorber includes a biasing device applying an axially compressive load to the varistor and the first and second thyristors.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DRAWING DESCRIPTION

The accompanying figures are included to provide a further understanding of the present invention, and are incorporated in and constitute a part of this specification. The drawings illustrate some embodiments of the present invention and, together with the description, serve to explain principles of the present invention.

DETAILED DESCRIPTION OF EMBODIMENTS OF THE INVENTION

Figure 1:
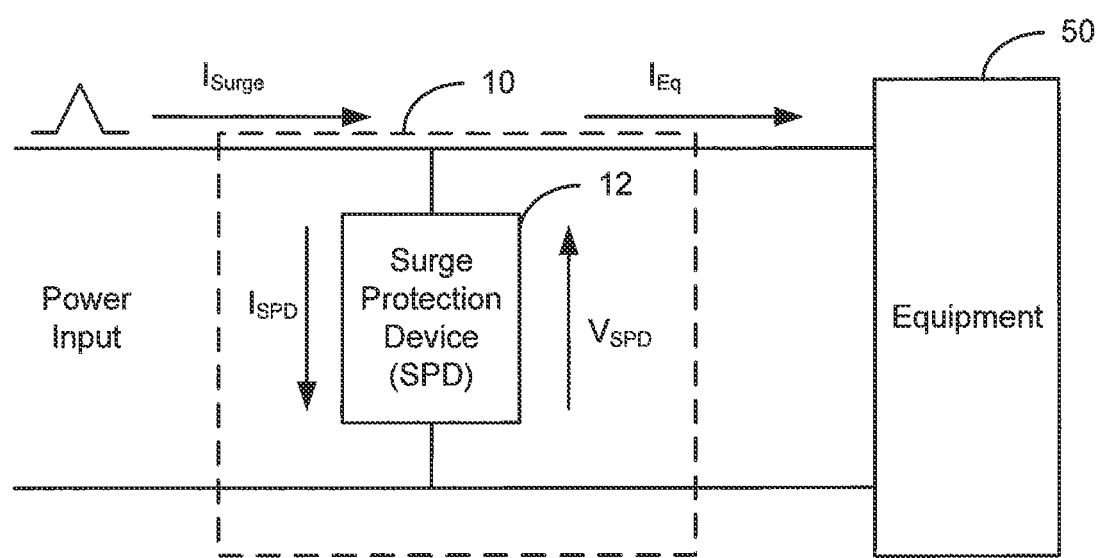
FIG. 1 is a block diagram of a system including conventional surge protection.
Figure 2:
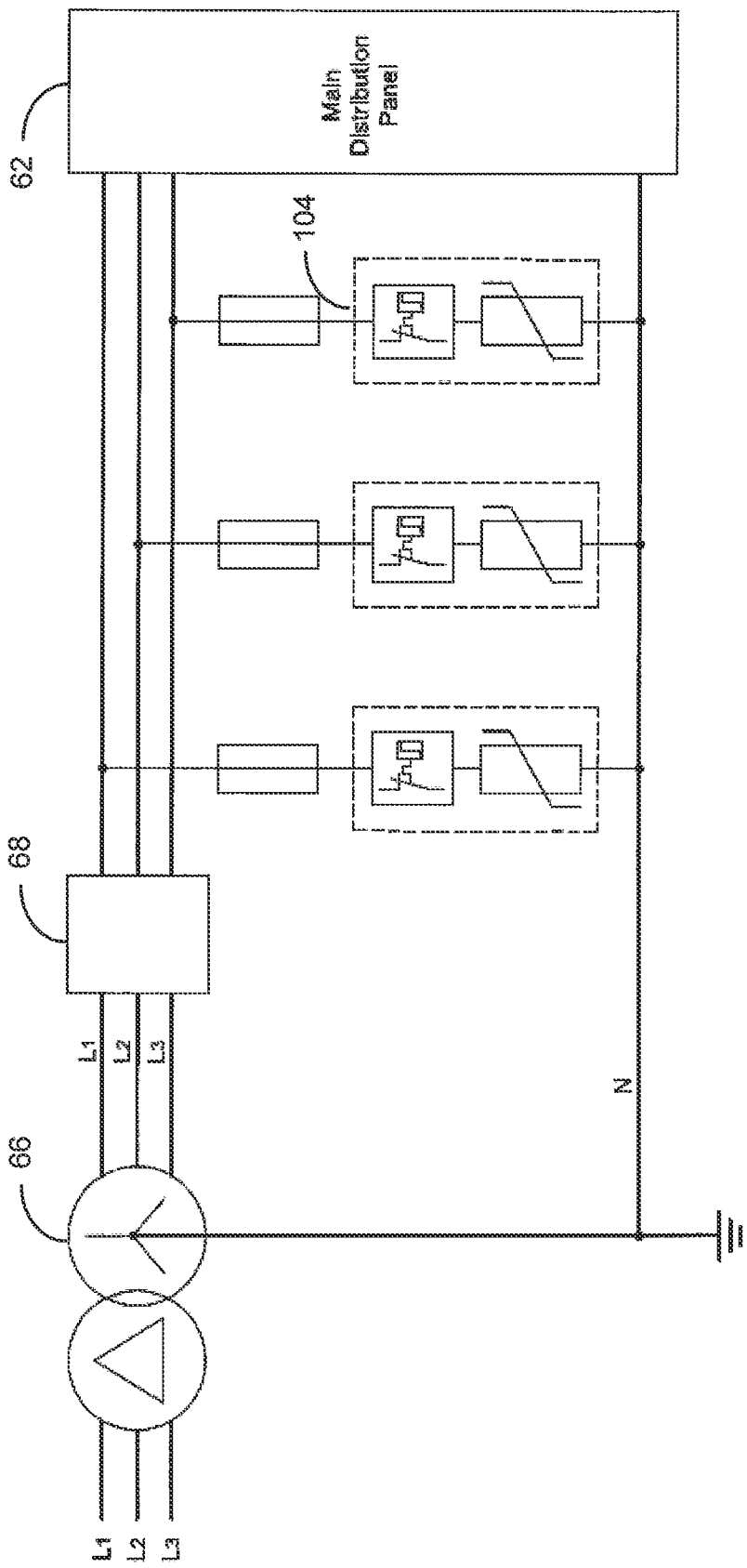
FIG. 2 is a block diagram of a system including conventional surge protection.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

To date, types of circuits for providing protection against transient overvoltages, temporary overvoltages and surge/lightning current may include varistors that may be directly connected directly between the power lines. The difference between a standard varistor used for the protection against transient overvoltages and surge currents and a varistor used for the protection against temporary overvoltages, may be that the second type may be in a conducting mode for a long period of time (in the range of 100 to 300 ms or even more) for a current that may range between a few Amperes and several thousand Amperes, while the first type may be in a conducting mode for a very limited period of time (in the range of few μs to up to 5 ms) for a current that may range between a few hundred Amperes and over 100 kA.

Therefore, when the varistors are used for the protection against temporary overvoltages they may conduct a significant current from the power source in an effort to clamp the overvoltage that is generated by the power source. As such, they may be required to absorb significant amounts of energy for a long duration. Additionally, when such varistors fail, the failure mode may be a low impedance (i.e., short circuit) failure mode at the end of the device life.

Figure 3:
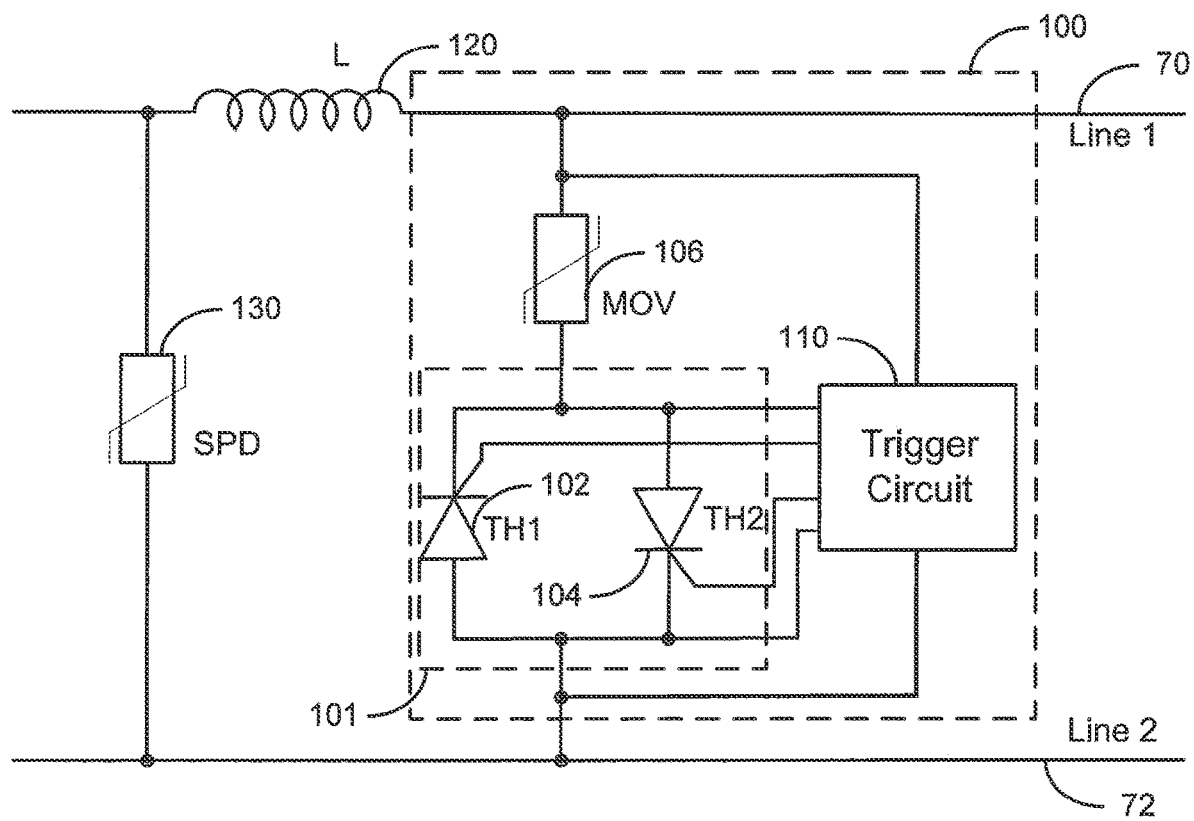
FIG. 3 is a schematic block diagram illustrating a device for active overvoltage protection according to some embodiments of the present invention.

Reference is now made to FIG. 3, which is a schematic block diagram illustrating a device for active overvoltage protection according to some embodiments of the present invention. An active energy absorber 100 may be connected between power lines 70, 72 in an electrical distribution system and/or component. The power lines 70, 72 may include power lines and/or a neutral line in a single phase power system or phase lines and/or a neutral line in a multiple phase system (e.g., three phase power system). Thus, the active energy absorber 100 may be connected between two phase or power lines and/or between a phase or power line and a neutral line. The active energy absorber 100 may provide protection against temporary overvoltages with high energy absorption withstand capabilities and a safe end of life operation.

Some embodiments provide that an active energy absorber 100 may selectively conduct fault current responsive to overvoltage conditions. For example, some embodiments provide that when the active energy absorber 100 is in a conducting mode, that the overvoltage condition may be clamped to a specific voltage by absorbing energy corresponding to the overvoltage fault condition that exceeds the clamped voltage. Some embodiments are directed to providing protection for temporary power system sourced overvoltage conditions that may be sustained for longer periods than transient and/or surge voltages. In use and operation, some embodiments provide that the temporary overvoltages may be clamped to a voltage that is about and/or less than about two times the system operating voltage. For example, in a 220 Volt system, embodiments may set a threshold voltage at about 450 Volts.

In some embodiments, the active energy absorber 100 includes an overvoltage protection module 101 that includes two thyristors 102, 104 that are connected in anti-parallel with one another. The thyristors 102, 104 of the overvoltage protection module 101 may be connected in series with a varistor 106. The series circuit including the varistor 106 and the overvoltage protection module 101 may be connected between any two of the power lines and the neutral line 70, 72.

Some embodiments provide that the active energy absorber 100 includes a trigger circuit 110 that is connected to the power/neutral lines 70, 72 and to the overvoltage protection module 101. The trigger circuit 110 may be configured to provide control signals to the overvoltage protection module 101 responsive to detecting a temporary overvoltage condition across the power/neutral lines 70, 72. For example, responsive to detecting a voltage across power lines 70 and 72 that exceeds a threshold voltage, the trigger circuit 110 may generate signals to one or both of the thyristors 102, 104 to turn on (i.e., become a low resistance current conducting path). Once the thyristor 102, 104 is turned on, the varistor 106 may absorb electrical energy to clamp the voltage between the power lines 70, 72 to a clamping voltage that may correspond to the threshold voltage.

By way of example, for a 240V system, the peak voltage may be 336V. The use of a varistor 106 with a Maximum Continuous Operating Voltage (MCOV) of 250 VAC as close as possible to the nominal voltage may be used such that during normal conditions the MOV 106 will not conduct any current. Typically such an MOV may have a voltage protection level of around 1000V. During a TOV event, when the voltage rises above a predetermined threshold (e.g., 600V), then the trigger circuit will trigger one of the thyristors 102, 104, according to the AC voltage polarity. Once each one of the thyristors 102, 104 are turned on, the MOV 106 may start conducting heavily in an effort to clamp the voltage. During the TOV event, when the voltage starts dropping close to the voltage corresponding to normal operation, the MOV 106 may start becoming increasingly resistive and may start reducing the current flow. The MOV 106 may conduct a very small leakage current (e.g., about 1 mA) at 336V. Thus, when the voltage drops to values close to the operating system voltage, the current through the thyristors 102, 104 may be reduced to very low values and thus may turn off, for example, thyristors will typically be in a conduction mode only when there is a current flow through them above a certain level, such as, for example, around 200 mA.

However, there are power systems that may need protection at much lower voltage levels, for example 700V instead of 1000V. In such cases, to reduce the protection level, varistors 106 with lower MCOV, i.e. thinner varistor disks, may be used. For example, the varistor may have a MCOV of 150 VAC instead of 250 VAC.

In some embodiments, the fault current corresponding to an overvoltage condition may exceed the energy absorption capacity of a single varistor 106. In such cases, the capacity of a varistor 106 may be increased by using multiple varistors 106 that are arranged in parallel with one another. Some embodiments provide that the multiple parallel varistors 106 may be configured in a single device.

In addition, an inductance 120 may be provided in one of the lines 70, 72 to protect thyristors 102, 104 against a substantially instantaneous change in current (di/dt) in the case of surge events when the thyristors 102, 104 are self triggered during transient overvoltage events or surge currents due to the dV/dt that the thyristors 102, 104 will be exposed to. In some embodiments, this inductance 120 may also be considered as part of the power system (cable length, transformers etc.) Some embodiments provide that the inductance 120 may be added to the line 70, 72.

Some embodiments provide that the power distribution system/device is an alternating current (AC) system/device. In such embodiments, the anti-parallel thyristors 102, 104 may be alternatively activated to correspond to different portions of the voltage waveform. For example, in the event of an overvoltage condition during the positive half of the voltage waveform, the second thyristor 104 may be turned on to become conducting as long as the voltage in that half of the waveform remains above a voltage threshold. Once the voltage in that portion of the cycle drops below the threshold voltage, the varistor 106 may cease to conduct because the voltage is sufficiently low and the thyristor 104 may be turned off. If the fault condition continues into the next portion of the voltage waveform, when the negative voltage goes beyond the voltage threshold in the negative direction, the thyristor 102 may be turned on to become conducting as long as the voltage in that half of the waveform is greater than the voltage threshold in the negative direction.

Some embodiments provide that the active energy absorber 100 described above may protect against temporary overvoltages having a slow rise time of the voltage. However, the active energy absorber 100 may not provide sufficient protection during surge events and transient overvoltages. In this regard, the device for active overvoltage protection may further include a surge protective device (SPD) 130 that may connected to the power lines 70, 72 in parallel with the active energy absorber 100. The SPD 130 may be configured to protect equipment that is connected thereto during an overvoltage condition by conducting a limited amount of current that corresponds to the surge or transient overvoltage condition. Some embodiments provide that an SPD 130 may be used in circuits where there are threats of transient overvoltages and surge currents because during such events, there will be an overvoltage, as well as a high rate of rise of voltage, applied on the thyristors 102, 104 for a period of at least a few µs. This may result because the response time of the trigger circuit 110 that will trigger the thyristors 102, 104 and connect the varistor 106 to the power lines 70, 72 to clamp the overvoltage may take longer than the few µs. As such, the overvoltage that may be applied for a few μs may damage the thyristors 102, 104 if such overvoltage exceeds the maximum operating voltage of the thyristors 102, 104.

In some embodiments, the device for active overvoltage protection including an active energy absorber 100 described herein may be implemented a device using discrete components for each of the parts composing the circuit, i.e. the coil, the thyristors and the one or more varistors in parallel. Some embodiments provide that the device for active overvoltage protection including an active energy absorber described herein may be implemented as an energy absorber as described above.

Figure 4:
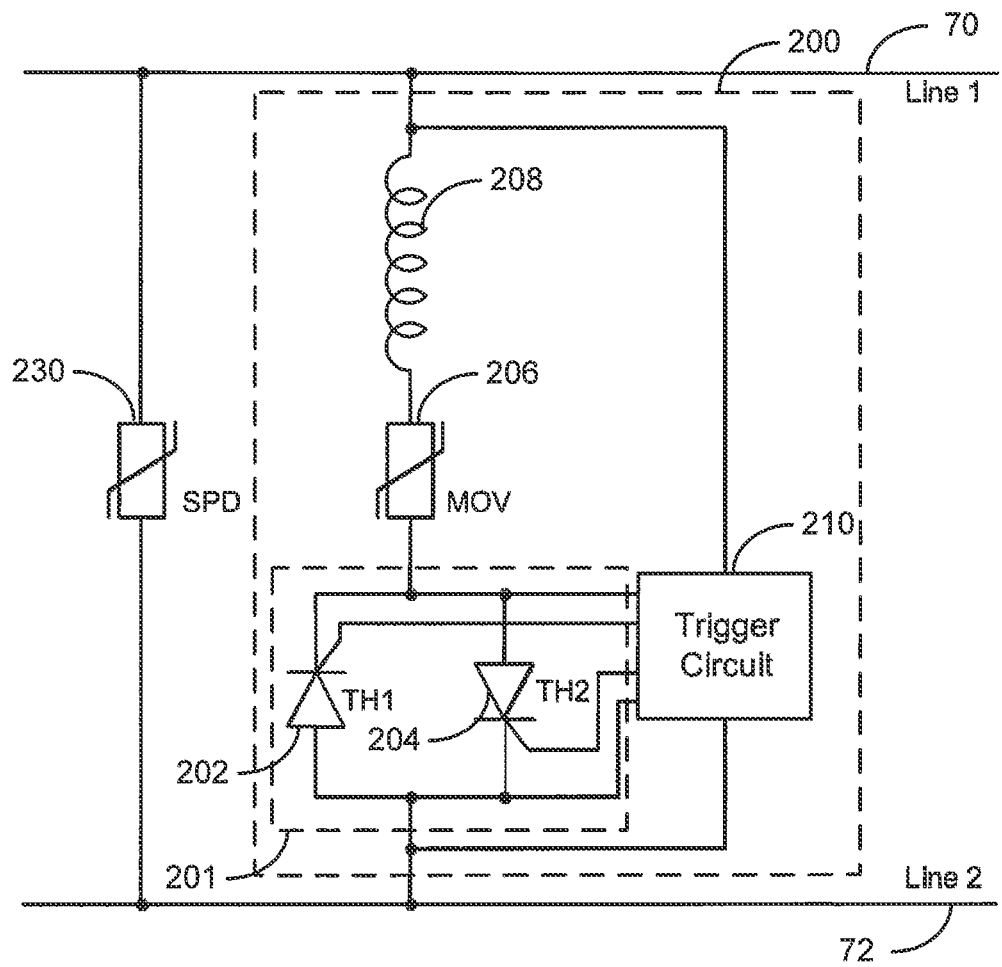
FIG. 4 is a schematic block diagram illustrating a device for active overvoltage protection according to some embodiments of the present invention.

Reference is now made to FIG. 4, which is a schematic block diagram illustrating a device for active overvoltage protection according to some embodiments of the present invention. The device for active overvoltage protection includes an SPD 230 and an active energy absorber 200 that includes a varistor 206, trigger circuit 210, overvoltage protection module 201 including thyristors 202, 204 that are similar to the SPD 130 and active energy absorber 100 that includes a varistor 106, trigger circuit 110, overvoltage protection module 101 including thyristors 102, 104 discussed above regarding FIG. 3. As such, discussion of these components will be omitted for brevity.

In contrast with FIG. 3, the device of FIG. 4 provides that the inductor 208 is a component of the active energy absorber 200. For example, the inductance 208 may be connected in series with the series circuit including the varistor 206 and the anti-parallel thyristors 202, 204 of the overvoltage protection module 201.

Figure 5:
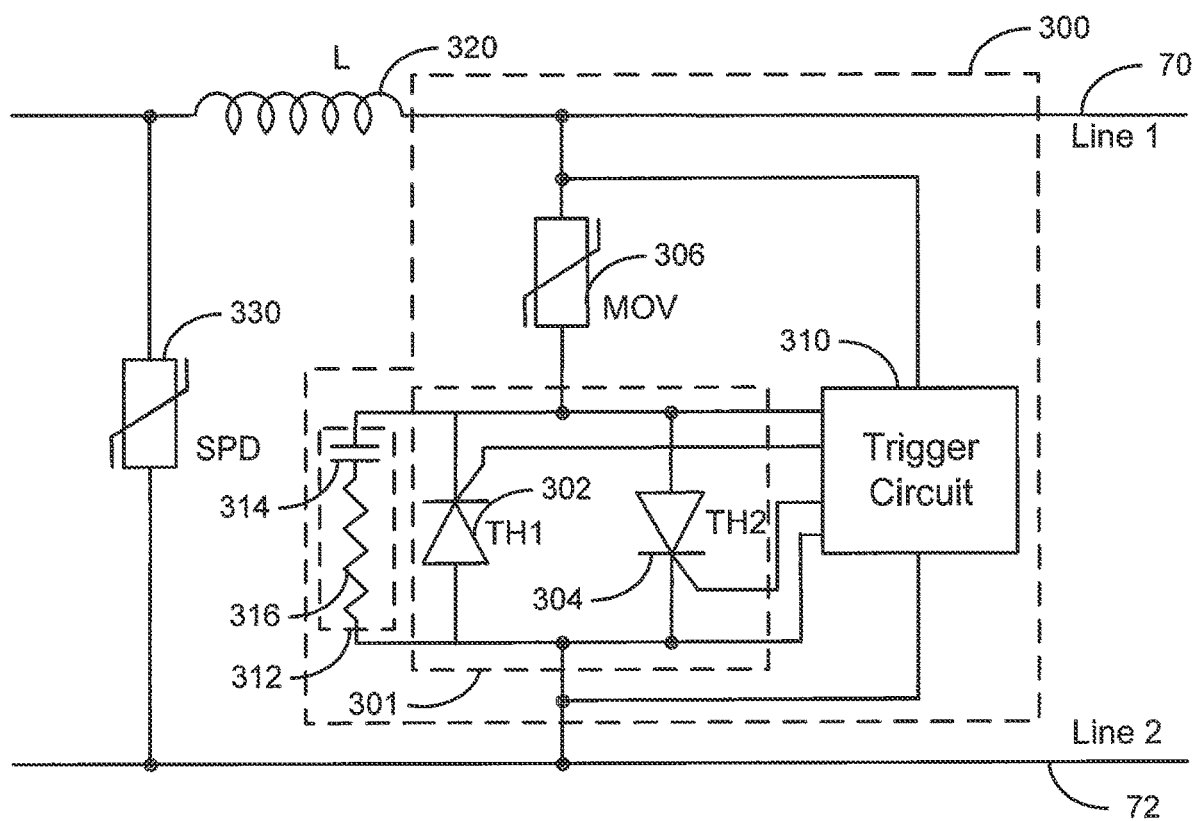
FIG. 5 is a schematic block diagram illustrating a device for active overvoltage protection according to some embodiments of the present invention.

Reference is now made to FIG. 5, which is a schematic block diagram illustrating a device for active overvoltage protection according to some embodiments of the present invention. The device for active overvoltage protection includes an SPD 330, inductance 320, and an active energy absorber 300 that includes a varistor 306, trigger circuit 310, overvoltage protection module 301 including thyristors 302, 304 that are similar to the SPD 130, inductance 120, and active energy absorber 100 that includes a varistor 106, trigger circuit 110, overvoltage protection module 101 including thyristors 102, 104 discussed above regarding FIG. 3. As such, discussion of these components will be omitted for brevity.

In some embodiments, the active energy absorber 300 may include a snubber circuit 312 that is connected in parallel with the overvoltage protection module 301. Some embodiments provide that the snubber circuit 312 includes a resistor 316 and a capacitor 314 that are connected in series with one another.

In some embodiments, the snubber circuit 312 used in parallel to the thyristors 302, 304 may reduce and/or eliminate self triggering of the thyristors 302, 304 during surge events and/or transient overvoltage events. In such cases, the thyristors 302, 304 may only be triggered by the trigger circuit 310 that is reacting to temporary overvoltage events only. In some embodiments, the inductance 320 may be omitted as the thyristors 302, 304 may not be expected to conduct surge currents.

Figure 6:
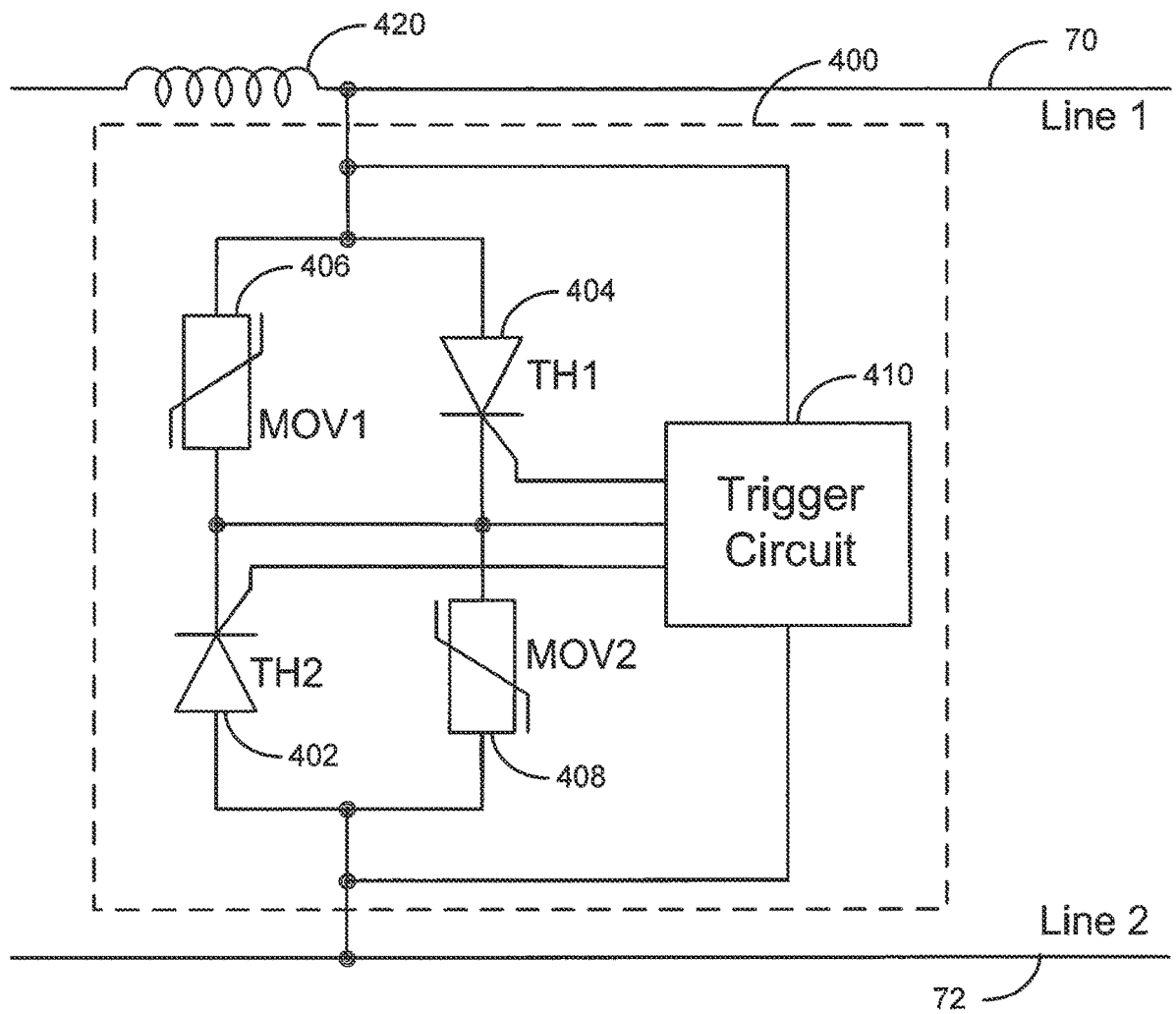
FIG. 6 is a schematic block diagram illustrating a device for active overvoltage protection according to some embodiments of the present invention.

Reference is now made to FIG. 6, which is a schematic block diagram illustrating a device for active overvoltage protection according to some embodiments of the present invention. An active energy absorber 400 may be connected between power lines 70, 72 in an electrical distribution system and/or component. The power lines 70, 72 may include power lines and/or a neutral line in a single phase power system or phase lines and/or a neutral line in a multiple phase system (e.g., three phase power system).

Thus, the active energy absorber 400 may be connected between two phase or power lines and/or between a phase or power line and a neutral line.

Some embodiments provide that an active energy absorber 400 may selectively conduct fault current responsive to overvoltage conditions. For example, some embodiments provide that when the active energy absorber 400 is in a conducting mode, that the overvoltage condition may be clamped to a specific voltage by absorbing energy corresponding to the overvoltage fault condition that exceeds the clamped voltage. Some embodiments are directed to providing protection for temporary power system sourced overvoltage conditions that may be sustained for longer periods than transient and/or surge voltages.

In some embodiments, the active energy absorber 400 includes a trigger circuit 410 that may be similar to trigger circuit 110 as discussed above regarding FIG. 3. As such, additional description thereof will be omitted.

The active energy absorber 400 may include a first thyristor 404 including a first anode that is connected to a first power line 70, a first cathode and a first gate and a varistor 406 that is connected to the anode and the cathode of the first thyristor 404. In this regard, the first thyristor 404 and the first varistor 406 may be connected in parallel with one another and each be connected to the first power line 70. The active energy absorber 400 may include a second thyristor 402 that includes a second anode that is connected to a second power line 72, a second cathode that is connected to the cathode of the first thyristor 404, and a second gate. A second varistor 408 is connected to the anode and the cathode of the second thyristor 402. In this regard, the second thyristor 402 and the second varistor 408 may be connected in parallel with one another and each be connected to the second power line 72.

In some embodiments, the electrical circuit of the active energy absorber 400 may include the SPD functionality. As such, some embodiments provide that the active energy absorber 400 may be used without an additional and/or external SPD.

Further, during surge events and transient overvoltages, the thyristors 402, 404 may be self triggered due to their internal parasitic capacitance between the gate and the anode and the gate and the cathode. According to convention, this parasitic capacitance may be made by the manufacturers to be as low as possible in order to avoid the self triggering of the thyristors 402, 404 in surge events and transient overvoltage events. However, in the current application, the parasitic capacitance may be higher, which may improve the ease of manufacture. In this regard, the device may demonstrate improved sensitivity to triggering during surge events and transient overvoltage events. As such, the voltage may not reach very high values before the thyristor 402, 404 is triggered and the voltage is clamped at the protection level of the varistor 406, 408. In this regard, the device may consistently clamp at the voltage level of a single varistor 406, 408, regardless of whether the event is a temporary overvoltage, a surge current or a transient overvoltage.

The active energy absorber 400 may not use a snubber circuit as this circuit may avoid a false trigger of the thyristor due to high dV/dt during surge events or transient overvoltages. Instead, the ability of the thyristors 402, 404 to self trigger may clamp the voltage through a single varistor.

Some embodiments provide that an inductance 420 may be optionally used to reduce the di/dt through the thyristors 402, 404 when they conduct a surge current. Some embodiments provide that the power lines 70, 72 themselves have significant inductance due to their length, the size of the cables and any transformer installed upstream to the device. However, adding inductance 420 between the power line 70 and the device may result in increasing the protection level (clamping voltage) that the equipment will experience during surge events and transient overvoltages. In this regard, if the inductance of the power system is not enough, then an additional in-line module could be added to increase the overall inductance of the power line. Some embodiments provide that since two varistors are used in the same device, the energy absorption can be shared between them during conduction.

Further, this device may provide stand-alone self-triggered operation that can be connected in a power system between two lines and provide protection against temporary overvoltage, transient overvoltage and/or surge/lightning currents.

Figure 7:
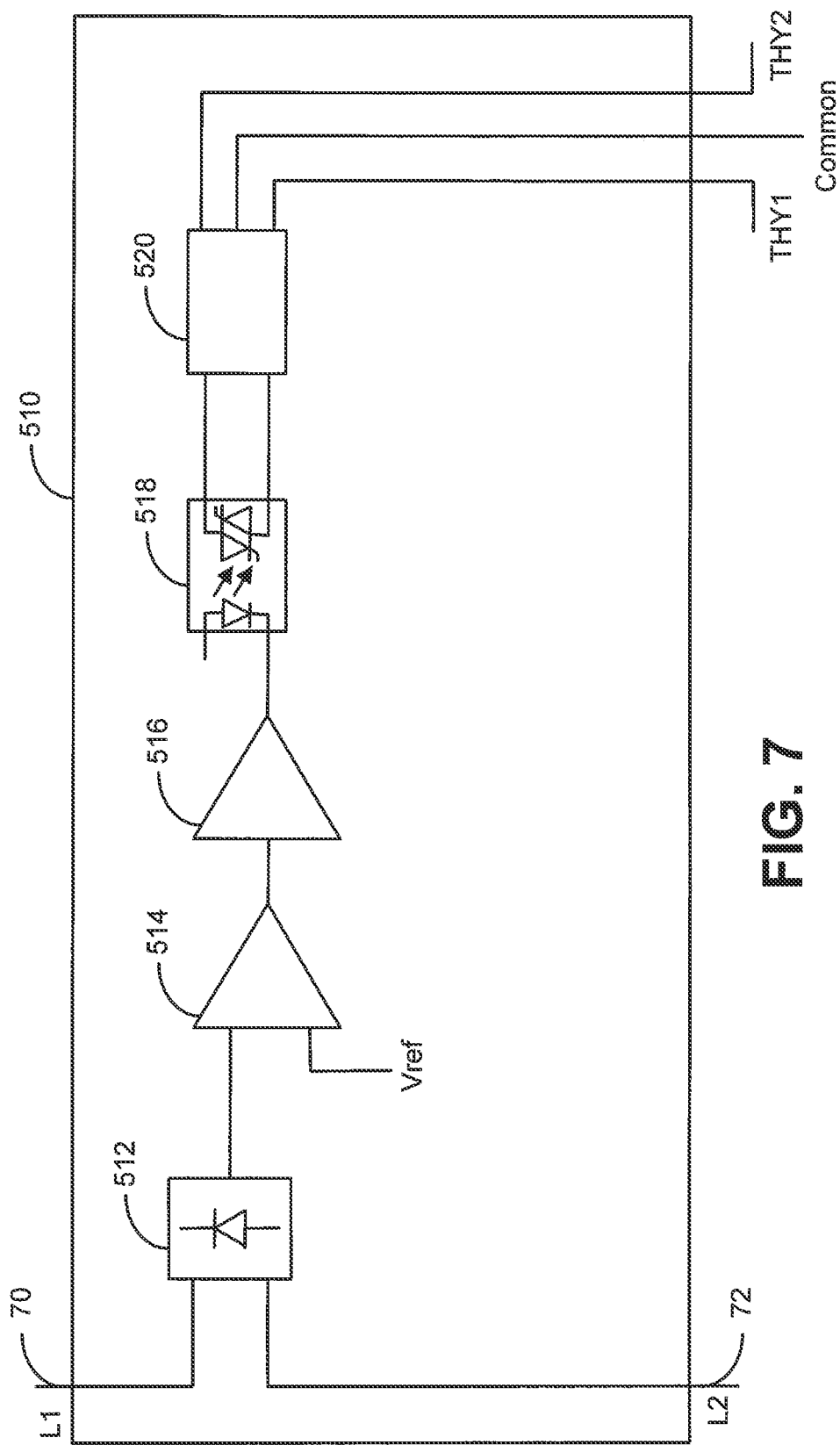
FIG. 7 is a schematic block diagram illustrating a trigger device that may be used in any of the devices described with reference to FIGS. 3-6 according to some embodiments of the present invention.

Reference is now made to FIG. 7, which is a schematic block diagram illustrating a trigger device that may be used in any of the devices described with reference to FIGS. 3-6 according to some embodiments of the present invention. The trigger device 510 may include a rectifier 512 that is configured to receive AC line voltage from the power lines 70, 72 and convert the AC line voltage to a DC output voltage that is a voltage level signal which corresponds to the AC line voltage. A comparison circuit 514 may receive the voltage level signal and a voltage reference signal Vref. The output of the comparison circuit 514 may be based on the comparison between the voltage level signal and the voltage reference signal Vref. For example, if the voltage level signal is less than Vref, then the output of the comparison circuit 514 may correspond to normal operating voltage levels on the power lines 70, 72. In contrast, if the voltage level signal is greater than Vref, then the output of the comparison circuit may change states to indicate that an overvoltage condition exists.

The output of the comparison circuit 514 may be received by one or more signal driver circuits 516 that may amplify, invert and/or stabilize the output state of the comparison circuit 514. In some embodiments, an optical isolation circuit 518 that receives an input corresponding to the output of the comparison circuit 514 may provide electrical isolation between the comparison circuit 514 and a gate trigger circuit 520 that is configured to generate one or more gate trigger signals if the output corresponding to the comparison circuit indicates an overvoltage condition on the power lines 70, 72. The gate trigger signal(s) may be received by the overvoltage protection module and may cause the overvoltage protection module to conduct current corresponding to the temporary overvoltage condition. For example, gate trigger signals may be received at each of the two thyristors in the active energy absorber embodiments disclosed herein.

Figure 8:
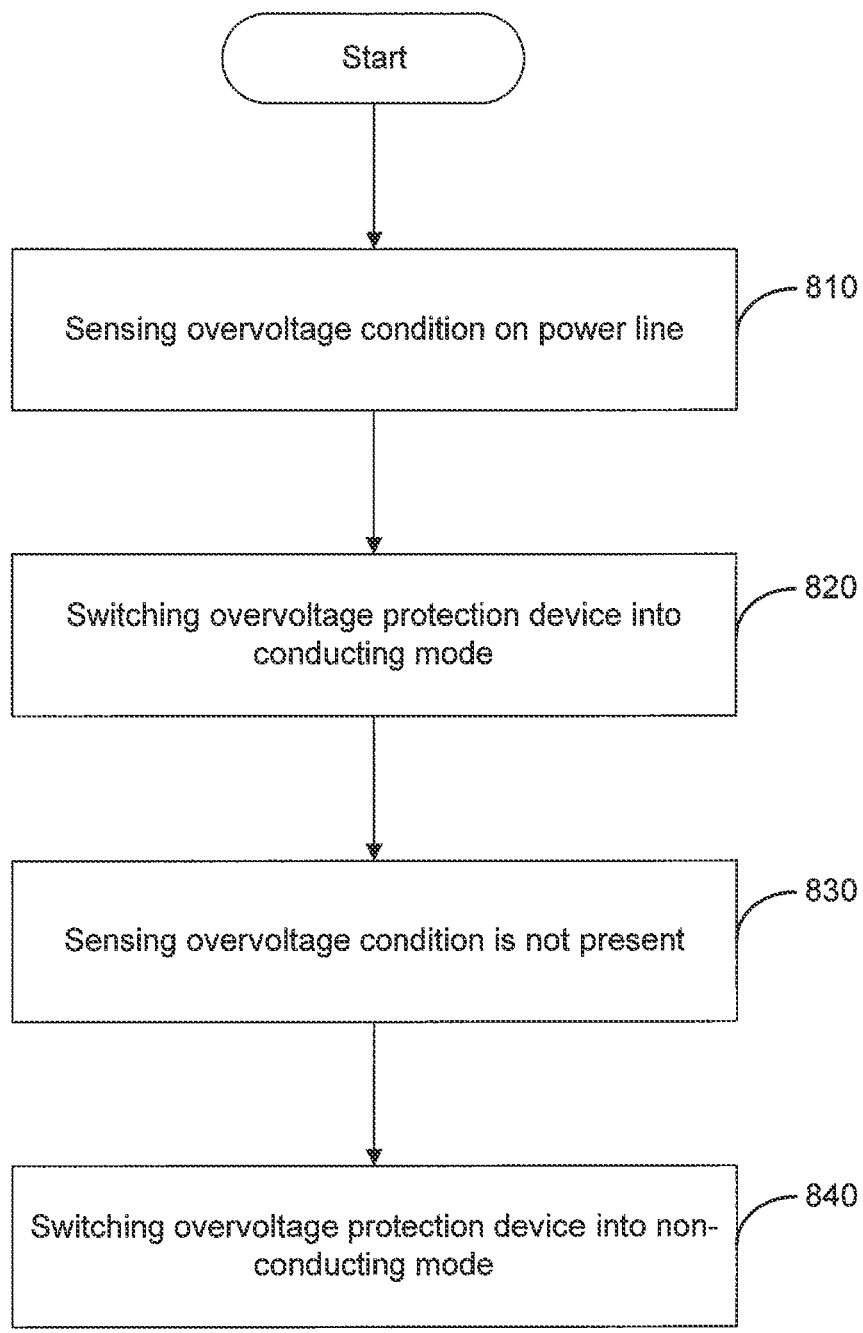
FIG. 8 is a block diagram illustrating operations for providing active overvoltage protection according to some embodiments of the present invention.

Reference is now made to FIG. 8, which is a block diagram illustrating operations for providing active overvoltage protection according to some embodiments of the present invention. According to some methods, operations may include sensing, using a trigger circuit, an overvoltage condition on a power line (block 810). The power line may be a phase power line in a multiple phase power system and/or a single phase power line. The overvoltage condition may be relative to another power line and/or a neutral line. Some embodiments provide that the overvoltage condition may be a temporary overvoltage system that may last for a significant period of time, such as, for example, 100 ms to 300 ms or more, in contrast with a surge or transient overvoltage event that may have a much shorter duration.

In response to detecting the overvoltage condition, operations may include switching an overvoltage protection device into a conducting mode (block 820). When the overvoltage protection device is switched into a conducting mode, the voltage on the power line is clamped to a voltage limit that corresponds to an operating voltage of the power circuit. For example, the voltage limit may be clamped to some multiple of the operating voltage of the power circuit. In some embodiments, the multiple may be in a range from 1.4 to 3.0 such that the voltage is clamped to a voltage that is 1.4 to 3.9 times the system operating voltage. In some embodiments, the multiple may be around 2 such that the voltage is clamped to a voltage that is around 2 times the system operating voltage. Some embodiments provide that the overvoltage protection device includes one or more thyristors that are in series with an SPD and that are switched into a conducting mode. In such embodiments, the SPD may serve to clamp the voltage by absorbing the energy corresponding to the fault current.

Once the overvoltage condition has passed, operations may include sensing that the overvoltage condition on the power line is not present (block 830). This can be done following the feature of the thyristor in which it is disconnected from the power line when the conducted current drops below a certain threshold, such as, for example, around 200 mA. As the voltage drops, at some point the voltage will reach a level below which the MOV connected in series to the thyristor will only allow a current of less than about 200 mA to be conducted therethrough. This may also signify that the TOV condition is elapsed. In response to detecting that the overvoltage condition is not present, the overvoltage protection device may be switched into a non-conducting mode (block 840).

In some embodiments, the power circuit is an alternating current (AC) power circuit and sensing the overvoltage condition may correspond to a first portion of a voltage waveform and that, after switching the overvoltage protection into a non-conducting mode, the trigger circuit may sense another overvoltage condition corresponding to a second portion of the voltage waveform. In such embodiments, the overvoltage protection device may switch into a conducting mode that is configured to clamp the voltage to a second portion voltage waveform voltage limit. For example, some embodiments provide that switching the overvoltage protection device during the first portion of the voltage waveform is performed using a first thyristor and switching the overvoltage protection device during the second portion of the voltage waveform is performed using a second thyristor that is connected in anti-parallel with the first thyristor.

Figure 9:
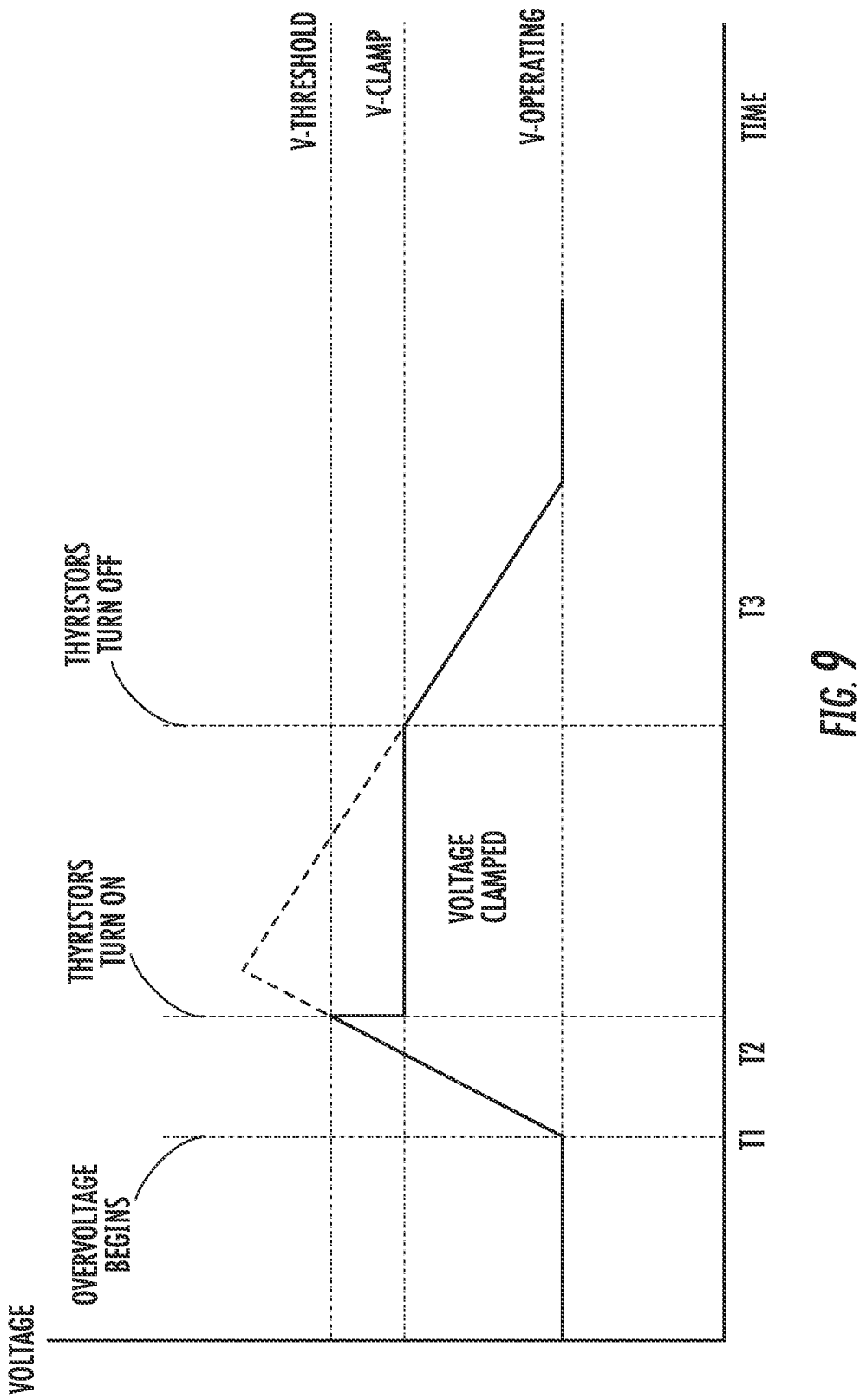
FIG. 9 is a graph of voltage versus time in an overvoltage condition based on the overvoltage protection of some embodiments of the present invention.
Figure 10:
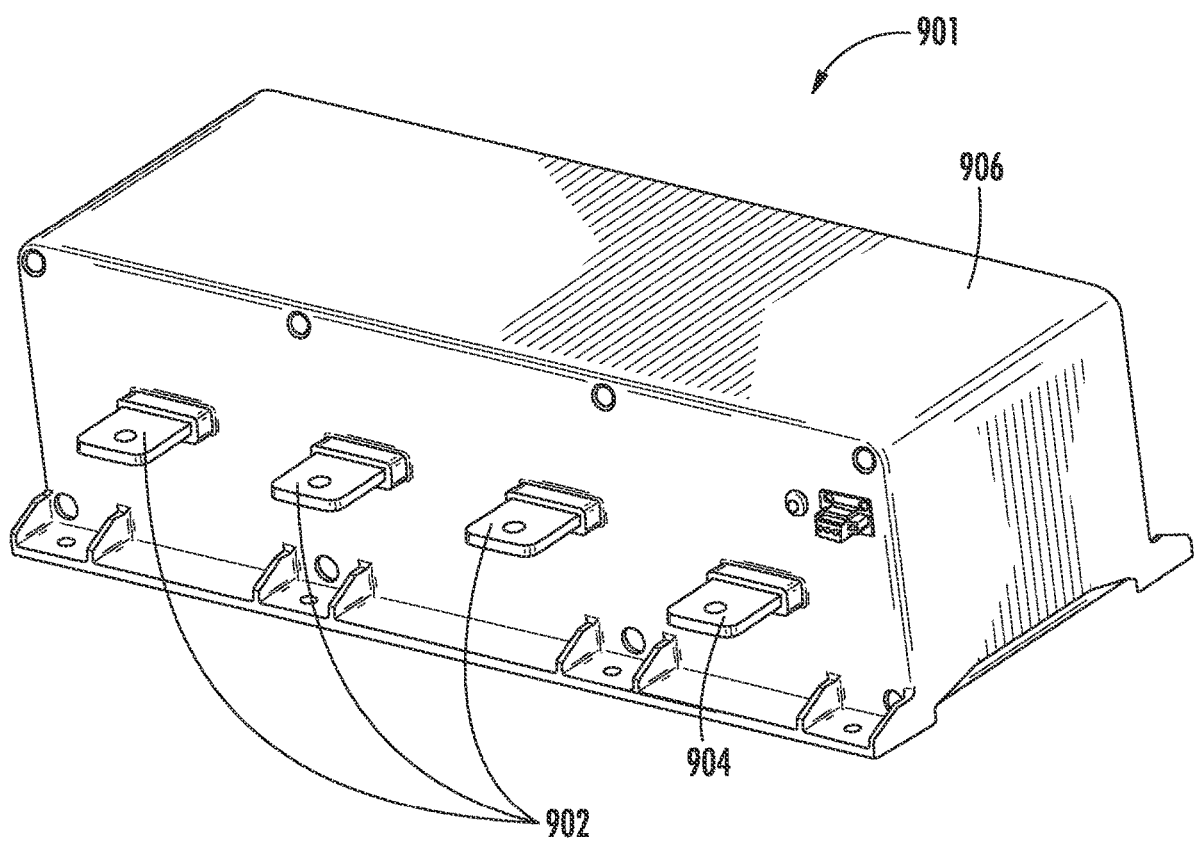
FIG. 10 is a top perspective view of a multi-phase active energy absorber module according to some embodiments of the invention.
Figure 11:
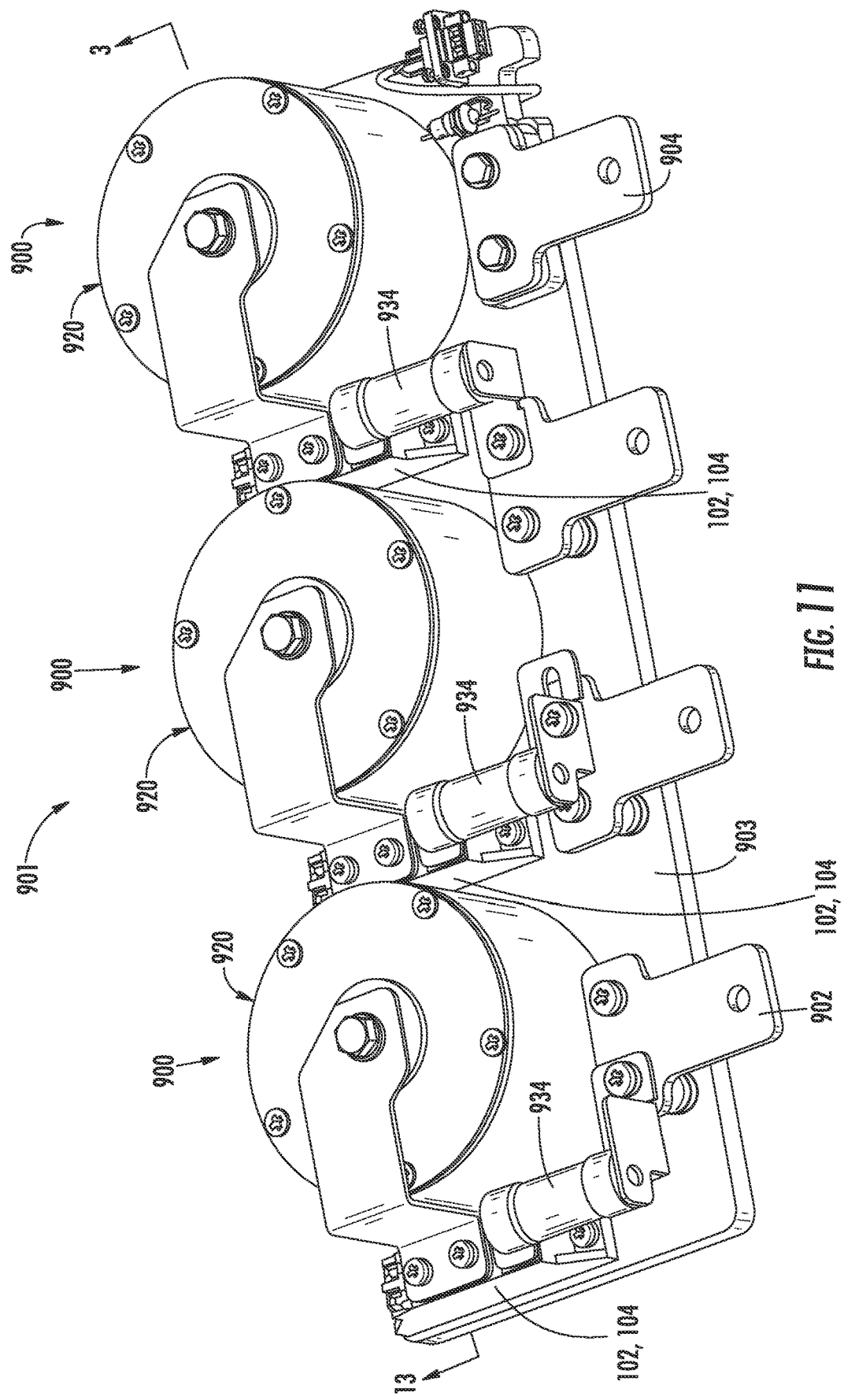
FIG. 11 is a fragmentary, top perspective view of the multi-phase active energy absorber module of FIG. 10.
Figure 12:
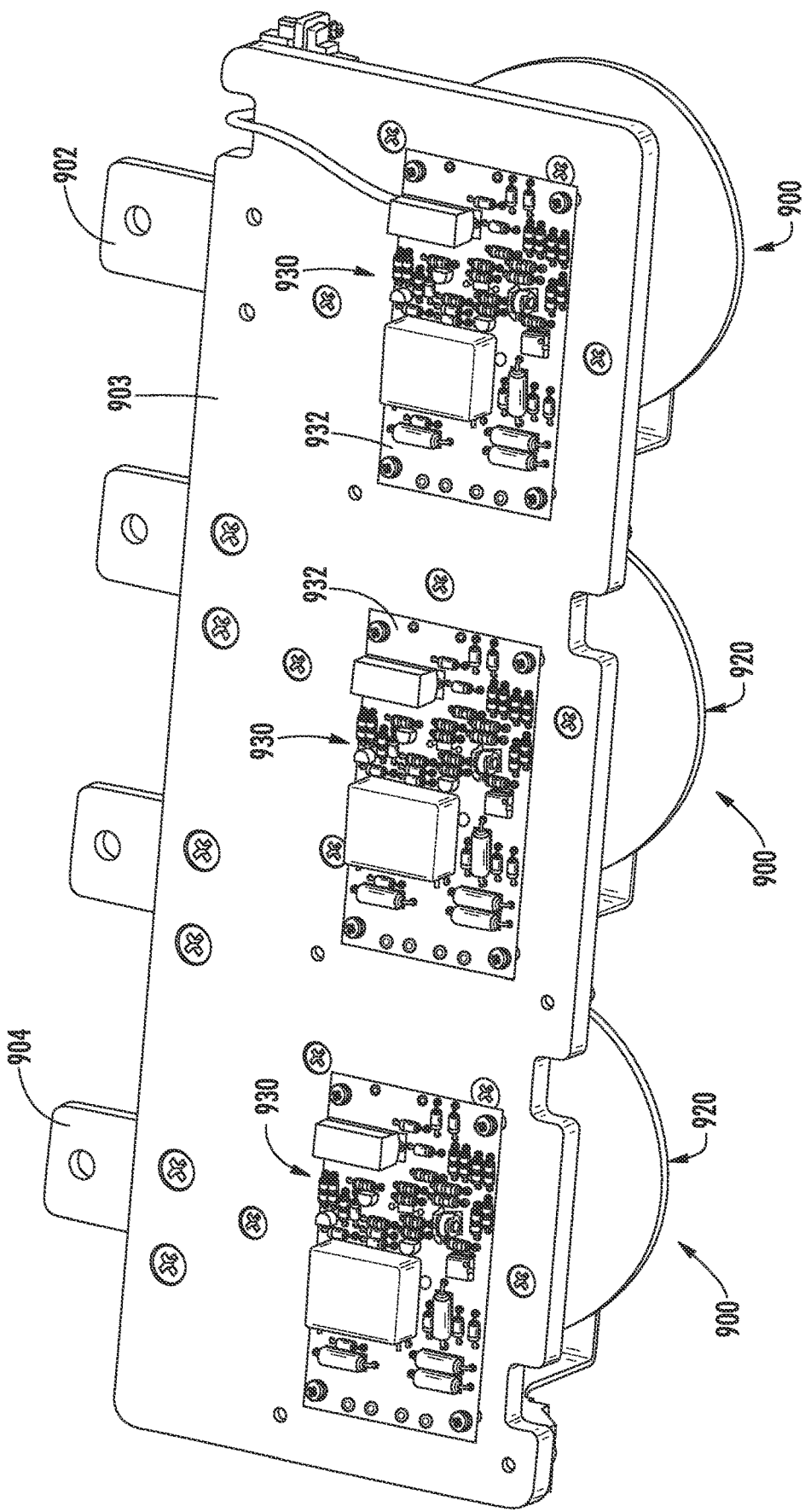
FIG. 12 is a fragmentary, bottom perspective view of the multi-phase active energy absorber module of FIG. 10.

FIG. 9 is a graph of voltage versus time in an overvoltage condition based on the overvoltage protection of some embodiments of the present invention. As illustrated, the overvoltage condition begins at time T1. Once the voltage level reaches a voltage threshold (V-threshold) at time T2, the overvoltage protection turns on to become conducting and the voltage is clamped to a clamp voltage (V-clamp). As the overvoltage condition subsides, the voltage level reduces from the clamp voltage V-clamp to the operating voltage V-operating until the voltage reduces to a level below the clamp voltage. During that reduction in voltage, once the fault current reaches a given trigger fault current level, the overvoltage protection turns off and thus ceases to conduct current at time T3. For example, some embodiments provide that the overvoltage protection turns off when the given trigger fault current reaches about 220 mA, however, the given trigger fault current may be more or less than 220 mA.

With reference to FIGS. 10-13, a mechanical embodiment of the electrical circuit 100 of FIG. 3 is shown therein. The illustrated embodiment is a multi-phase active energy absorber module 901 that is a three phase implementation and therefore includes three active energy absorber subassemblies 900 each corresponding to one of the active energy absorbers 100 of FIG. 3. That is, the active energy absorber 100 of each phase is embodied in a respective subassembly 900. Each subassembly 900 includes an MOV module 920 (corresponding to the MOV 106), two thyristors 102, 104 (corresponding to the thyristors 102, 104 of FIG. 3), a trigger circuit 930 (corresponding to the trigger circuit 110), and a fuse 934 as discrete components. Each subassembly 900 is electrically connected to and mechanical mounted on an electrically conductive neutral plate 903 and includes a respective line terminal 902. A neutral terminal 904 is also connected to the neutral plate 903. The trigger circuit 930 is provided on a PCB 932. The subassemblies 900 and the neutral plate 903 are contained in a module housing 906.

Figure 13:
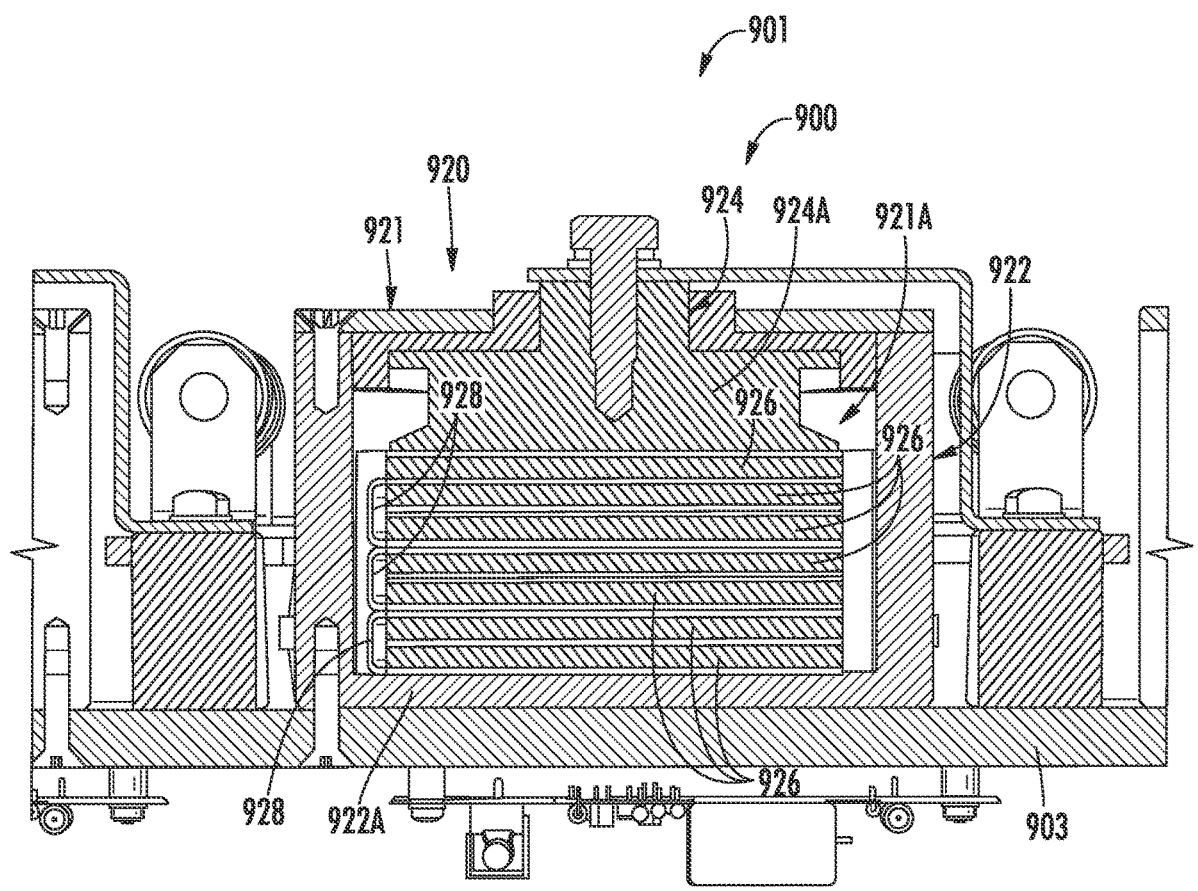
FIG. 13 is a fragmentary, cross-sectional view of the multi-phase active energy absorber module of FIG. 10 taken along the line 13-13 of FIG. 11.

In some embodiments, each MOV module 920 may be constructed as disclosed in one or more of U.S. Pat. No. 6,038,119 to Atkins et al. and U.S. Pat. No. 6,430,020 to Atkins et al., the disclosures of which are incorporated herein by reference. In some embodiments and as shown in FIG. 13, each MOV module 920 includes a metal housing electrode 922, a metal piston electrode 924, and plurality of varistor wafers 926 stacked between a head 924A of the electrode 924 and an electrode end wall 922A of the housing 922. The varistor wafers 926 are connected in electrical parallel between the inner faces of the head 924A and the end wall 922A by electrically conductive interconnect members 928. The electrodes 922 and 924 collectively form a chamber 921A within which the varistors 926 are contained and encapsulated.

The electrical circuit of FIG. 4 may be implemented using discrete components for each of the circuit components, similar to the embodiment described with reference to FIGS. 10-13. In this case, each subassembly 900 is further provided with an inductor corresponding to the inductor 208.

Figure 14:
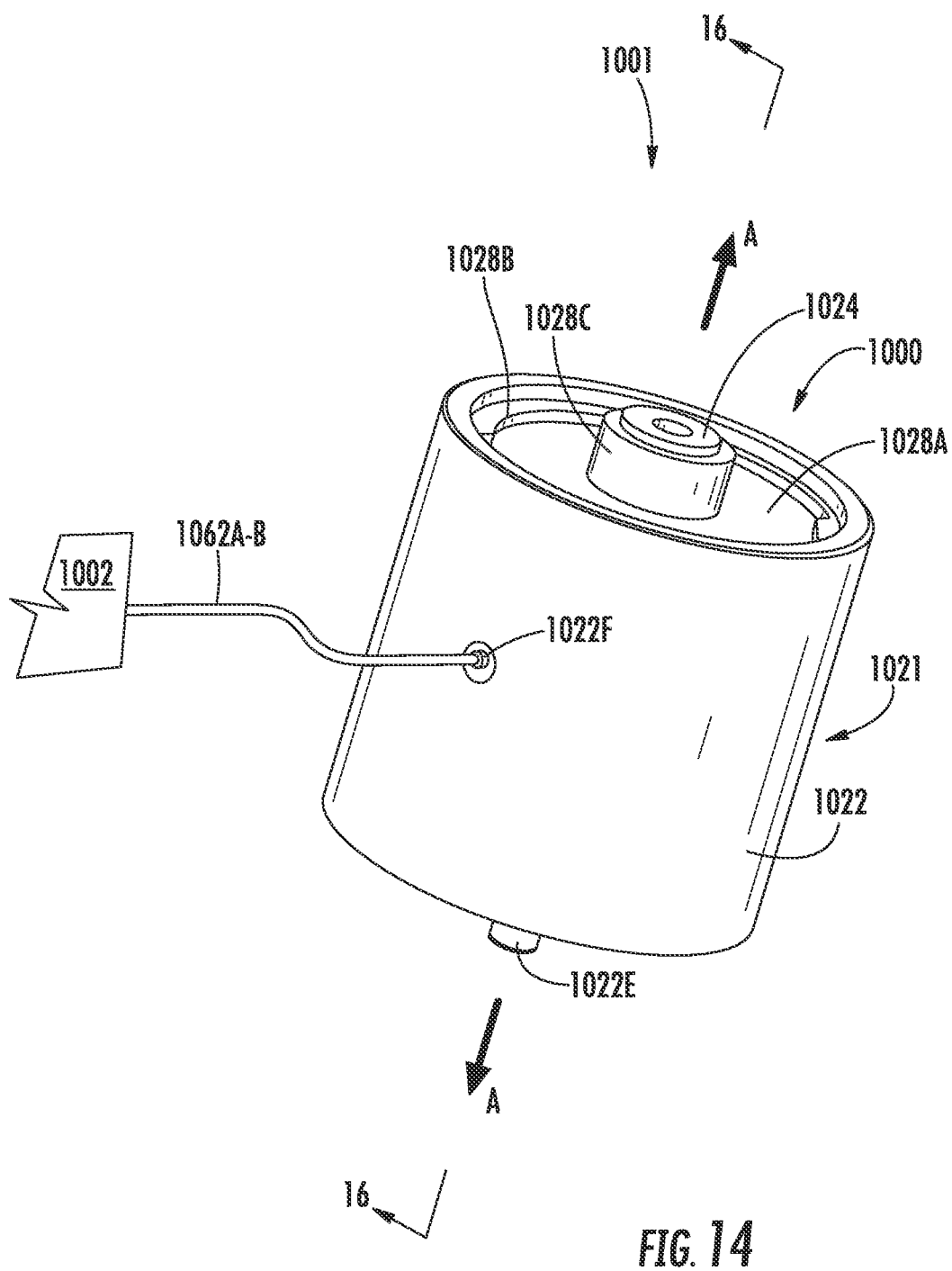
FIG. 14 is a top perspective view of an active energy absorber system according to some embodiments of the invention.
Figure 15:
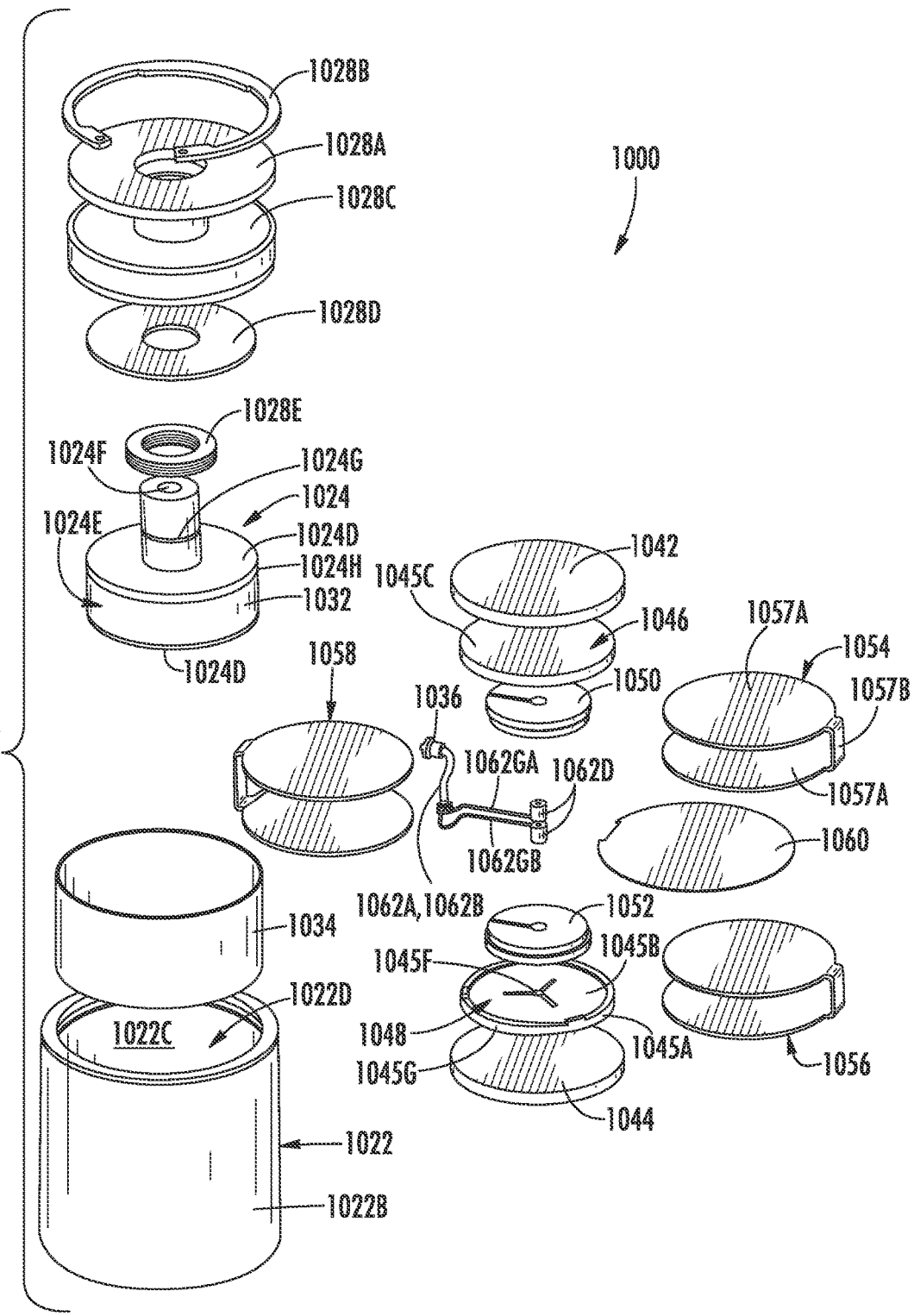
FIG. 15 is an exploded, top perspective view of an active energy absorber module according to some embodiments of the invention and forming a part of the active energy absorber system of FIG. 14.
Figure 16:
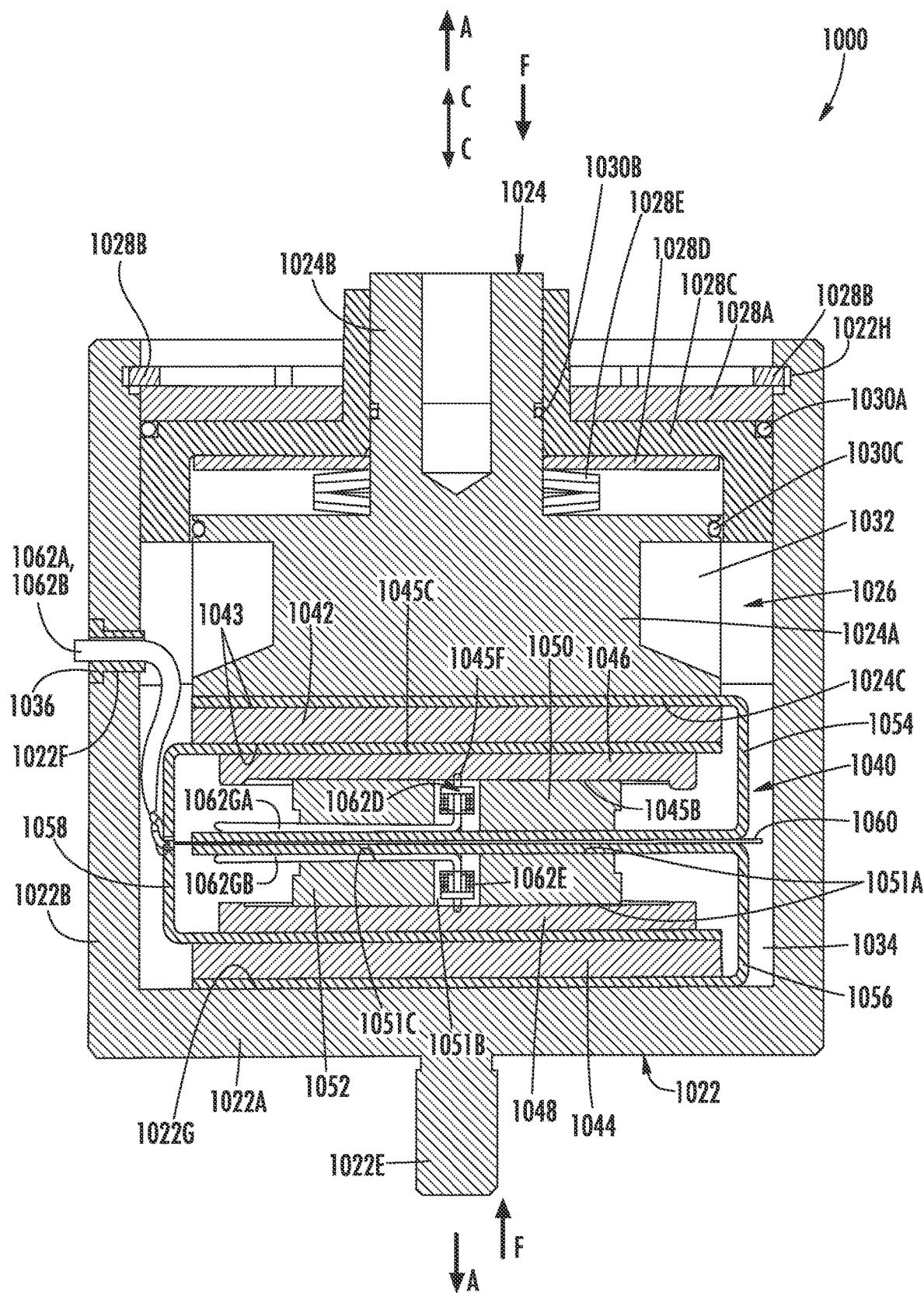
FIG. 16 is a cross-sectional view of the active energy absorber module of FIG. 15 taken along the line 16-16 of FIG. 14.

In other embodiments, the electrical circuit of FIG. 6 is implemented or packaged as an active energy absorber module including a single integrated device wherein the varistors 106 and thyristors 102, 104 are encapsulated in a sturdy housing assembly. With reference to FIGS. 14-16, an active energy absorber system 1001 according to embodiments of the invention is shown therein. The system 1001 includes a modular active energy absorber unit or module 1000 according to embodiments of the invention and an external trigger circuit 1002. One system 1001 may be used for each of the active energy absorbers 400 in FIG. 6. The trigger circuit 1002 may be any suitable device incorporating the trigger circuit 410 of FIG. 6. The trigger circuit 1002 may be packaged in a protective housing.

The active energy absorber module unit 1000 has a lengthwise axis A-A (FIG. 16). The active energy absorber module 1000 includes a first electrode or housing 1022, a piston-shaped second electrode 1024, four spring washers 1028E, a flat washer 1028D, an insulating ring member 1028C, three O-rings 1030A-C, an end cap 1028A, a retention clip 1028B, a meltable member 1032, an insulator sleeve 1034, and a cable gland 1036. The active energy absorber module unit further includes an active component subassembly 1040 including three internal interconnect members 1054, 1056, 1058, two varistor members 1042, 1044, two thyristors 1046, 1048, two contact plates 1050, 1052, two gate connectors 1062D, and two signal cables 1062A-B.

The components 1022, 1024, 1028A-C collectively form a housing assembly defining a sealed, enclosed chamber 1026. The components 1022, 1024, 1028A-E, 1032 and 1040 are disposed axially between the housing and the electrode along the lengthwise axis A-A, in the enclosed chamber 1026.

The housing 1022 has an end electrode wall 1022A and an integral cylindrical sidewall 1022B extending from the electrode wall 1022A. The sidewall 1022B and the electrode wall 1022A form a chamber or cavity 1022C communicating with an opening 1022D. A threaded post 1022E projects axially outwardly from the electrode wall 1022A. A wire aperture or port 1022F extends through the side wall 1022B.

The electrode wall 1022A has an inwardly facing, substantially planar contact surface 1022G. An annular clip slot 1022H is formed in the inner surface of the sidewall 1022B. According to some embodiments, the housing 1022 is formed of aluminum. However, any suitable electrically conductive metal may be used. According to some embodiments, the housing 1022 is unitary and, in some embodiments, monolithic. The housing 1022 as illustrated is cylindrically shaped, but may be shaped differently.

The inner electrode 1024 has a head 1024A disposed in the cavity 1022C and an integral shaft 1022B that projects outwardly through the opening 1022D.

The head 1024A has a substantially planar contact surface 1024C that faces the contact surface 1022G of the electrode wall 1022A. A pair of integral, annular, axially spaced apart flanges 1024D extend radially outwardly from the shaft 1024B and define an annular, sidewardly opening groove 1024E therebetween. A threaded bore 1024F is formed in the end of the shaft 1024B to receive a bolt for securing the electrode 1024 to a busbar, for example. An annular, sidewardly opening groove 1024G is defined in the shaft 1024B.

According to some embodiments, the electrode 1024 is formed of aluminum. However, any suitable electrically conductive metal may be used. According to some embodiments, the electrode 1024 is unitary and, in some embodiments, monolithic.

The electrodes 1022, 1024, the insulating ring 1028C and the end cap 1028A collectively define an enclosed chamber 1026 containing the meltable member 1032 and the active component subassembly 1040.

An annular gap is defined radially between the head 1024A and the nearest adjacent surface of the sidewall 1022B. According to some embodiments, the gap has a radial width in the range of from about 3 to 10 mm.

The meltable member 1032 is annular and is mounted on the electrode 1024 in the groove 1024E. The meltable member 1032 is spaced apart from the sidewall 1022B a distance sufficient to electrically isolate the meltable member 1032 from the sidewall 1022B.

The meltable member 1032 is formed of a heat-meltable, electrically conductive material. According to some embodiments, the meltable member 1032 is formed of metal. According to some embodiments, the meltable member 1032 is formed of an electrically conductive metal alloy. According to some embodiments, the meltable member 1032 is formed of a metal alloy from the group consisting of aluminum alloy, zinc alloy, and/or tin alloy. However, any suitable electrically conductive metal may be used.

According to some embodiments, the meltable member 1032 is selected such that its melting point is greater than a prescribed maximum standard operating temperature. The maximum standard operating temperature may be the greatest temperature expected in the meltable member 1032 during normal operation (including handling overvoltage surges within the designed for range of the system 1001) but not during operation which, if left unchecked, would result in thermal runaway. According to some embodiments, the meltable member 1032 is formed of a material having a melting point in the range of from about 80 to 160° C. and, according to some embodiments, in the range of from about 130 to 150° C. According to some embodiments, the melting point of the meltable member 1032 is at least 20° C. less than the melting points of the housing 1022 and the electrode 1024 and, according to some embodiments, at least 40° C. less than the melting points of those components.

According to some embodiments, the meltable member 1032 has an electrical conductivity in the range of from about $0.5 \times 10^6$ Siemens/meter (S/m) to $4 \times 10^7$ S/m and, according to some embodiments, in the range of from about $1 \times 10^6$ S/m to $3 \times 10^6$ S/m.

The two varistors 1042, 1044, the two thyristors 1046, 1048, the two contact plates 1050, 1052, the insulator member 1060, and the three interconnect members 1054, 1056, 1058 are axially stacked in the chamber 1026 between the electrode head 1024 and the electrode wall 1022 and form an active component subassembly 1040. The subassembly 1040 corresponds to or forms the parts of the electrical circuit shown in FIG. 6 as follows: the varistor 1042 corresponds to the varistor 406, the varistor 1044 corresponds to the varistor 408, the thyristor 1046 corresponds to the thyristor 402, the thyristor 1048 corresponds to the thyristor 404, and the trigger circuit 1002 corresponds to the trigger circuit 410. The interconnect members 1054, 1056 and the contact plates 1050, 1052 electrically interconnect the varistors 1042, 1044, thyristors 1046, 1048, and trigger circuit 1002 in the manner represented in FIG. 6.

Each varistor member 1042, 1044 has first and second opposed, substantially planar contact surfaces 1043. According to some embodiments, each varistor member 1042, 1044 is a varistor wafer (i.e., is wafer- or disk-shaped). However, varistor members 1042, 1044 may be formed in other shapes. The thickness and the diameter of the varistor wafers 1042, 1044 will depend on the varistor characteristics desired for the particular application. In some embodiments, each varistor wafer 1042, 1044 has a diameter to thickness ratio of at least 3. In some embodiments, the thickness of each varistor wafer 1042, 1044 is in the range of from about 1.5 to 15 mm.

The varistor wafers 1042, 1044 may include a wafer of varistor material coated on either side with a conductive coating so that the exposed surfaces of the coatings serve as the contact surfaces. The coatings can be formed of aluminum, copper or silver, for example.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

The two thyristors 1046, 1048 may be constructed in the same or similar manner. In some embodiments and as shown, the thyristors 1046, 1048 are wafer- or disk-shaped. In some embodiments, each thyristor 1046, 1048 has a diameter to thickness ratio of at least 15. In some embodiments, the thickness of each thyristor 1046, 1048 is in the range of from about 1.5 to 10 mm.

It will be appreciated that in FIG. 16 the internal structure and components of the thyristors 1046, 1048 are not shown in detail. Each thyristor 1046, 1048 includes a body 1045A and an anode 1045C and a cathode 1045B on axially opposed sides of the body 1045A. The anode 1045C and the cathode 1045B have substantially planar contact surfaces.

Each thyristor 1046, 1048 further includes a gate or control terminal 1045F (FIG. 15). The gate terminal 1045F is located in the center of the same plate as the cathode 1045B and is surrounded by (but electrically insulated from) the cathode 1045B. An annular insulator 1045G is axially interposed between the anode 1045C and the cathode 1045B and electrically insulates the anode 1045C from the cathode 1045B.

Suitable thyristors for the thyristors 1046, 1048 may be constructed as disclosed in, for example, U.S. Pat. No. 4,956,696 to Hoppe et al., the disclosure of which is incorporated herein by reference.

With reference to FIG. 16, the cable gland 1036 is affixed in the wire port 1022F. The signal cables 1062A, 1062B extend through the wire port 1022F and the cable gland 1036 and into the chamber 1026. The cable gland 1036 is secured in the wire port 1022F. The cable gland 1036 serves to mechanically retain or secure the wires in the port 1022F (providing strain relief) and to fully seal, plug or close the bore in the side wall 1022B (e.g., hermetically).

The signal cable 1062A includes a gate wire 1762GA electrically terminated at the control terminal 1045F of the thyristor 1046. The signal cable 1062A also includes a reference wire electrically terminated at the cathode 1045B of the thyristor 1046. The signal cable 1062B includes a gate wire 1762GB electrically terminated at the control terminal 1045F of the thyristor 1048. The signal cable 1062B also includes a reference wire electrically terminated at the cathode 1045B of the thyristor 1048.

The gate wires 1062GA, 1062GB of the cables 1062A, 1062B are terminated and electrically and mechanically connected to the control terminals 1045F of the thyristors 1046, 1048 by the gate connectors 1062D. Each gate connector 1062D may include a spring 1062E that loads or biases the gate connector 1062D against the associated control terminal 1045F.

The reference wires of the cables 1062A, 1062B may be thin wires or foils, for example, interposed between each cathode 1045B and the opposing face of the adjacent contact plate 1050, 1052. In some embodiments, the reference wire is connected (e.g., by soldering) to a thin metal sheet (e.g., with a thickness in the range of from about 0.1 mm to 1 mm; not shown for simplicity) that is positioned between the cathode 1045B and the contact plate 1050, or 1052. The triggering of each thyristor 1046, 1048 is done through the two wires (i.e., a gate wire and a reference wire) of the respective signal cable 1062A, 1062B.

In other embodiments, the reference wires of the cables 1062A and 1062B may be mechanically terminated and electrically connected (e.g., by soldering) to the bridge portions 1057B of the interconnect members 1054 and 1056, respectively, as described below with reference to FIG. 27, for example. In that case, the reference wire of the cable 1062A would be electrically connected to its cathode 1045B through the interconnect member 1054 and the contact plate 1050, and the reference wire of the cable 1062B would be connected to its cathode 1045B through the interconnect member 1056 and the contact plate 1052.

The contact plates 1050, 1052 are electrically conductive. Each contact plate 1050, 1052 is disk-shaped and has opposed contact surfaces 1051A. Each contact plate 1050, 1052 also has formed therein a central through hole 1051B and a slot 1051C extending radially from the through hole 1051B to the outer periphery of the contact plate 1050, 1052. Each control or gate wire of the signal cables 1062A, 1062B is routed through the slot 1051C of a corresponding contact plate 1050, 1052 and each associated gate connector 1062D is seated in the through hole 1051B of the corresponding contact plate 1050, 1052.

According to some embodiments, the contact plates 1050, 1052 are formed of copper alloy. However, any suitable electrically conductive metal may be used. According to some embodiments, the contact plates 1050, 1052 are unitary and, in some embodiments, monolithic.

The interconnect members 1054, 1056, 1058 are electrically conductive. Each interconnect member 1054, 1056, 1058 includes a pair of axially spaced apart, disk-shaped contact portions 1057A joined by a bridge portion 1057B.

According to some embodiments, the interconnect members 1054, 1056, 1058 are formed of copper. However, any suitable electrically conductive metal may be used. According to some embodiments, the interconnect members 1054, 1056, 1058 are unitary and, in some embodiments, monolithic.

The insulator member 1060 may be a relatively thin layer or disk of an electrically insulating material. In some embodiments, the insulator member 1060 has a thickness in the range of from about 1 to 10 mm.

According to some embodiments, the insulator member 1060 is formed of a hard, high temperature polymer and, in some embodiments, a hard, high temperature thermoplastic. In some embodiments, the insulator member 1060 is formed of mica.

According to some embodiments, the insulator member 1060 is formed of a material having a melting point greater than the melting point of the meltable member 1032. According to some embodiments, the insulator member 1060 is formed of a material having a melting point in the range of from about 120 to 200° C.

According to some embodiments, the insulator member 1060 material can withstand a voltage of 25 kV per mm of thickness.

According to some embodiments, the insulator member 1060 has a thickness in the range of from about 0.1 to 10 mm.

The insulator sleeve 1034 is tubular and generally cylindrical. According to some embodiments, the insulator sleeve 1034 is formed of a high temperature polymer and, in some embodiments, a high temperature thermoplastic. In some embodiments, the insulator sleeve 1034 is formed of polyetherimide (PEI), such as ULTEM™ thermoplastic available from SABIC of Saudi Arabia. In some embodiments, the membrane 1060 is formed of non-reinforced polyetherimide.

According to some embodiments, the insulator sleeve 1034 is formed of a material having a melting point greater than the melting point of the meltable member 1032. According to some embodiments, the insulator sleeve 1034 is formed of a material having a melting point in the range of from about 120 to 200° C.

According to some embodiments, the insulator sleeve 1034 material can withstand a voltage of 25 kV per mm of thickness.

According to some embodiments, the insulator sleeve 1034 has a thickness in the range of from about 0.1 to 2 mm.

The spring washers 1028E surround the shaft 1024B. Each spring washer 1028E includes a hole that receives the shaft 1024B. The lowermost spring washer 1028E abuts the top face of the head 1024A. According to some embodiments, the clearance between the spring washer hole and the shaft 1024B is in the range of from about 0.015 to 0.035 inch. The spring washers 1028E may be formed of a resilient material. According to some embodiments and as illustrated, the spring washers 1028E are Belleville washers formed of spring steel. While two spring washers 1028E are shown, more or fewer may be used. The springs may be provided in a different stack arrangement such as in series, parallel, or series and parallel.

The flat metal washer 1028D is interposed between the uppermost spring washer 1028E and the insulator ring 1028C with the shaft 1024B extending through a hole formed in the washer 1028D. The washer 1028D serves to distribute the mechanical load of the upper spring washer 1028E to prevent the spring washer 1028E from cutting into the insulator ring 1028C.

The insulator ring 1028C overlies and abuts the washer 1028D. The insulator ring 1028C has a main body ring and a cylindrical upper flange or collar extending upwardly from the main body ring. A hole receives the shaft 1024B. According to some embodiments, the clearance between the hole and the shaft 1024B is in range of from about 0.025 to 0.065 inch. An upwardly and outwardly opening peripheral groove is formed in the top corner of the main body ring.

The insulator ring 1028C is preferably formed of a dielectric or electrically insulating material having high melting and combustion temperatures. The insulator ring 1028C may be formed of polycarbonate, ceramic or a high temperature polymer, for example.

The end cap 1028A overlies and abuts the insulator ring 1028C. The end cap 1028A has a hole that receives the shaft 1024B. According to some embodiments, the clearance between the hole and the shaft 1024B is in the range of from about 0.1 to 0.2 inch. The end cap 1028A may be formed of aluminum, for example.

The clip 1028B is resilient and truncated ring shaped. The clip 1028B is partly received in the slot 1022H and partly extends radially inwardly from the inner wall of the housing 1022 to limit outward axial displacement of the end cap 1028A. The clip 1028B may be formed of spring steel.

The O-ring 1030B is positioned in the groove 1024G so that it is captured between the shaft 1024B and the insulator ring 1028C. The O-ring 1030A is positioned in the groove in the insulator ring 1028C such that it is captured between the insulating member 1028C and the sidewall 1022B. The O-ring 1030C is positioned in the groove 1024I to seal with the insulator ring 1028C. When installed, the O-rings 1030A-C are compressed so that they are biased against and form a seal between the adjacent interfacing surfaces. In an overvoltage or failure event, byproducts such as hot gases and fragments from the thyristors 1046, 1048 or varistors 1042, 1044 may fill or scatter into the cavity chamber 1026. These byproducts may be constrained or prevented by the O-rings 1030A-C from escaping the active energy absorber module 1000 through the housing opening 1022D.

The O-rings 1030A-C may be formed of the same or different materials. According to some embodiments, the O-rings 1030A-C are formed of a resilient material, such as an elastomer. According to some embodiments, the O-rings 1030A-C are formed of rubber. The O-rings 1030A-C may be formed of a fluorocarbon rubber such as VITON™ available from DuPont. Other rubbers such as butyl rubber may also be used. According to some embodiments, the rubber has a durometer of between about 60 and 100 Shore A.

The electrode head 1024A and the housing end wall 1022A are persistently biased or loaded against the active component subassembly 1040 along a load or clamping axis C-C (FIG. 16) in directions F to ensure firm and uniform engagement between the above-identified interfacing contact surfaces. This aspect of the unit 1000 may be appreciated by considering a method according to the present invention for assembling the unit 1000, as described below. In some embodiments, the clamping axis C-C is substantially coincident with the axis A-A (FIG. 16).

The signal cables 1062A-B are secured in the bore of the cable gland 1036. The cable gland 1036 is secured in the wire port 1022F (e.g., using adhesive). The cables 1062A-B are connected to the terminals 1045F, 1045G.

The components 1042, 1044, 1046, 1048, 1050, 1052, 1054, 1056, 1058, 1060 are assembled to form the active component subassembly 1040 (FIG. 16). The subassembly 1040 is placed in the cavity 1022C such that the lower contact surface or portion 1051A of the interconnect member 1056 engages the contact surface 1022G of the end wall 1022A.

The O-rings 1030A-C are installed in their respective grooves.

The head 1024A is inserted into the cavity 1022C such that the contact surface 1024C engages the upper contact surface or portion 1051A of the interconnect member 1054.

The spring washers 1028E are slid down the shaft 1024B. The washer 1028D, the insulator ring 1028C, and the end cap 1028A are slid down the shaft 1024B and over the spring washers 1028E. A jig (not shown) or other suitable device is used to force the end cap 1028A down, in turn deflecting the spring washers 1028E. While the end cap 1028A is still under the load of the jig, the clip 1028B is compressed and inserted into the slot 1022H. The clip 1028B is then released and allowed to return to its original diameter, whereupon it partly fills the slot and partly extends radially inward into the cavity from the slot 1022H. The clip 1028B and the slot 1022H thereby serve to maintain the load on the end cap 1028A to partially deflect the spring washers 1028E. The loading of the end cap 1028A onto the insulator ring 1028C and from the insulator ring onto the spring washers is in turn transferred to the head 1024A. In this way, the subassembly 1040 is sandwiched (clamped) between the head 1024A and the electrode wall 1022A.

When the active energy absorber module 1000 is assembled, the housing 1022, the electrode 1024, the insulating member 1028C, the end cap 1028A, the clip 1028B, the O-rings 1030A-C and the cable gland 1036 collectively form a unit housing or housing assembly 1021 containing the components in the chamber 1026.

In the assembled active energy absorber module 1000, the large, planar contact surfaces of the components 1022A, 1024A, 1042, 1044, 1046, 1048, 1050, 1052, 1054 can ensure reliable and consistent electrical contact and connection between the components during an overvoltage or surge current event. The head 1024A and the end wall 1022A are mechanically loaded against these components to ensure firm and uniform engagement between the mating contact surfaces.

Advantageously, the active energy absorber module 1000 integrates two varistors 1042, 1044 in electrical parallel in the same modular device, so that energy can be shared between the varistors 1042, 1044 during electrical conduction.

The design of the active energy absorber module 1000 provides compressive loading of the thyristors 1046, 1048 in combination with the varistor wafers 1042, 1044 in a single modular unit. The active energy absorber module 1000 provides suitable electrical interconnections between the electrodes 1042, 1044, thyristors 1046, 1048, and varistor wafers 1042, 1044, while retaining a compact form factor and providing proper thermal dissipation of energy from the varistors 1042, 1044.

The construction of the active energy absorber module 1000 provides a safe failure mode for the device. During use, one or more of the varistors 1042, 1044 and the thyristors 1046, 1048 may be damaged by overheating and may generate arcing inside the housing assembly 1021. The housing assembly 1021 can contain the damage (e.g., debris, gases and immediate heat) within the active energy absorber module 1000, so that the active energy absorber module 1000 fails safely. In this way, the active energy absorber module 1000 can prevent or reduce any damage to adjacent equipment (e.g., switch gear equipment in the cabinet) and harm to personnel. In this manner, the active energy absorber module 1000 can enhance the safety of equipment and personnel.

Additionally, the active energy absorber module 1000 provides a fail-safe mechanism in response to end of life mode in one of more of the varistors 1042, 1044. In case of a failure of a varistor 1042, 1044, a fault current will be conducted between the corresponding line (e.g., Line 1 of FIG. 6) and the neutral line. As is well known, a varistor has an innate nominal clamping voltage VNOM (sometimes referred to as the "breakdown voltage" or simply the "varistor voltage") at which the varistor begins to conduct current. Below the VNOM, the varistor will not pass current. Above the VNOM, the varistor will conduct a current (i.e., a leakage current or a surge current). The VNOM of a varistor is typically specified as the measured voltage across the varistor with a DC current of 1 mA.

As is well known, a varistor has three modes of operation. In a first normal mode (discussed above), up to a nominal voltage, the varistor is practically an electrical insulator. In a second normal mode (also discussed above), when the varistor is subjected to an overvoltage, the varistor temporarily and reversibly becomes an electrical conductor during the overvoltage condition and returns to the first mode thereafter. In a third mode (the so-called end of life mode), the varistor is effectively depleted and becomes a permanent, non-reversible electrical conductor.

The varistor also has an innate clamping voltage VC (sometimes referred to as simply the "clamping voltage"). The clamping voltage VC is defined as the maximum voltage measured across the varistor when a specified current is applied to the varistor over time according to a standard protocol.

In the absence of an overvoltage condition, the varistor wafer 1042, 1044 provides high resistance such that no current flows through the active energy absorber module 1000 as it appears electrically as an open circuit. That is, ordinarily the varistor passes no current. In the event of an overcurrent surge event (typically transient; e.g., lightning strike) or an overvoltage condition or event (typically longer in duration than an overcurrent surge event) exceeding VNOM, the resistance of the varistor wafer decreases rapidly, allowing current to flow through the active energy absorber module 1000 and create a shunt path for current flow to protect other components of an associated electrical system. Normally, the varistor recovers from these events without significant overheating of the active energy absorber module 1000.

Varistors have multiple failure modes. The failure modes include: 1) the varistor fails as a short circuit; and 2) the varistor fails as a linear resistance. The failure of the varistor to a short circuit or to a linear resistance may be caused by the conduction of a single or multiple surge currents of sufficient magnitude and duration or by a single or multiple continuous overvoltage events that will drive a sufficient current through the varistor.

A short circuit failure typically manifests as a localized pinhole or puncture site (herein, "the failure site") extending through the thickness of the varistor. This failure site creates a path for current flow between the two electrodes of a low resistance, but high enough to generate ohmic losses and cause overheating of the device even at low fault currents. Sufficiently large fault current through the varistor can melt the varistor in the region of the failure site and generate an electric arc.

A varistor failure as a linear resistance will cause the conduction of a limited current through the varistor that will result in a buildup of heat. This heat buildup may result in catastrophic thermal runaway and the device temperature may exceed a prescribed maximum temperature. For example, the maximum allowable temperature for the exterior surfaces of the device may be set by code or standard to prevent combustion of adjacent components. If the leakage current is not interrupted at a certain period of time, the overheating will result eventually in the failure of the varistor to a short circuit as defined above.

In some cases, the current through the failed varistor could also be limited by the power system itself (e.g., ground resistance in the system or in photo-voltaic (PV) power source applications where the fault current depends on the power generation capability of the system at the time of the failure) resulting in a progressive build up of temperature, even if the varistor failure is a short circuit. There are cases where there is a limited leakage current flow through the varistor due to extended in time overvoltage conditions due to power system failures, for example. These conditions may lead to temperature build up in the device, such as when the varistor has failed as a linear resistance and could possibly lead to the failure of the varistor either as a linear resistance or as a short circuit as described above. A thyristor may also fail in a short circuit in a similar manner as the varistor when the energy dissipated on the thyristor exceeds its power dissipation limit, which may be represented by the current squared times the time ($i^2*t$). The difference may be that under the same current level conducted, the thyristor may dissipate far less energy so it is unlikely to fail first, if the latter is properly designed and dimensional for specific application. However, the manner of failure may be very similar to that of a MOV, namely through a low ohmic resistance path or a pinhole that may generate an arc and/or overheating.

As discussed above, in some cases the active energy absorber module 1000 may assume an "end of life" mode in which a varistor wafer 1042, 1044 is depleted in full or in part (i.e., in an "end of life" state), leading to an end of life failure. When the varistor reaches its end of life, the active energy absorber module 1000 will become substantially a short circuit with a very low but non-zero ohmic resistance. As a result, in an end of life condition, a fault current will continuously flow through the varistor even in the absence of an overvoltage condition. In this case, the meltable member 1032 can operate as a fail-safe mechanism that by-passes the failed varistor and creates a permanent low-ohmic short circuit between the terminals of the active energy absorber module 1000 in the manner described in U.S. Pat. No. 7,433,169, the disclosure of which is incorporated herein by reference.

Each thyristor 1046, 1048 can likewise fail with the same or similar failure modes as described herein for the varistors 1042, 1044, including failing as a short circuit, and failing as a linear resistance. The thyristors 1046, 1048 can likewise assume an "end of life" mode as described for the varistors 1042, 1044. The thyristors 1046, 1048 will exhibit similar or substantially the same behavior and response as described for the varistors 1042, 1044. As the failure modes of both the varistors and the thyristors are similar, the same by-pass mechanism can be used inside the same chamber to enable the fail-safe operation of the device 1000 when either a varistor 1042, 1044 or a thyristor 1046, 1048 fails.

The meltable member 1032 is adapted and configured to operate as a thermal disconnect to electrically short circuit the current applied to the associated active energy absorber module 1000 around the varistors 1042, 1044 and the thyristors 1046, 1048 to prevent or reduce the generation of heat in the varistors and thyristors. In this way, the meltable member 1032 can operate as switch to bypass the varistors 1042, 1044 and thyristors 1046, 1048 and prevent overheating and catastrophic failure as described above. As used herein, a fail-safe system is "triggered" upon occurrence of the conditions necessary to cause the fail-safe system to operate as described to short circuit the electrodes 1022A, 1024A.

When heated to a threshold temperature, the meltable member 1032 will flow to bridge and electrically connect the electrodes 1022A, 1024A. The meltable member 1032 thereby redirects the current applied to the active energy absorber module 1000 to bypass the varistors 1042, 1044 and thyristors 1046, 1048 so that the current induced heating of the varistor or thyristor ceases. The meltable member 1032 may thereby serve to prevent or inhibit thermal runaway (caused by or generated in a varistor 1042, 1044 and/or a thyristor 1046, 1048) without requiring that the current through the active energy absorber module 1000 be interrupted.

More particularly, the meltable member 1032 initially has a first configuration as shown in FIGS. 15 and 16 such that it does not electrically couple the electrode 1024 and the housing 1022 except through the head 1024A. Upon the occurrence of a heat buildup event, the electrode 1024 is thereby heated. The meltable member 1032 is also heated directly and/or by the electrode 1024. During normal operation, the temperature in the meltable member 1032 remains below its melting point so that the meltable member 1032 remains in solid form. However, when the temperature of the meltable member 1032 exceeds its melting point, the meltable member 1032 melts (in full or in part) and flows by force of gravity into a second configuration different from the first configuration. The meltable member 1032 bridges or short circuits the electrode 1024 to the housing 1022 to bypass the varistors 1042, 1044 and the thyristors 1046, 1048. That is, a new direct flow path or paths are provided from the surface of the electrode 1024 to the surface of the housing sidewall 1022B through the meltable member 1032. According to some embodiments, at least some of these flow paths do not include the varistor wafers 1042, 1044 or the thyristors 1046, 1048.

According to some embodiments, the active energy absorber module 1000 is adapted such that when the meltable member 1032 is triggered to short circuit the active energy absorber module 1000, the conductivity of the active energy absorber module 1000 is at least as great as the conductivity of the feed and exit cables connected to the device.

Figure 17:
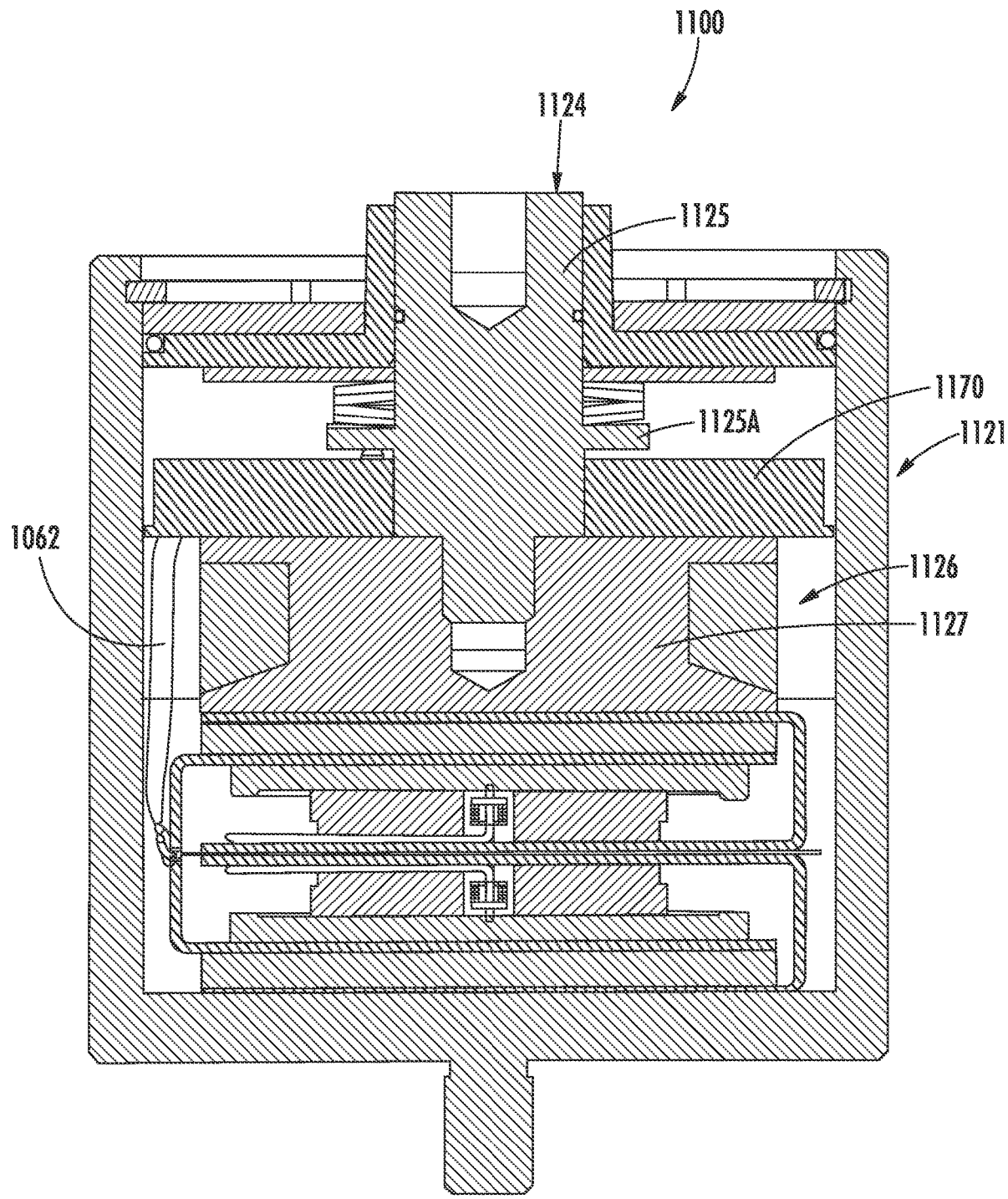
FIG. 17 is a cross-sectional view of an active energy absorber module according to further embodiments of the invention.
Figure 18:
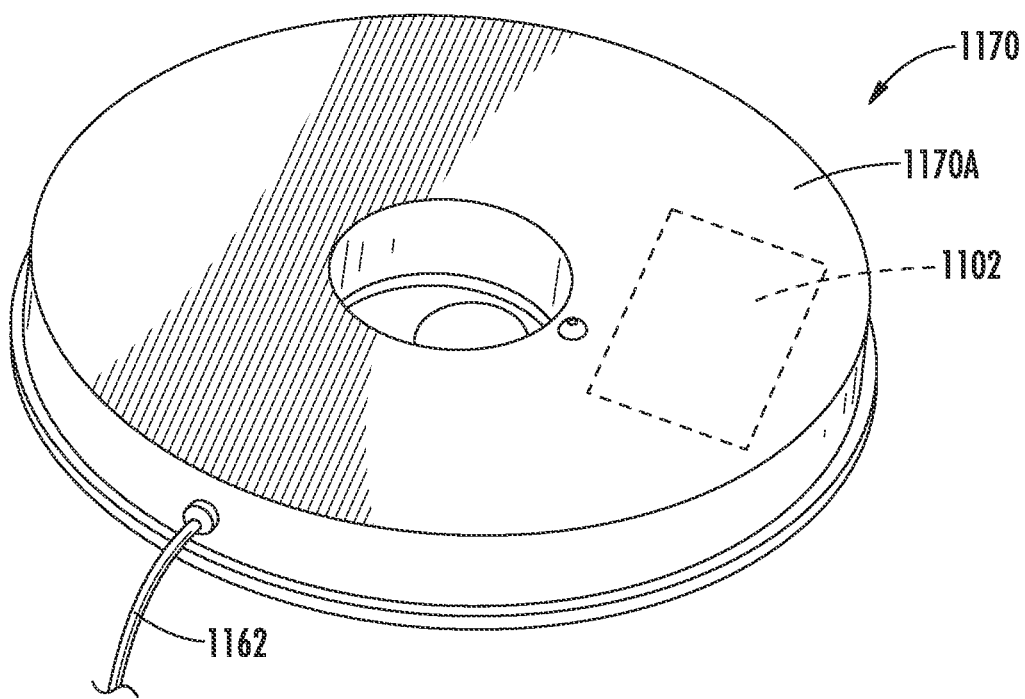
FIG. 18 is a top perspective view of a trigger module forming a part of the active energy absorber module of FIG. 17.

With reference to FIGS. 17 and 18, an active energy absorber module 1100 according to alternative embodiments is shown therein. The active energy absorber module 1100 corresponds to the active energy absorber module 400 of the electrical circuit of FIG. 6. The active energy absorber module 1100 is constructed in the same manner as the active energy absorber module 1000, except that the trigger circuit 1102 is integrated within the active energy absorber module 1100 and encapsulated in the enclosed chamber 1126 of the housing assembly 1121. As a result, the active energy absorber module 1100 can operate as a stand-alone, self-triggering device that can be connected between two lines and provide protection against overvoltage (temporary and transient) and surge (e.g., lightning) events. Because the trigger circuit 1102 is contained in the housing assembly 1121, the wire port 1022F can be eliminated.

In this case, with reference to FIG. 17, the inner electrode 1124 has a two piece construction including a shaft member 1125 threadedly secured to a head member 1127. The trigger circuit 1102 is contained in a trigger circuit housing 1170A. The trigger circuit 1102 and the housing 1170A together form a trigger circuit module 1170. The shaft member 1125 extends through the housing 1170A and the trigger circuit module 1170 is captured between the head 1127 and an integral flange 1125A of the shaft member 1125. A wire assembly 1162 corresponding to the wire assembly 1062 electrically connects the trigger circuit 1102 to the thyristors.

Figure 19:
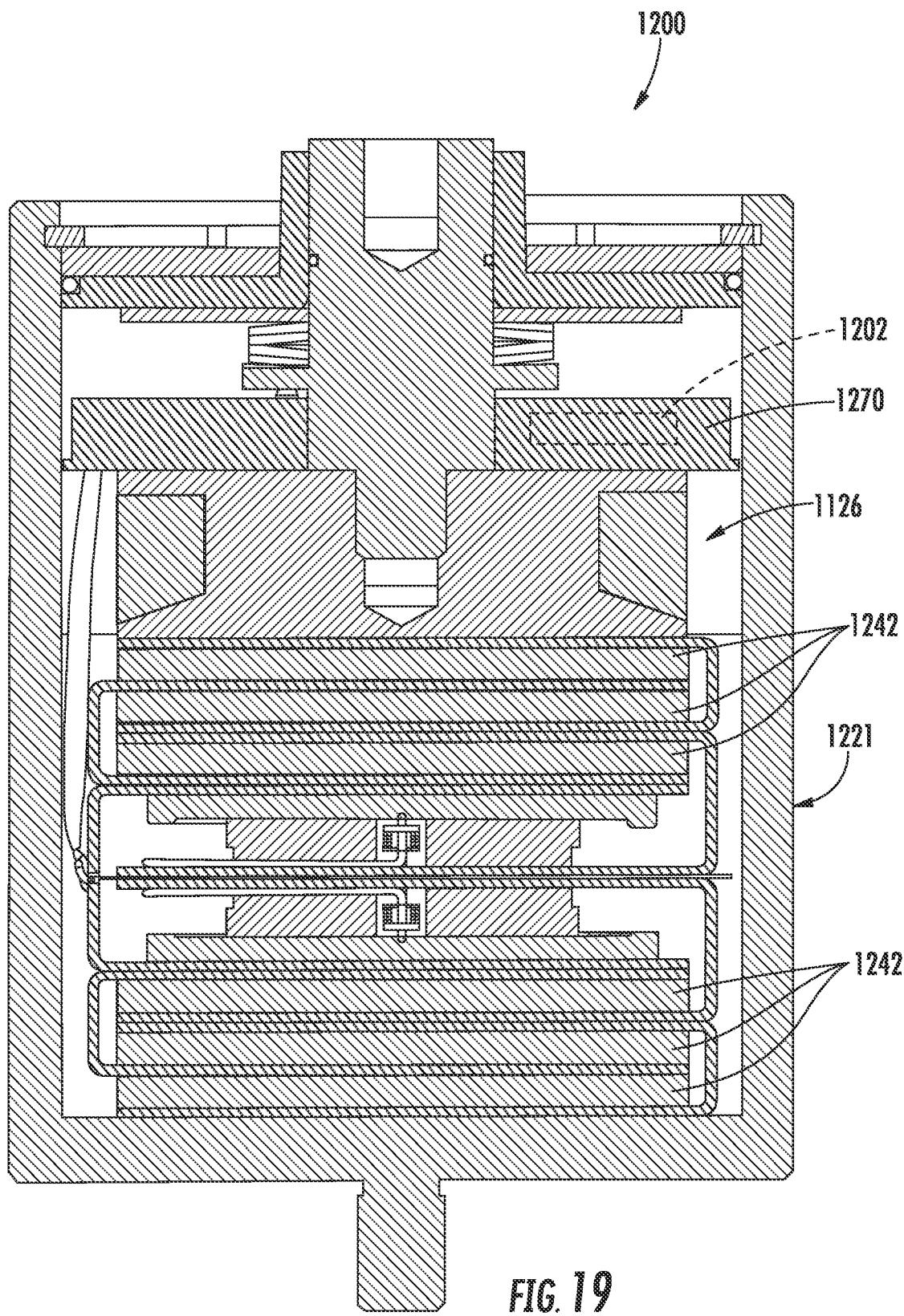
FIG. 19 is a cross-sectional view of an active energy absorber module according to further embodiments of the invention.
Figure 20:
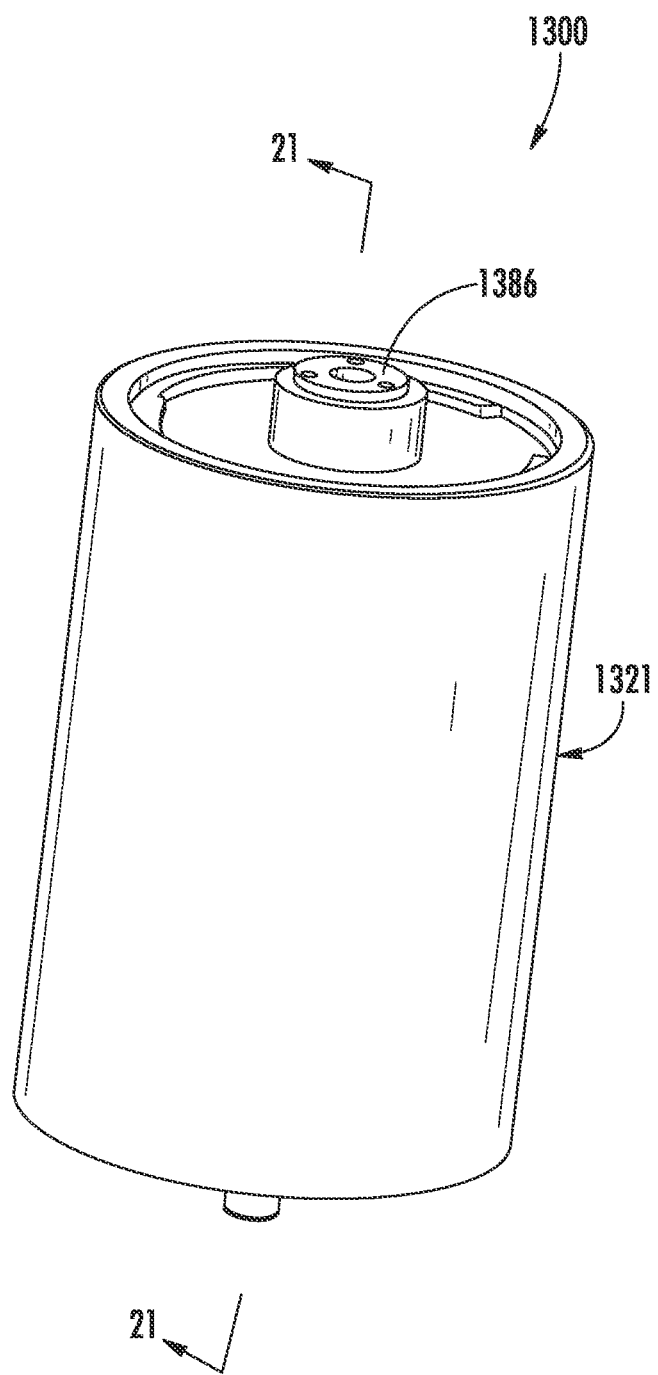
FIG. 20 is a top perspective view of an active energy absorber module according to further embodiments of the invention.
Figure 21:
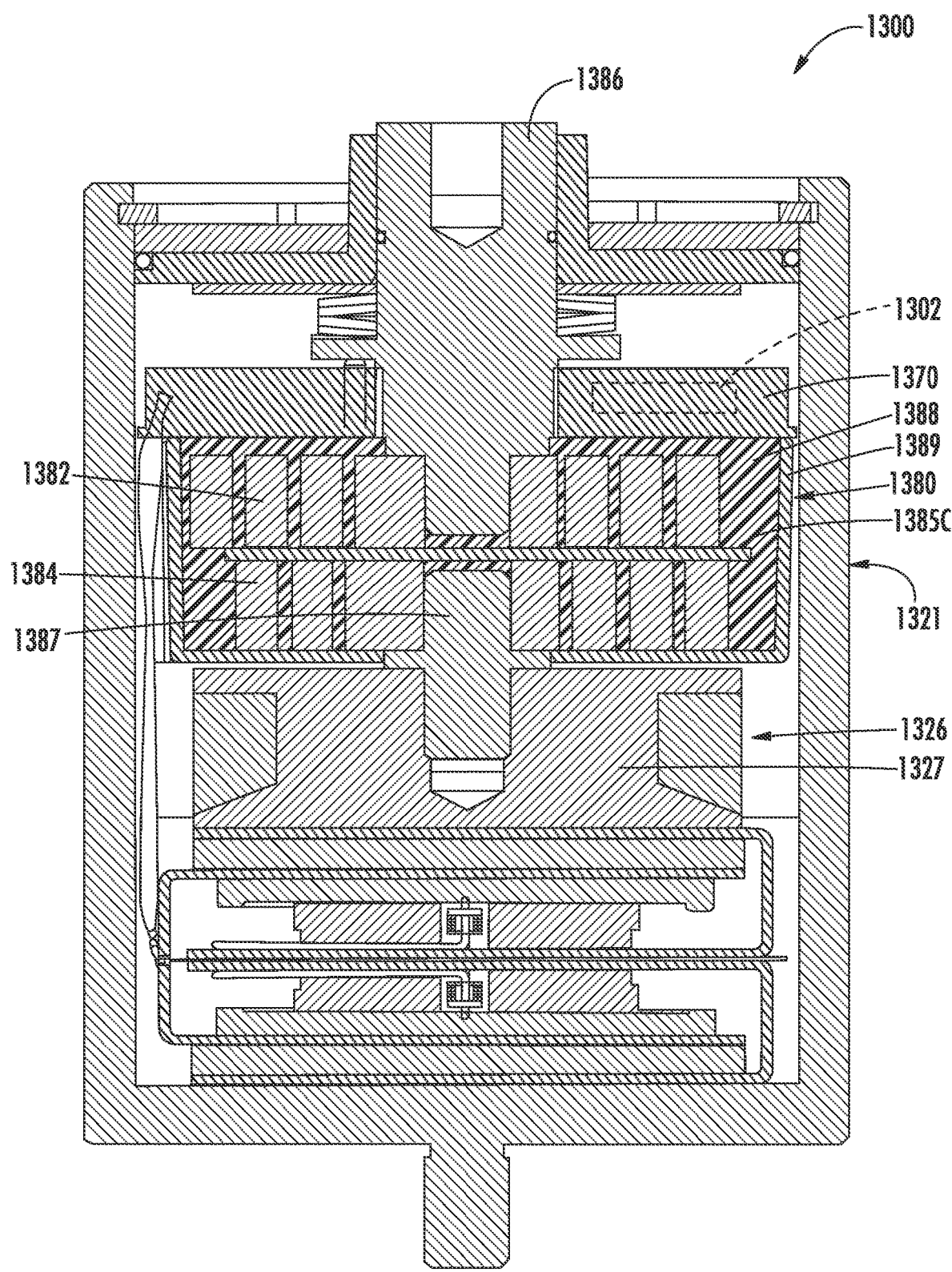
FIG. 21 is a cross-sectional view of the active energy absorber module of FIG. 20 taken along the line 21-21 of FIG. 20.
Figure 22:
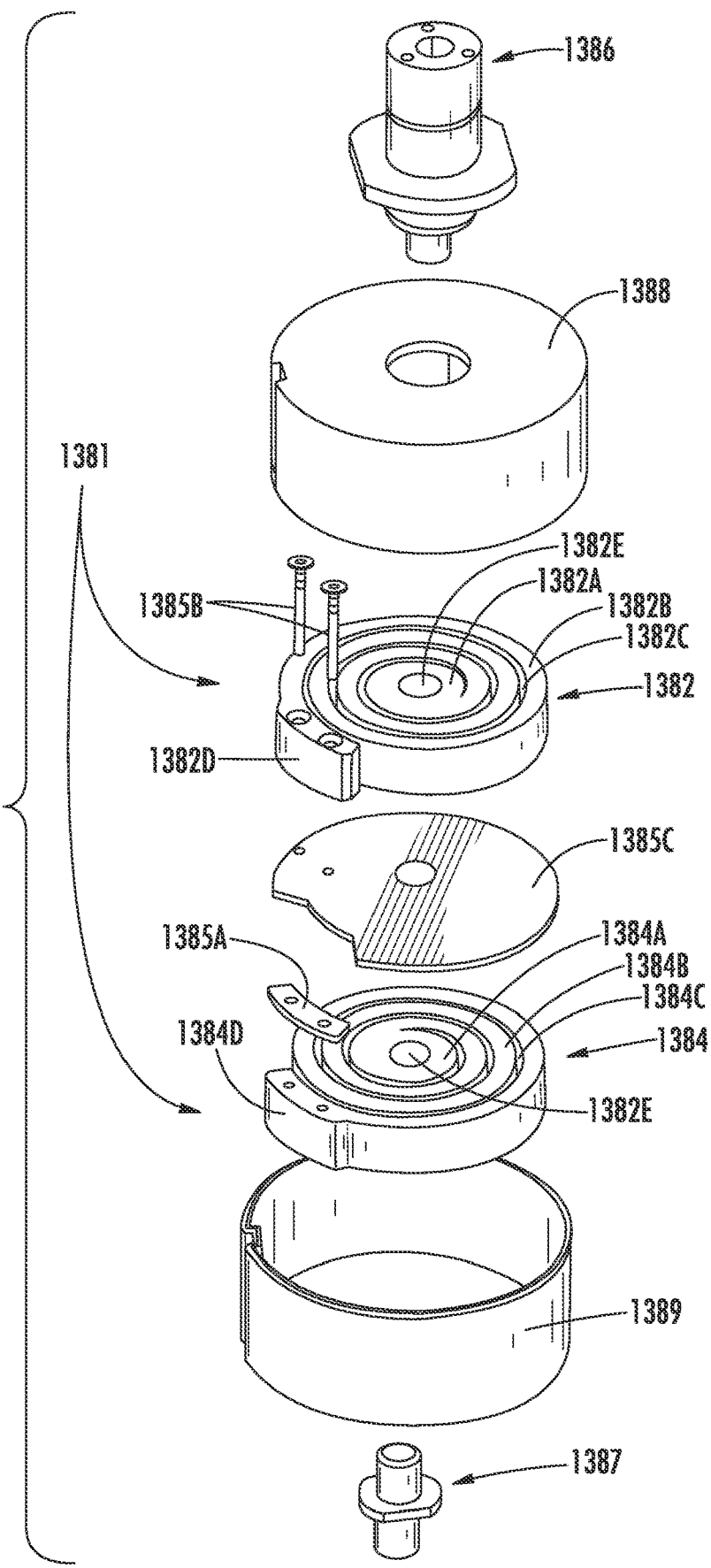
FIG. 22 is an exploded, top perspective view of a coil assembly forming a part of the active energy absorber module of FIG. 20.
Figure 23:
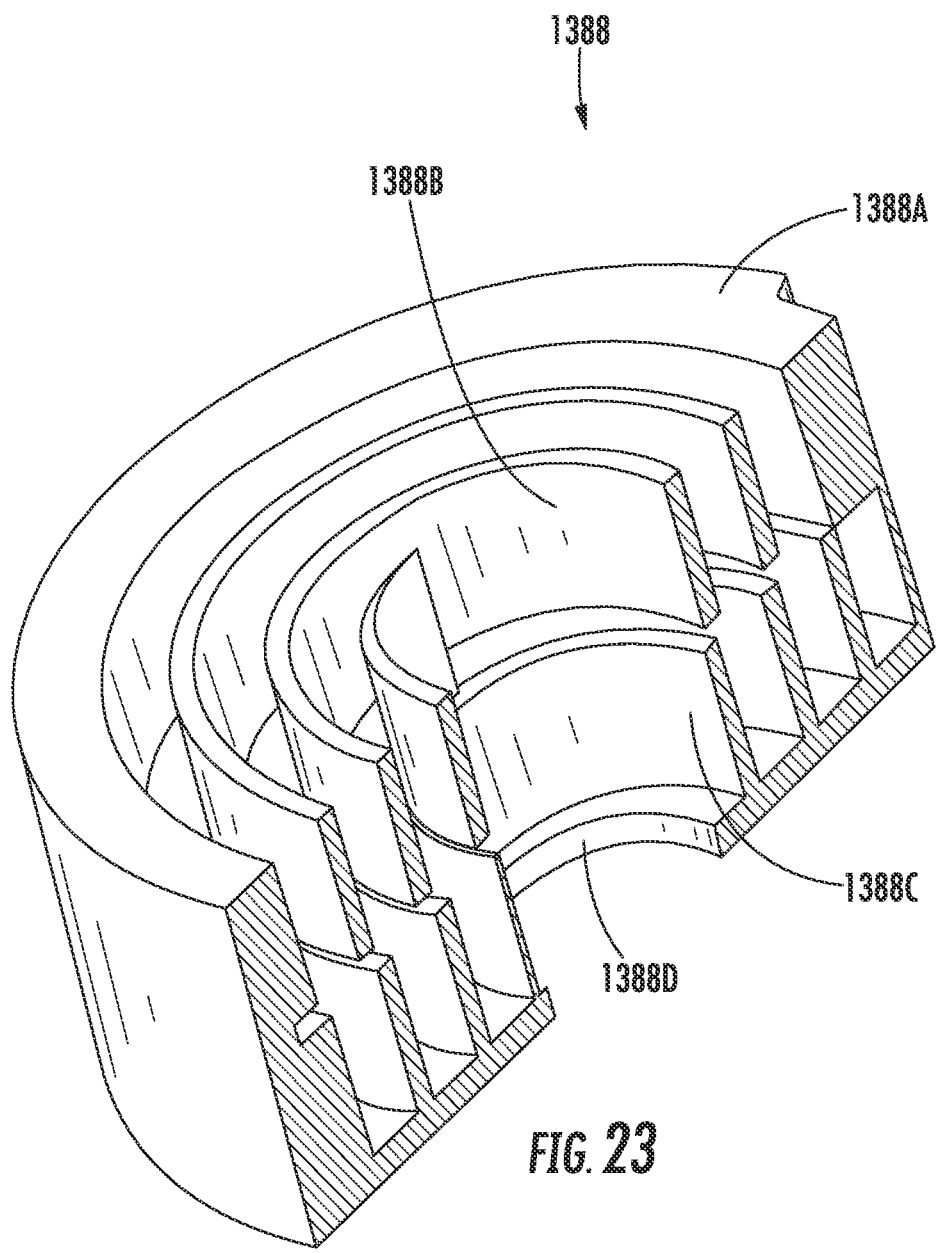
FIG. 23 is a bottom perspective view of a casing forming a part of the coil assembly of FIG. 22.

With reference to FIG. 19, an active energy absorber module 1200 according to alternative embodiments is shown therein. The active energy absorber module 1200 is constructed in the same manner as the active energy absorber module 1100 (including a housing assembly 1221 corresponding to the housing assembly 1021 and a trigger circuit module 1270 and a trigger circuit 1202 encapsulated in the enclosed chamber 1226), except that each of leg of the circuit includes three varistor wafers 1242 in parallel. This embodiment can provide higher energy absorption than the active energy absorber module 1000 of FIG. 17, for example (when the varistors are of the same construction as the varistors).

With reference to FIGS. 20-23, an active energy absorber module 1300 according to alternative embodiments is shown therein. The active energy absorber module 1300 corresponds to the active energy absorber circuit 400 of the electrical circuit of FIG. 6 except that the unit 1300 further integrates the inductor 420 into the active energy absorber module 1300. The active energy absorber module 1300 is constructed in the same manner as the active energy absorber module 1100 (including a housing assembly 1321 corresponding to the housing assembly 1121, and a trigger circuit module 1370 and a trigger circuit 1302 encapsulated in the chamber 1326), except that the active energy absorber module 1300 further includes an integral inductance coil assembly 1380 encapsulated in the cavity 1326. The coil assembly 1380 includes a coil 1381 corresponding to the coil 420 of the electrical circuit of FIG. 6.

The coil assembly 1380 includes an electrically conductive outer coil member 1382, an electrically conductive inner coil member 1384, an electrically conductive interface plate 1385A, coupling fasteners 1385B, an electrically conductive terminal member or shaft 1386, an electrical insulator sheet 1385C, an electrically conductive coupling member 1387, an electrically insulating casing 1388, and an electrically insulating outer cover 1389. The coil members 1382, 1384 collectively form the coil 1381.

The outer coil member 1382 includes a coil body 1382A, a spirally extending coil strip 1382B defining a spiral coil channel 1382C, and a coupling extension 1382D. A threaded bore 1382E extends axially through the coil body 1382A. Similarly, the inner coil member 1384 includes a coil body 1384A, a spirally extending coil strip 1384B defining a spiral coil channel 1384C, and a coupling extension 1384D. A threaded bore 1384E extends axially through the coil body 1384A.

The interface plate 1385A is interposed between the coupling extensions 1382D, 1384D and the three components are secured together by the fasteners 1385B. The insulator sheet 1385C is sandwiched between the coil members 1382, 1384 to prevent or inhibit direct flow of electrical current therebetween.

The casing 1388 includes an outer shell portion 1388A, an inner separator wall portion 1388B, and an outer separator wall portion 1388C. The outer shell portion 1389 partially surrounds and encases the components 1388A-C. The outer separator wall portion 1388C fills the coil channel 1382C between the adjacent windings of the coil strip 1382B. The inner separator wall portion 1388B fills the coil channel 1384C between the adjacent windings of the coil strip 1384B. The cover 1389 is fitted over the casing 1388.

The terminal shaft 1386 is mechanically secured and electrically connected in the bore 1382E and projects through a post hole 1388D in the casing 1388, and above the casing 1388.

The coupling member 1387 is mechanically secured and electrically connected in the bore 1384E and projects through a post hole in the cover 1389. The coupling member 1387 is also mechanically and electrically secured in a bore of the head 1327.

The components 1382, 1384, 1385A, 1386, 1387 are formed of metal and, in some embodiments, are formed of aluminum. According to some embodiments, each coil member 1382, 1384 is unitary and, in some embodiments, monolithic.

The casing 1388 may be formed of a dielectric or electrically insulating material having high melting and combustion temperatures. In some embodiments, the casing 1388 is formed of a polymeric material. In some embodiments, the casing 1388 includes an epoxy. In some embodiments, the casing 1388 includes a material selected from the group consisting of epoxy adhesive and/or epoxy cast resin or silicone elastomer. In some embodiments, the casing 1388 is monolithic. In some embodiments, the casing 1388 includes a material selected from the group consisting of epoxy adhesive and/or epoxy cast resin that is itself covered by an outer layer of a different material.

The outer casing layer 1389 may be formed of a different material that the casing 1388 in order to provide complementary properties. In some embodiments, the outer casing layer 1389 is formed of a material that provides enhanced moisture resistance as compared to the material of the casing 1388. In some embodiments, the outer casing layer 1389 is formed of a silicone compound or PBT.

In use, current flows sequential through the terminal shaft 1386, the outer winding strip 1382B, the coupling extension 1382D, the interface plate 1385A, the coupling extension 1384D, the inner winding strip 1384B, the coupling member 1387, and the head 1327.

By axially stacking the sequentially arranged coil strips 1382B, 1384B, the outer diameter of the active energy absorber module 1300 can be reduced.

Electrical protection devices according to embodiments of the present invention may provide a number of advantages in addition to those mentioned above. The devices may be formed so to have a relatively compact form factor. The devices may be retrofittable for installation in place of similar type surge protective devices not having circuits as described herein. In particular, the present devices may have the same length dimension as such previous devices.

According to some embodiments, the areas of engagement between each of the electrode contact surfaces, the varistor contact surfaces, and the thyristor contact surfaces are each at least one square inch.

According to some embodiments, the biased electrodes (e.g., the electrodes 1022 and 1024) apply a load to the varistors and thyristors along the axis C-C in the range of from 2000 lbf and 26000 lbf depending on its surface area.

According to some embodiments, the combined thermal mass of the housing (e.g., the housing 1022) and the electrode (e.g., the electrode 1024) is substantially greater than the thermal mass of each of the varistors and the thyristors captured therebetween. As used herein, the term "thermal mass" means the product of the specific heat of the material or materials of the object multiplied by the mass or masses of the material or materials of the object. That is, the thermal mass is the quantity of energy required to raise one gram of the material or materials of the object by one degree centigrade times the mass or masses of the material or materials in the object. According to some embodiments, the thermal mass of at least one of the electrode head and the electrode wall is substantially greater than the thermal mass of the varistor or thyristor. According to some embodiments, the thermal mass of at least one of the electrode head and the electrode wall is at least two times the thermal mass of the varistor or thyristor, and, according to some embodiments, at least ten times as great. According to some embodiments, the combined thermal masses of the head and the electrode wall are substantially greater than the thermal mass of the varistor or thyristor, according to some embodiments at least two times the thermal mass of the varistor or thyristor and, according to some embodiments, at least ten times as great.

As discussed above, the spring washers 1028E are Belleville washers. Belleville washers may be used to apply relatively high loading without requiring substantial axial space. However, other types of biasing means may be used in addition to or in place of the Belleville washer or washers. Suitable alternative biasing means include one or more coil springs, wave washers or spiral washers.

Figure 24:
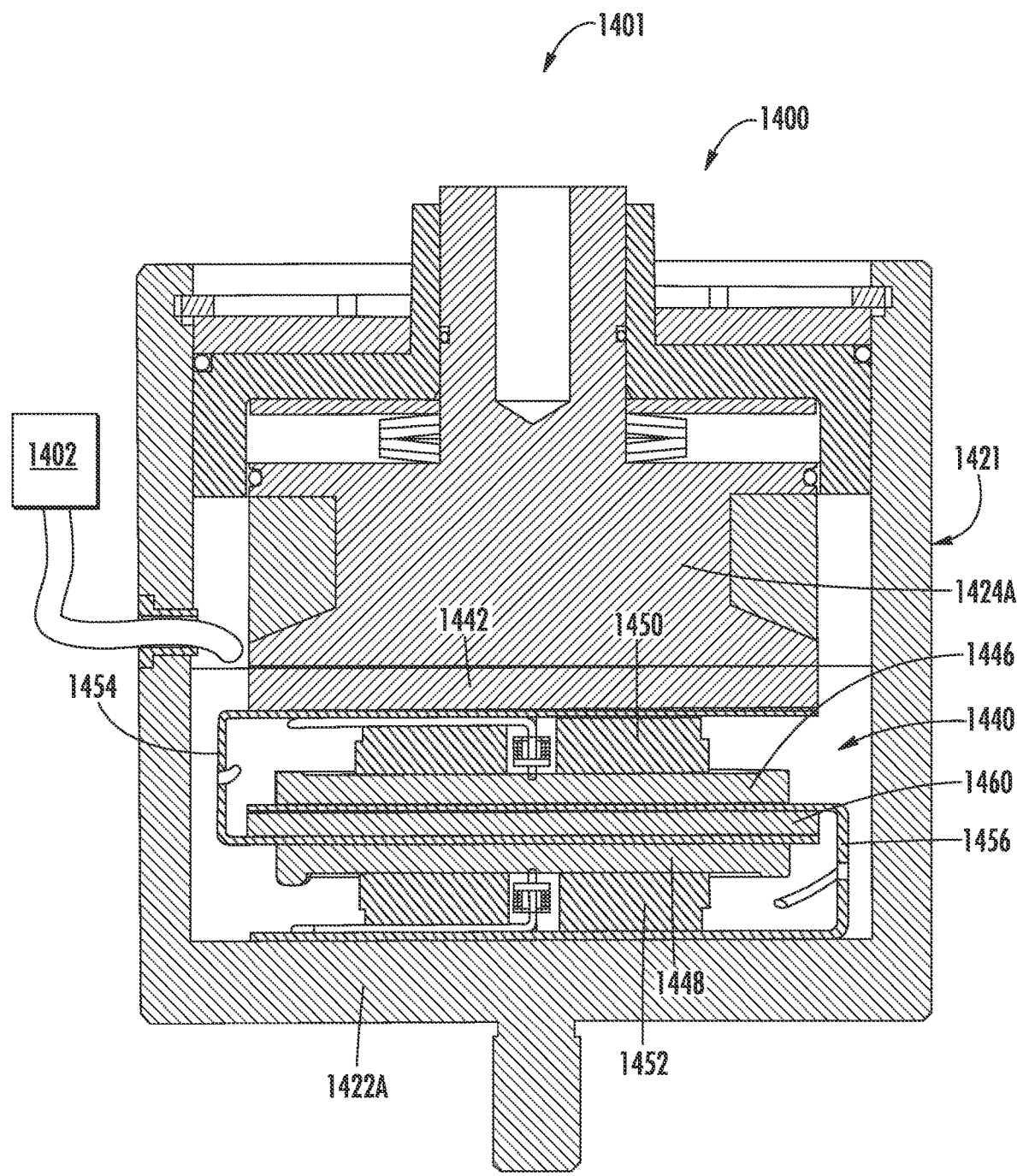
FIG. 24 is a cross-sectional view of an active energy absorber module according to further embodiments of the invention.
Figure 25:
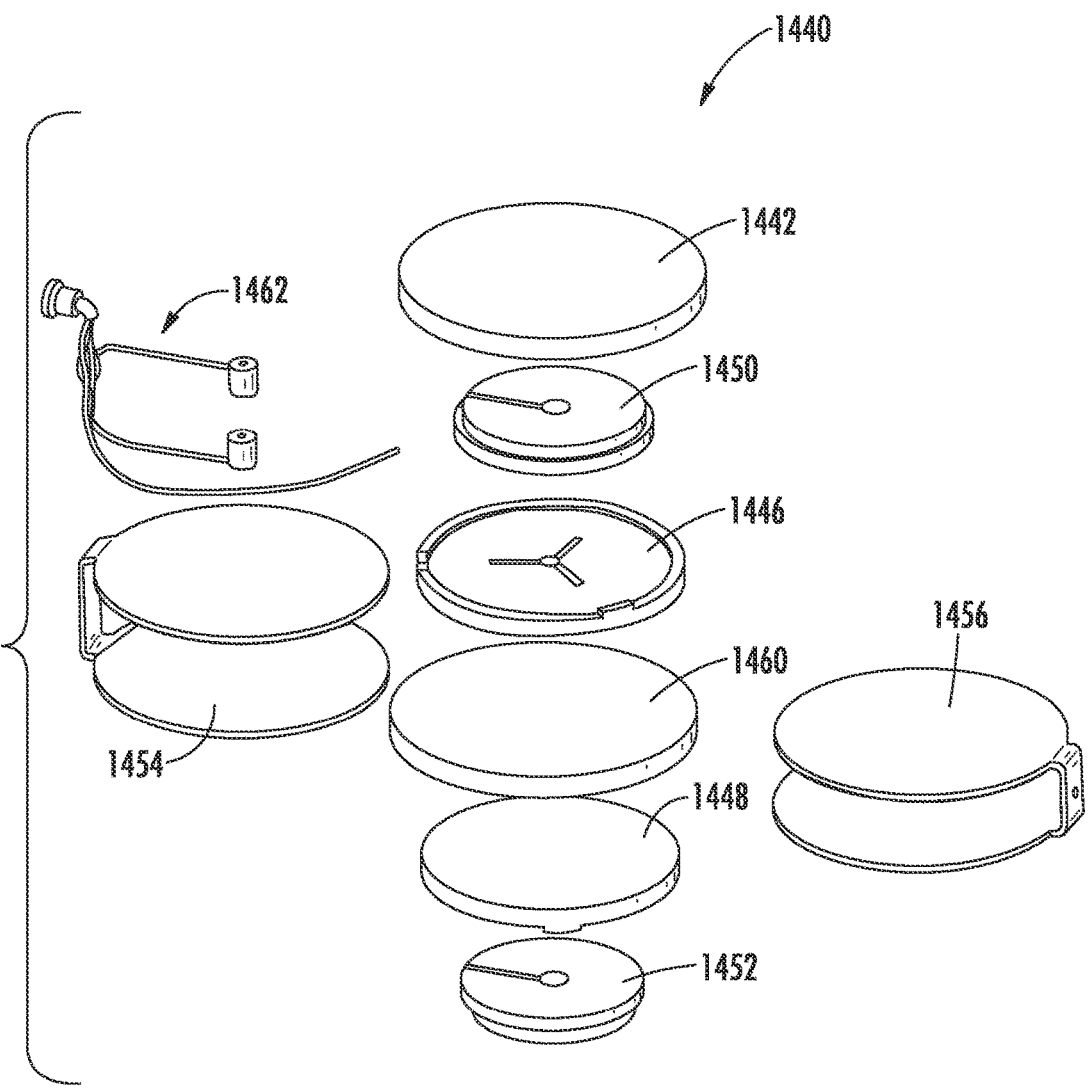
FIG. 25 is an exploded, top perspective view of an active component subassembly forming a part of the active energy absorber module of FIG. 24.

With reference to FIGS. 24 and 25, an active energy absorber system 1401 including a trigger circuit 1402 and an active energy absorber module 1400 according to alternative embodiments is shown therein. The active energy absorber module 1400 corresponds to the active energy absorber 100 of the electrical circuit of FIG. 3 except that the trigger circuit 110 is external to the unit 1400. The active energy absorber module 1400 is constructed in the same manner as the active energy absorber module 1000 (including a trigger circuit 1402 external to the housing assembly 1421), except that the active component subassembly 1440 of the active energy absorber module 1400 is differently constructed than the active component subassembly 1040 of the active energy absorber module 1000.

The active component subassembly 1440 includes one varistor wafer 1442, two thyristors 1446, 1448, two contact plates 1450, 1452, an insulator member (layer or plate) 1460, and two interconnect members 1454, 1456 axially stacked in the chamber 1421 between the electrode head 1424A and the electrode wall 1422A. The varistor 1442 corresponds to the varistor 106, the thyristor 1446 corresponds to the thyristor 102, the thyristor 1448 corresponds to the thyristor 104, and the trigger circuit 1402 corresponds to the trigger circuit 110. The trigger circuit 1402 is connected to the active component subassembly 1440 by a wire assembly 1462. The interconnect members 1454, 1456, the contact plates 1450, 1452, electrically interconnect the varistor 1442, thyristors 1446, 1448, and trigger circuit 1402 in the manner represented in FIG. 3. As discussed above, the thyristors 1446, 1448 are relatively arranged in an electrically antiparallel configuration.

Figure 26:
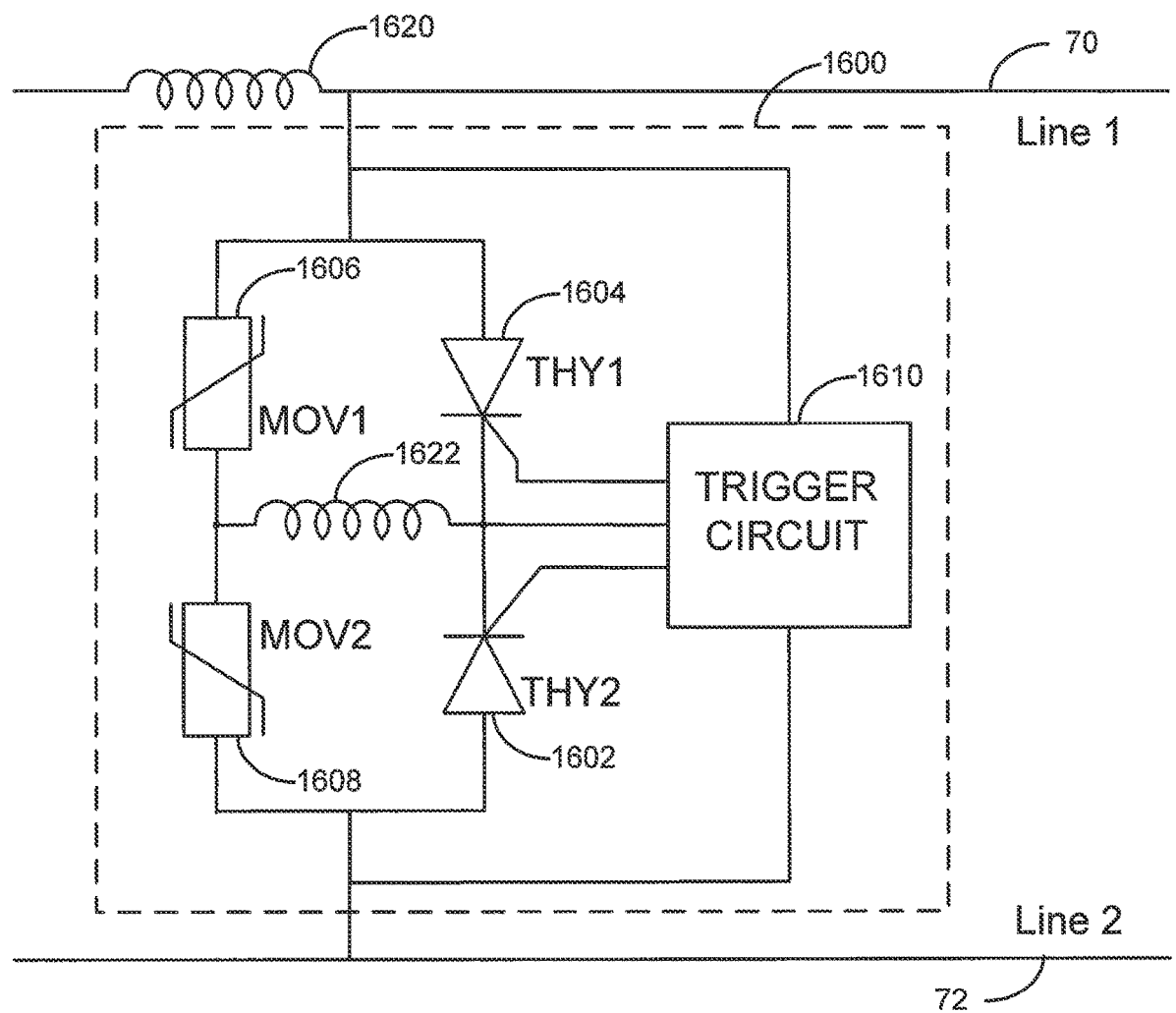
FIG. 26 is a schematic block diagram illustrating a device for active overvoltage protection according to some embodiments of the present invention.

Reference is now made to FIG. 26, which is a schematic block diagram illustrating a device for active overvoltage protection according to some embodiments of the present invention. An active energy absorber 1600 may be connected between power lines 70, 72 in an electrical distribution system and/or component. The power lines 70, 72 may include power lines and/or a neutral line in a single phase power system or phase lines and/or a neutral line in a multiple phase system (e.g., three phase power system). Thus, the active energy absorber 1600 may be connected between two phase or power lines and/or between a phase or power line and a neutral line.

Some embodiments provide that an active energy absorber 1600 may selectively conduct fault current responsive to overvoltage conditions. For example, some embodiments provide that when the active energy absorber 1600 is in a conducting mode, that the overvoltage condition may be clamped to a specific voltage by absorbing energy corresponding to the overvoltage fault condition that exceeds the clamped voltage. Some embodiments are directed to providing protection for temporary power system sourced overvoltage conditions that may be sustained for longer periods than transient and/or surge voltages.

In some embodiments, the active energy absorber 1600 includes a trigger circuit 1610 that may be similar to trigger circuit 110 as discussed above regarding FIG. 3. As such, additional description thereof will be omitted.

The active energy absorber 1600 may include a first thyristor 1604 including a first anode that is connected to a first power line 70, a first cathode and a first gate. The active energy absorber 1600 may include a second thyristor 1602 that includes a second anode that is connected to a second power line 72, a second cathode that is connected to the cathode of the first thyristor 1604, and a second gate. In this regard, the first thyristor 1604 and the second thyristor 1602 are connected in series with one another in opposing directions relative to one another.

The active energy absorber 1600 may include a first varistor 1606 that is connected to the anode of the first thyristor 1604 and a second varistor 1608 that is connected to the anode of the second thyristor 1602 and to the first varistor 1606. In this regard, the first varistor 1606 and the second varistor 1608 may be connected in series with one another. In this regard, the anode of first thyristor 1604 and the first varistor 1606 may each be connected to the first power line 70 and the anode of second thyristor 1602 and the second varistor 1608 may each be connected to the second power line 72.

Some embodiments provide that a first inductance 1620 may be optionally used to reduce the di/dt through the thyristors 1602, 1604 when they conduct a surge current. Some embodiments provide that the power lines 70, 72 themselves have significant inductance due to their length, the size of the cables and any transformer installed upstream to the device. However, adding inductance 1620 between the power line 70 and the device may result in increasing the protection level (clamping voltage) that the equipment will experience during surge events and transient overvoltages. In this regard, if the inductance of the power system is not enough, then an additional in-line module could be added to increase the overall inductance of the power line. Some embodiments provide that since two varistors are used in the same device, the energy absorption can be shared between them during conduction.

In some embodiments, the active energy absorber 1600 includes a second inductance 1622 that may be connected between the cathodes of the first and second thyristors 1604, 1602 and the common terminal of the first and second varistors 1606, 1608. The second inductance 1622 may protect the first and second thyristors 1604, 1602 from experiencing an excessive rate of change of current (e.g., di/dt). For example, in the case of a surge event from line 1 70 to line 2 72, the voltage across the first varistor 1606 may rise very fast, for example, exceeding the dV/dt of the first thyristor 1604. Then, after a certain period of time the first thyristor 1604 may be self triggered. As this might not occur instantly (depending on the internal construction of the first and second thyristors 1604, 1602 and the internal parasitic capacitance between anode and gate), if a delay occurs, then the surge current through the first varistor 1606 may reach a specific value at the time the first thyristor 1604 is self triggered. The second inductance 1622 may prevent an instantaneous rise in the current through the first thyristor 1604 and thus prevent exceeding the rate of change of current therethrough. Some embodiments provide that a small inductance value for the second inductance 1622 may be sufficient to slow down this surge current transition and protect the first thyristor 1604 from damage. In some embodiments, a value of the second inductance 1622 may be in the range of 1 µH to 10 µH, however, such range is not limiting.

In some embodiments, the electrical circuit of the active energy absorber 1600 may include the SPD functionality. As such, some embodiments provide that the active energy absorber 1600 may be used without an additional and/or external SPD.

Further, during surge events and transient overvoltages, the thyristors 1602, 1604 may be self triggered due to their internal parasitic capacitance between the gate and the anode and the gate and the cathode. According to convention, this parasitic capacitance may be made by the manufacturers to be as low as possible in order to avoid the self triggering of the thyristors 1602, 1604 in surge events and transient overvoltage events. However, in the current application, the parasitic capacitance may be higher, which may improve the ease of manufacture. In this regard, the device may demonstrate improved sensitivity to triggering during surge events and transient overvoltage events. As such, the voltage may not reach very high values before the thyristor 1602, 1604 is triggered and the voltage is clamped at the protection level of the varistor 1606, 1608. In this regard, the device may consistently clamp at the voltage level of a single varistor 1606, 1608, regardless of whether the event is a temporary overvoltage, a surge current or a transient overvoltage.

The active energy absorber 1600 may not use a snubber circuit as this circuit may avoid a false trigger of the thyristor due to high dV/dt during surge events or transient overvoltages. Instead, the ability of the thyristors 1602, 1604 to self trigger may clamp the voltage through a single varistor.

Further, this device may provide stand-alone self-triggered operation that can be connected in a power system between two lines and provide protection against temporary overvoltage, transient overvoltage and/or surge/lightning currents.

Figure 27:
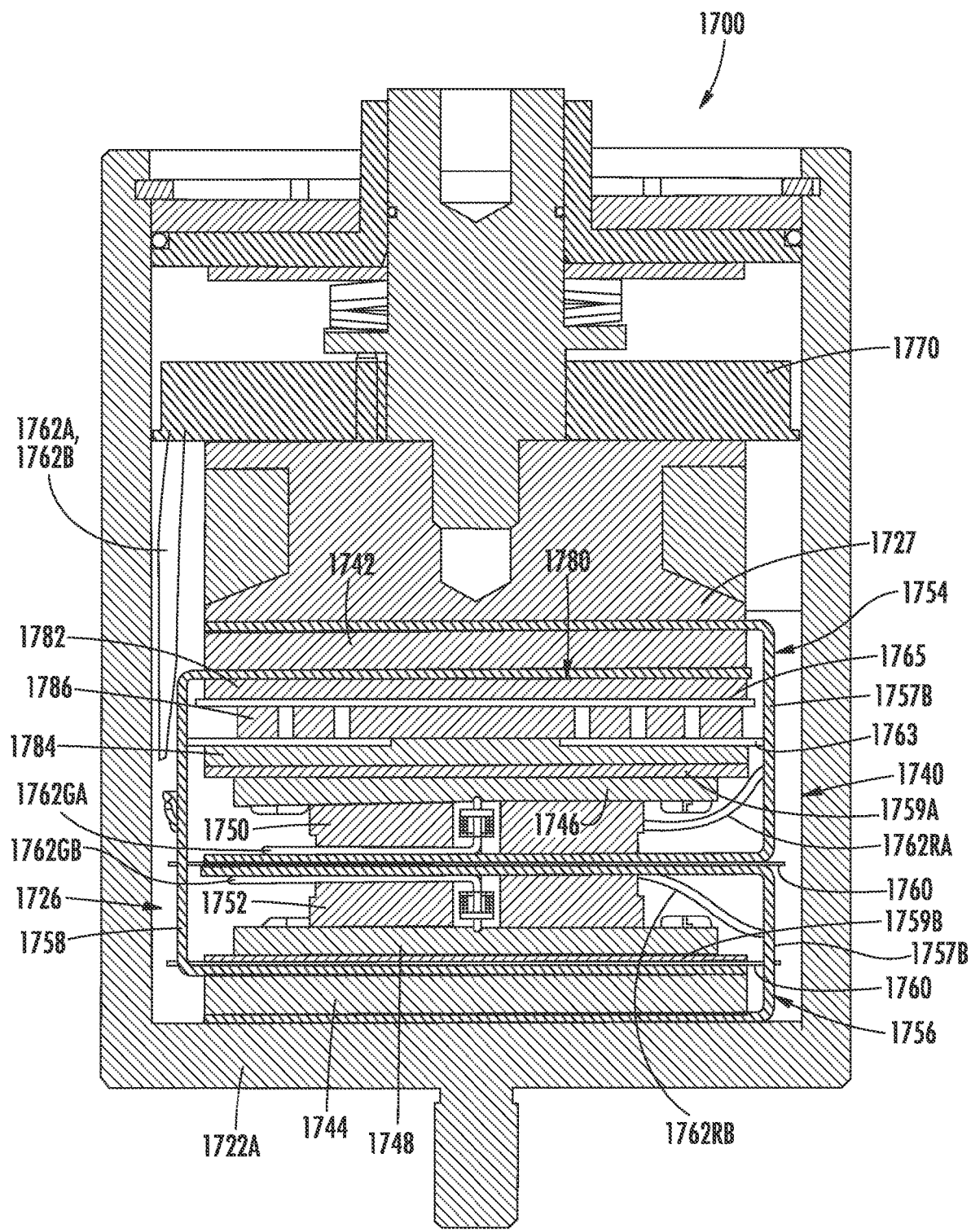
FIG. 27 is a cross-sectional view of an active energy absorber according to further embodiments of the invention.
Figure 28:
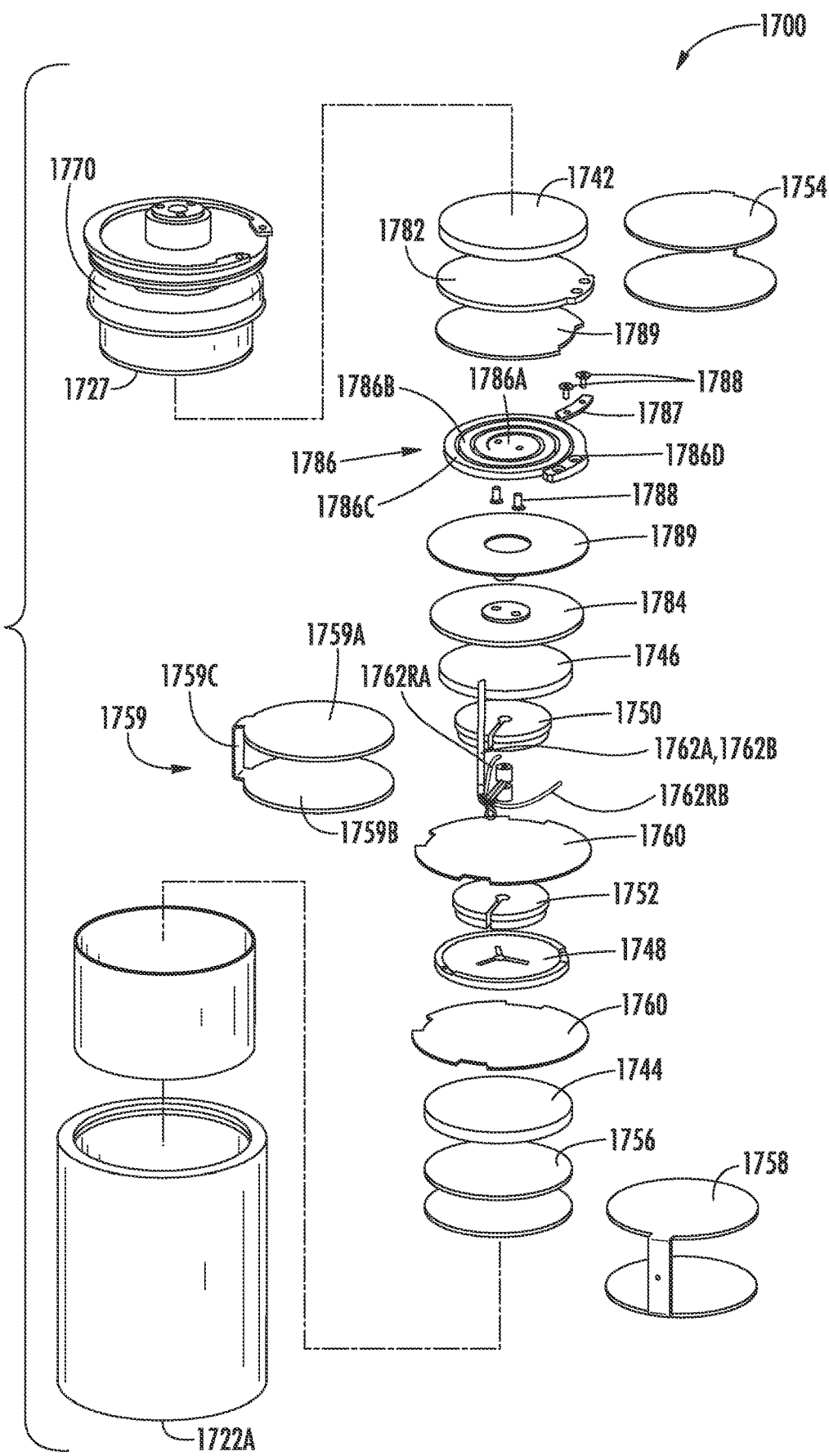
FIG. 28 is an exploded, perspective view of the active energy absorber of FIG. 27.

With reference to FIGS. 27 and 28, an active energy absorber module 1700 according to alternative embodiments is shown therein. The active energy absorber module 1700 corresponds to the active energy absorber module 1600 of the electrical circuit of FIG. 26. The active energy absorber module 1700 is constructed in the same manner as the active energy absorber module 1100 (FIG. 17), except as discussed below.

The module 1700 includes a trigger circuit module 1770 corresponding to the trigger circuit module 1170 (FIG. 17) and including a trigger circuit corresponding to the trigger circuit 1610 (FIG. 26).

The module 1700 includes an active component subassembly 1740 disposed in the enclosed chamber 1726 between the housing electrode end wall 1722A and the electrode head 1727. The active component subassembly 1740 includes two varistors 1742, 1744, two thyristors 1746, 1748, two contact plates 1750, 1752, an insulator 1760, and three interconnect members 1754, 1756, 1758, corresponding to components 1042, 1044, 1046, 1048, 1050, 1052, 1060, 1054, 1056 and 1058 of the module 1000. The components of the subassembly 1740 correspond to or form parts of the electrical circuit of FIG. 26 as follows: the varistor 1742 corresponds to the varistor 1606; the varistor 1744 corresponds to the varistor 1608; the thyristor 1746 corresponds to the thyristor 1602; and the thyristor 1748 corresponds to the thyristor 1604. The interconnect members 1754, 1756, 1758 and the contact plates 1750, 1752 electrically interconnect the varistors 1742, 1744 and the thyristors 1746, 1748 in the manner represented in FIG. 26.

The subassembly 1740 further includes a coil assembly 1780, an additional interconnect member 1759, and two additional electrical insulator layers 1763, 1765. The coil assembly 1780 corresponds to the coil 1622 of FIG. 26 and is electrically connected to the other components by the interconnect member 1759 in the manner shown in FIG. 26.

With reference to FIG. 28, the coil assembly 1780 includes an upper contact plate 1782, a lower contact plate 1784, a coil member 1786, an interface member 1787, fasteners 1788, and two coil insulators 1789. The components 1782, 1784, 1786, 1787 are formed of an electrically conductive material such as metal (e.g., aluminum).

The coil member 1786 includes a coil body 1786A, a spirally extending coil strip 1786B defining a spiral coil channel 1786C, and a coupling extension 1786D. The coil member 1786 is electrically connected to the upper contact plate 1782 via the coupling extension 1786D and to the lower contact plate 1784 via the coil body 1786A. The coil strip 1786B is electrically insulated from the contact plates 1782, 1784 by the insulators 1789.

The interconnect member 1759 includes a first contact portion 1759A that contacts the lower surface of the lower coil assembly contact plate 1784 and the anode of the upper thyristor 1746. The interconnect member 1759 also includes a second contact portion 1759B that contacts the interconnect member 1758 and the anode of the lower thyristor 1748. The interconnect member 1759 includes a bridge portion 1759C (not visible in FIG. 27) that electrically connects the contact portions 1759A, 1759B, and thereby the above-mentioned components.

Signal cables 1762A, 1762B corresponding to the signal cables 1062A, 1062B extend from the trigger circuit module 1770. Each cable 1762A, 1762B includes a gate wire 1762GA, 1762GB and a reference wire 1762RA, 1762RB. The gate wires 1762GA, 1762GB are electrically terminated at the control terminals 1745F of the thyristors 1746, 1748 by the gate connectors 1762D. The reference wires 1762RA and 1762RB are mechanically terminated and electrically connected (e.g., by soldering) to the bridge portions 1757B of the interconnect members 1754 and 1756, respectively. In that way, the reference wire 1762RA is electrically connected to the cathode of the thyristor 1746 through the interconnect member 1754 and the contact plate 1750, and the reference wire 1762RB is electrically connected to the cathode of the thyristor 1748 through the interconnect member 1756 and the contact plate 1752.

Figure 29:
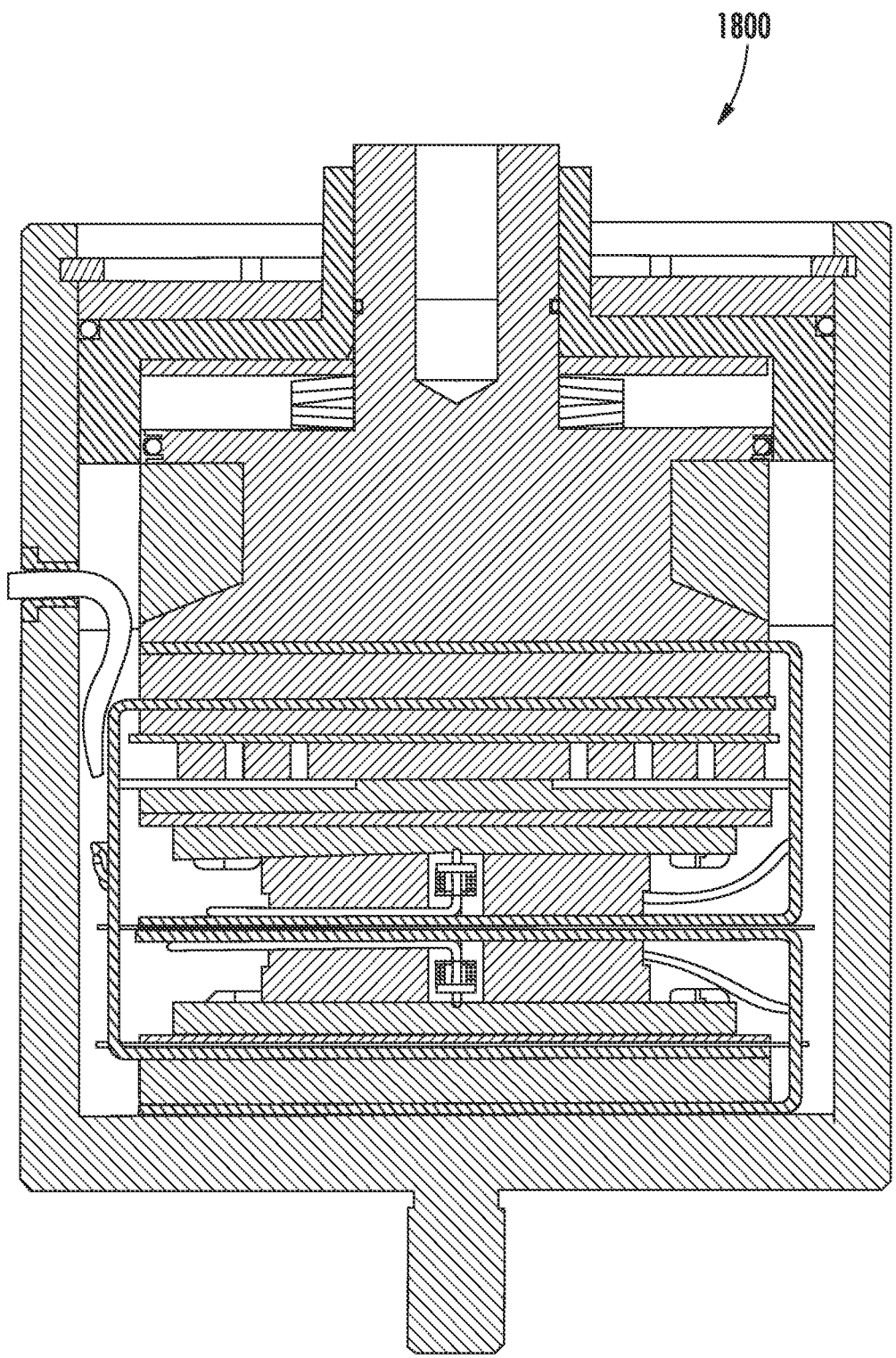
FIG. 29 is a cross-sectional view of an active energy absorber according to further embodiments of the invention.

FIG. 29 shows an active energy absorber module 1800 according to further embodiments. The module 1800 is constructed in the same manner as the module 1700, except that the module 1800 does not have an internal trigger circuit module corresponding to the trigger circuit module 1770 and instead employs an external trigger circuit as described above for the module 1000.

Figure 30:
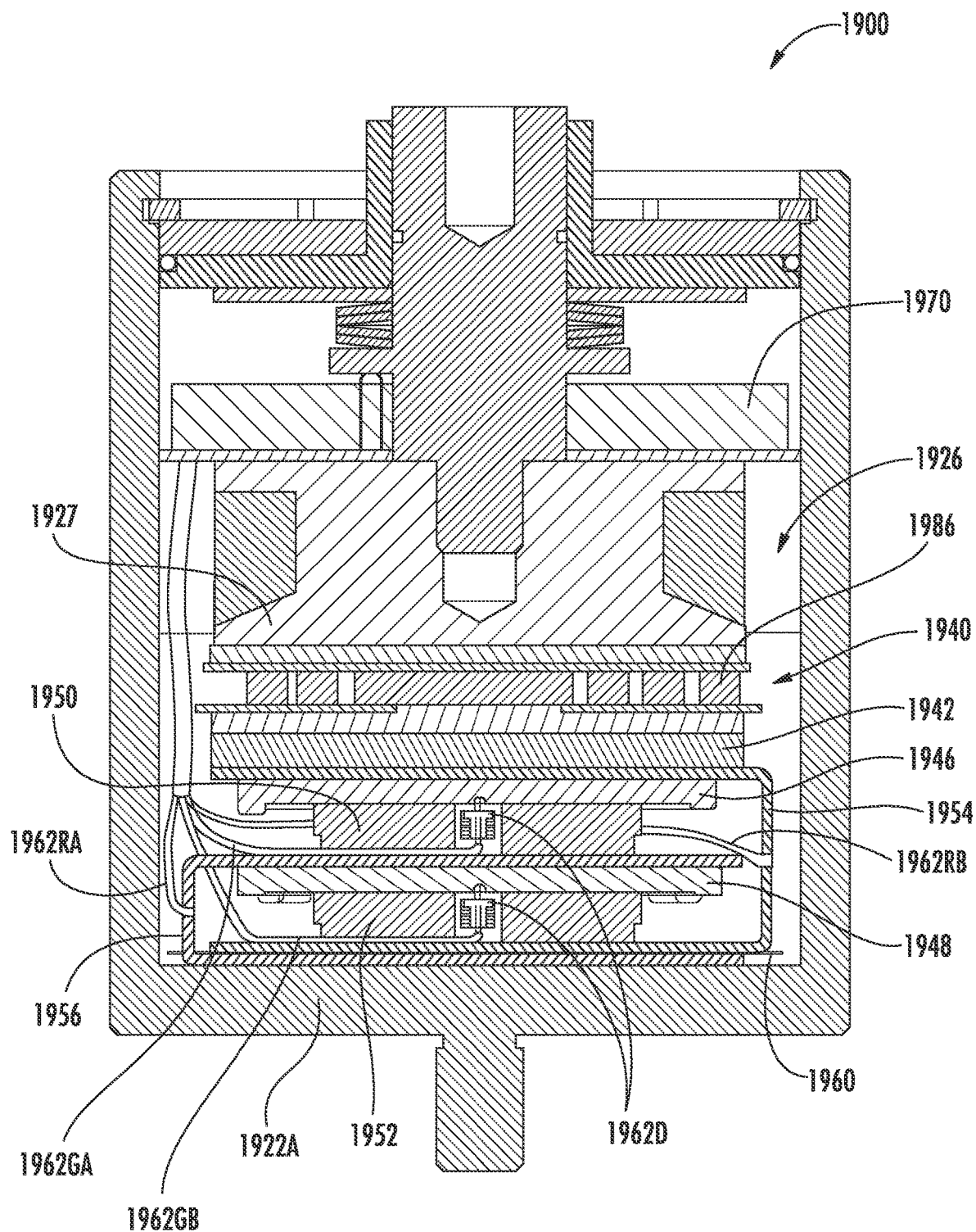
FIG. 30 is a cross-sectional view of an active energy absorber according to some embodiments of the invention.

With reference to FIG. 30, an active energy absorber module 1900, according to further embodiments, is shown therein. The module 1900 corresponds to the active energy absorber module 201 of FIG. 4. The module 1900 is constructed in generally the same manner as the module 1700 (FIG. 27), except as follows.

The module 1900 includes an active component subassembly 1940 encapsulated in the enclosed chamber 1926 between the housing electrode end wall 1922A and the electrode head 1927. The subassembly 1940 includes a varistor 1942 corresponding to the MOV 206 of FIG. 4, thyristors 1946, 1948 corresponding to the thyristors 202 and 204 of FIG. 4, an inductor coil 1986 corresponding to the inductance 208 of FIG. 4, and a trigger circuit module 1970 corresponding to the trigger circuit 210 of FIG. 4.

Interconnect members 1954, 1956 and contact plates 1950, 1952 electrically interconnect the varistor 1942, the thyristors 1946, 1948, the coil 1986, and the electrodes 1922A, 1927 in the manner represented in FIG. 4. An electrical insulator 1960 electrically insulates the interconnect member 1956 from the interconnect member 1954. The trigger circuit of the module 1970 is electrically connected to the gate terminals and cathodes of the thyristors 1946, 1948 by gate wires 1962A, 1962GB and reference wires 1962RA, 1962RB via the gate connectors 1962D and the interconnect members 1954, 1956 in the same manner described above for the module 1700 (FIG. 27).

Figure 31:
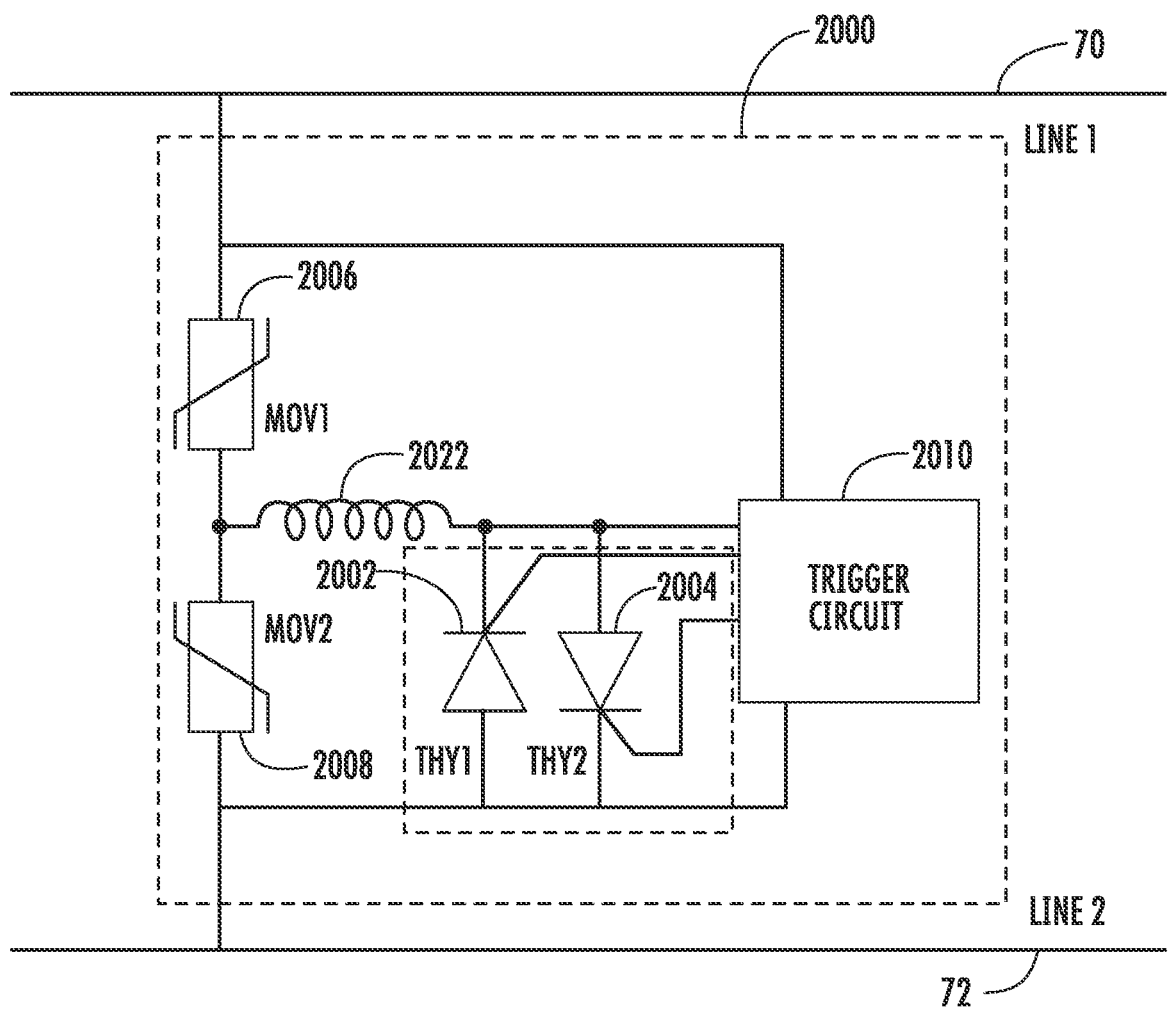
FIG. 31 is a schematic block diagram illustrating a device for active overvoltage protection according to some embodiments of the invention.

Reference is now made to FIG. 31, which is a schematic block diagram illustrating a device for active overvoltage protection according to some embodiments of the present invention. An active energy absorber 2000 may be connected between power lines 70, 72 in an electrical distribution system and/or component. The power lines 70, 72 may include power lines and/or a neutral line in a single phase power system or phase lines and/or a neutral line in a multiple phase system (e.g., three phase power system). Thus, the active energy absorber 2000 may be connected between two phase or power lines and/or between a phase or power line and a neutral line.

Some embodiments provide that an active energy absorber 2000 may selectively conduct fault current responsive to overvoltage conditions. For example, some embodiments provide that when the active energy absorber 2000 is in a conducting mode, that the overvoltage condition may be clamped to a specific voltage by absorbing energy corresponding to the overvoltage fault condition that exceeds the clamped voltage. Some embodiments are directed to providing protection for temporary power system sourced overvoltage conditions that may be sustained for longer periods than transient and/or surge voltages.

In some embodiments, the active energy absorber 2000 includes a trigger circuit 2010 that may be similar to trigger circuit 110 as discussed above regarding FIG. 3. As such, additional description thereof will be omitted.

The active energy absorber 2000 may include a first thyristor 2002 including a first anode, a first cathode and a first gate. The active energy absorber 2000 may include a second thyristor 2004 that includes a second anode that is connected to the first cathode of the first thyristor 2002, a second cathode that is connected to the first anode of the first thyristor 2002, and a second gate. In this regard, the first thyristor 2002 and the second thyristor 2004 are connected in anti-parallel with one another.

The active energy absorber 2000 may include a first varistor 2006 and a second varistor 2008. The first varistor 2006 may be connected between the first power line 70 and the second varistor 2008. The second varistor 2008 may be connected between the first varistor 2006 and the second power line 72. In this regard, the first varistor 2006 and the second varistor 2008 may be connected in series with one another.

Some embodiments provide that an inductance 2022 may be optionally used to reduce the di/dt through the thyristors 2002, 2004 when they conduct a surge current. Some embodiments provide that the power lines 70, 72 themselves have significant inductance due to their length, the size of the cables and any transformer installed upstream to the device. However, inductance 2022 may be connected between the connection node of the first and second varistors 2006, 2008 and the connection node corresponding to the first cathode of the first thyristor 2002 and the second anode of the second thyristor 2004. The first anode of the first thyristor 2002 and the second cathode of the second thyristor 2004 may be connected to the terminal of the second varistor 2008 that is connected to the second power line 72.

In some embodiments, the electrical circuit of the active energy absorber 2000 may include the SPD functionality. As such, some embodiments provide that the active energy absorber 1600 may be used without an additional and/or external SPD.

Further, during surge events and transient overvoltages, the thyristors 2002, 2004 may be self triggered due to their internal parasitic capacitance between the gate and the anode and the gate and the cathode. According to convention, this parasitic capacitance may be made by the manufacturers to be as low as possible in order to avoid the self triggering of the thyristors 2002, 2004 in surge events and transient overvoltage events. However, in the current application, the parasitic capacitance may be higher, which may improve the ease of manufacture. In this regard, the device may demonstrate improved sensitivity to triggering during surge events and transient overvoltage events. As such, the voltage may not reach very high values before the thyristor 2002, 2004 is triggered and the voltage is clamped at the protection level of the varistor 2006, 2008. In this regard, the device may consistently clamp at the voltage level of a single varistor 2006, 2008, regardless of whether the event is a temporary overvoltage, a surge current or a transient overvoltage.

The active energy absorber 2000 may not use a snubber circuit as this circuit may avoid a false trigger of the thyristor due to high dV/dt during surge events or transient overvoltages. Instead, the ability of the thyristors 2002, 2004 to self trigger may clamp the voltage through a single varistor.

Further, this device may provide stand-alone self-triggered operation that can be connected in a power system between two lines and provide protection against temporary overvoltage, transient overvoltage and/or surge/lightning currents.

Figure 32:
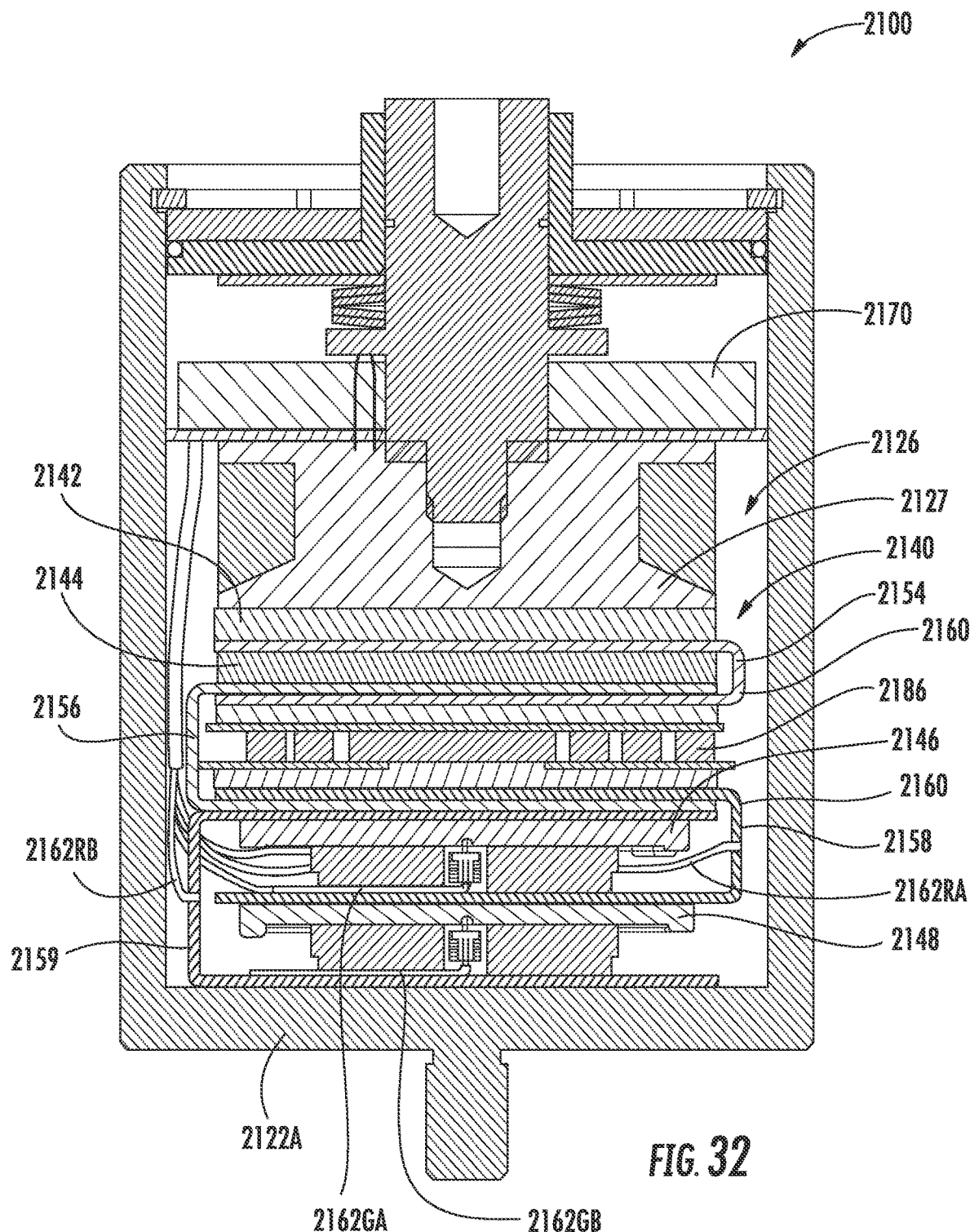
FIG. 32 is a cross-sectional view of an active energy absorber according to some embodiments of the invention.

With reference to FIG. 32, an active energy absorber module 2100 according to further embodiments is shown therein. The module 2100 corresponds to the active energy absorber 2000 in FIG. 31. The module 2100 is constructed in generally the same manner as the module 1900 (FIG. 30) except as follows.

The module 2100 includes an active component subassembly 2140 encapsulated in the enclosed chamber 2126 between the housing electrode end wall 2122A and the electrode head 2127. The subassembly 2140 includes a varistor 2142 corresponding to the varistor 2006 of FIG. 31, a second varistor 2144 corresponding to the varistor 2008, a thyristor 2146 corresponding to the thyristor 2002, a second thyristor 2148 corresponding to the thyristor 2004, an inductor coil 2186 corresponding to the inductance 2022, and a trigger circuit module 2170 corresponding to the trigger circuit 2010.

Interconnect members 2154, 2156, 2158, 2159 and contact plates 2050, 2052 electrically interconnect the varistors 2142, 2144, the thyristors 2146, 2148, the coil 2186, and the electrodes 2122A, 2127 in the manner represented in FIG. 31. Two electrical insulators 2160 electrically insulate the interconnect members 2154 and 2156 from one another and the interconnect members 2156 and 2158 from one another. The trigger circuit of the trigger circuit module 2170 is electrically connected to the gate terminals and cathodes of the thyristors 2146, 2148 by gate wires 2162GA, 2162GB and reference wires 2162RA, 2162RB via the gate connectors 2162D and the interconnect members 2158, 2159 in the manner described above for the module 170 (FIG. 27).

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. An active energy absorber module comprising:
   first and second lines, the first and second lines comprising first and second power lines in a single phase power system or first and second phase lines in a multiple phase power system;
   first and second thyristors comprising a thyristor circuit and electrically connected between the first and second lines;
   a first varistor electrically connected to at least one of the first and second thyristors between the first and second lines; and
   a second varistor electrically connected in series to the first varistor between the first and second lines; and
   an inductor electrically connected between a first node of the thyristor circuit and a second node corresponding to a junction of the first varistor and the second varistor.

2. The active energy absorber module of claim 1, wherein the first varistor is connected in electrical series with each of the first and second thyristors.

3. The active energy absorber module of claim 1, wherein the first and second thyristors are electrically connected in an anti-parallel configuration.

4. The active energy absorber module of claim 3, wherein the first varistor is electrically connected in series with the thyristor circuit between the first and second lines.

5. The active energy absorber module of claim 3, further comprising:
   a snubber circuit electrically connected in parallel with the thyristor circuit.

6. The active energy absorber module of claim 5, wherein the snubber circuit comprises a resistor and a capacitor electrically connected in series.

7. The active energy absorber module of claim 1, further comprising:
   a trigger circuit electrically connected to the first and second thyristors.

8. An active energy absorber module comprising:
   first and second lines;
   a module housing;
   first and second thyristors enclosed within the module housing;
   a trigger circuit enclosed within the module housing and electrically connected to each of the first and second thyristors; and
   a first varistor enclosed within the module housing and electrically connected to the first thyristor in parallel between the first line and a junction node; and
   a second varistor enclosed within the module housing and electrically connected to the second thyristor in parallel between the junction node and the second line.

9. The active energy absorber module of claim 8, wherein the first and second lines comprise first and second power lines in a single phase power system or first and second phase lines in a multiple phase power system.

10. The active energy absorber module of claim 8, wherein the first and second lines comprise first and second phase lines in a multiple phase power system.

11. The active energy absorber module of claim 8, wherein the first and second lines comprise a first power line and a second neutral line in a single phase power system.

12. The active energy absorber module of claim 8, wherein the first and second lines comprise a first phase line and a second neutral line in a multiple phase power system.

13. An active energy absorber module comprising:
   first and second lines;
   a module housing;
   first and second thyristors enclosed within the module housing and connected in series between the first line and the second line, the first and second thyristors connected to each other at a first node and comprising a thyristor circuit;
   a trigger circuit enclosed within the module housing an electrically connected to each of the first and second thyristors; and
   first and second varistors enclosed within the module housing and connected in series between the first line and the second line the first and second varistors connected to each other at a second node and comprising a varistor circuit, the varistor circuit connected in parallel to the thyristor circuit between the first line and the second line.

14. The active energy absorber module of claim 13, wherein the first and second lines comprise first and second power lines in a single phase power system or first and second phase lines in a multiple phase power system; and
   wherein the active energy absorber module further comprises:
   an inductor connected between the first node and the second node.

15. The active energy absorber module of claim 13, wherein the first and second lines comprise first and second phase lines in a multiple phase power system; and
   wherein the active energy absorber module further comprises:
   an inductor connected between the first node and the second node.

16. The active energy absorber module of claim 13, wherein the first and second lines comprise a first power line and a second neutral line in a single phase power system; and
   wherein the active energy absorber module further comprises:
   an inductor connected between the first node and the second node.

17. The active energy absorber module of claim 13, wherein the first and second lines comprise a first phase line and a second neutral line in a multiple phase power system; and
   wherein the active energy absorber module further comprises:
   an inductor connected between the first node and the second node.

* * * * *

UNITED STATES PATENT AND TRADEMARK OFFICE
CERTIFICATE OF CORRECTION

PATENT NO. : 11,881,704 B2  
APPLICATION NO. : 17/826560  
DATED : January 23, 2024  
INVENTOR(S) : Kostakis et al.

Page 1 of 1

It is certified that error appears in the above-identified patent and that said Letters Patent is hereby corrected as shown below:

On the Title Page

(56) References Cited, FOREIGN PATENT DOCUMENTS, Page 3, Column 1, Line 54:
Please correct "WO 2012044961 4/2013" to read --WO 2013044961 4/2013--

In the Specification

Column 20, Line 42: Please correct "102411" to read --1024H--

Signed and Sealed this
Twenty-third Day of April, 2024

Katherine Kelly Vidal  
*Director of the United States Patent and Trademark Office*